(12) United States Patent
Matsuoka

(10) Patent No.: US 8,280,160 B2
(45) Date of Patent: Oct. 2, 2012

(54) IMAGE COMPRESSING METHOD, IMAGE COMPRESSING APPARATUS AND IMAGE FORMING APPARATUS

(75) Inventor: Teruhiko Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 458 days.

(21) Appl. No.: 12/691,271

(22) Filed: Jan. 21, 2010

(65) Prior Publication Data

US 2010/0183223 A1    Jul. 22, 2010

(30) Foreign Application Priority Data

Jan. 22, 2009   (JP) .................................. 2009-012337

(51) Int. Cl.
*G06K 9/36*    (2006.01)

(52) U.S. Cl. ........................................ 382/166; 382/164

(58) Field of Classification Search .................. None
See application file for complete search history.

(56) References Cited

U.S. PATENT DOCUMENTS

| 6,701,012 | B1 | 3/2004 | Matthews |
| 7,116,443 | B2 * | 10/2006 | Handley et al. ............... 358/1.9 |
| 7,158,669 | B2 | 1/2007 | Tanaka et al. |
| 2002/0037100 | A1 * | 3/2002 | Toda et al. ..................... 382/166 |
| 2002/0146166 | A1 * | 10/2002 | Rao et al. ....................... 382/164 |
| 2005/0100212 | A1 * | 5/2005 | Eguchi et al. ................. 382/164 |
| 2005/0180642 | A1 * | 8/2005 | Curry et al. .................... 382/232 |
| 2005/0180647 | A1 * | 8/2005 | Curry et al. .................... 382/243 |
| 2005/0275897 | A1 * | 12/2005 | Fan et al. ........................ 358/2.1 |
| 2007/0189615 | A1 * | 8/2007 | Liu et al. ....................... 382/232 |

FOREIGN PATENT DOCUMENTS

| JP | 2002-94805 A | 3/2002 |
| JP | 2003-309727 A | 10/2003 |
| JP | 2006-311193 A | 11/2006 |

* cited by examiner

*Primary Examiner* — Wenpeng Chen
*Assistant Examiner* — Feng Niu
(74) *Attorney, Agent, or Firm* — Birch, Stewart, Kolasch & Birch, LLP

(57) ABSTRACT

When N kinds of foreground identifiers for identifying color information of a foreground of a color image is to be reduced to M smaller than N, foreground identifiers corresponding to similar chromatic colors are merged and foreground identifiers corresponding to similar achromatic colors are merged but a foreground identifier corresponding to a chromatic color and a foreground identifier corresponding to an achromatic color are not merged. Thus, image quality degradation derived from color change from an achromatic color to a chromatic color or vice versa may be suppressed. On the basis of a foreground layer including the M kinds of foreground identifiers, M binary images respectively corresponding to the M kinds of foreground identifiers are generated, each of the binary images is subjected to lossless compression and a background layer is subjected to lossy compression.

12 Claims, 24 Drawing Sheets

F I G. 3
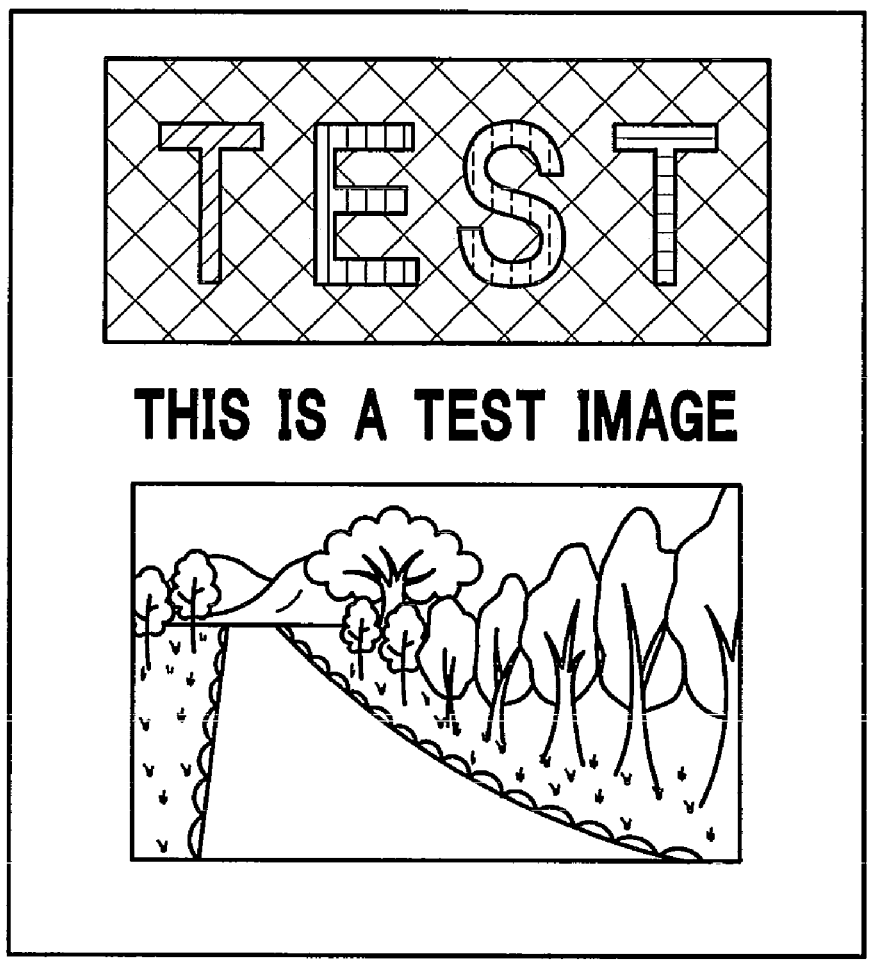

F I G. 4
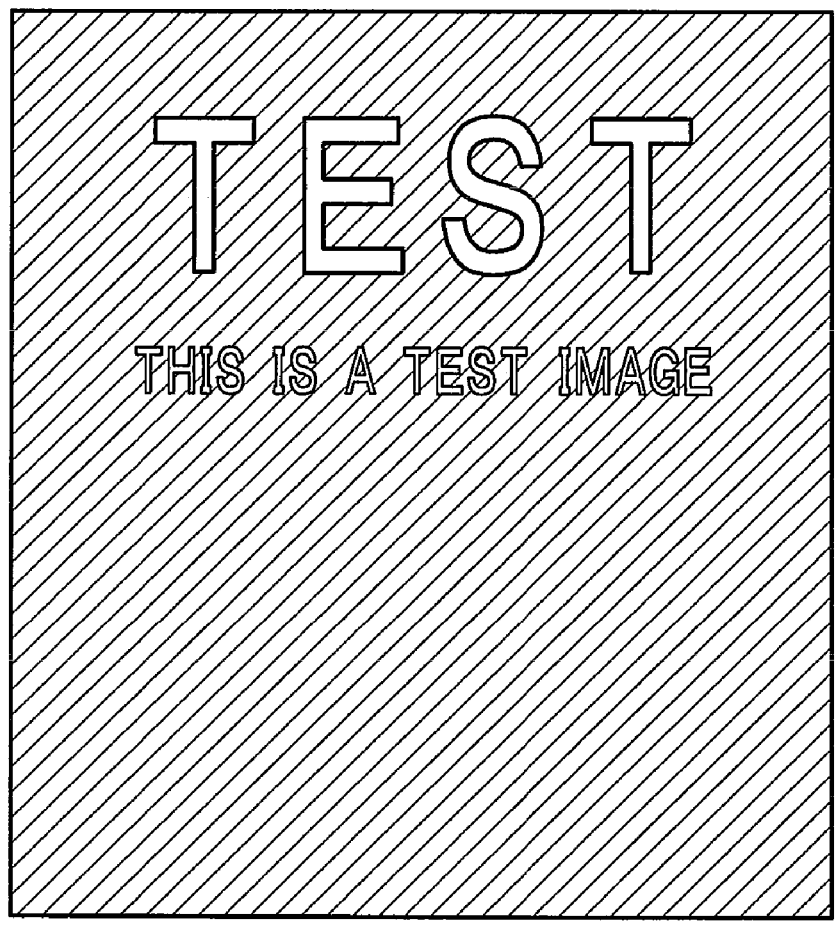

FIG. 6

MAIN SCANNING DIRECTION (X COORDINATE)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 0 | 0 | 0 | 0 | 0 | 0 | 0 | 0 | 0 | 0  | 0  | 0  | 0  | 0  | 0  |
| 1 | 0 | 0 | 0 | 0 | 0 | 0 | 0 | 0 | 0 | 0 | 0  | 0  | 0  | 0  | 0  | 0  |
| 2 | 0 | 0 | 1 | 0 | 0 | 0 | 0 | 0 | 0 | 2 | 0  | 0  | 0  | 0  | 0  | 0  |
| 3 | 0 | 0 | 1 | 0 | 0 | 0 | 0 | 0 | 2 | 2 | 2  | 0  | 0  | 0  | 0  | 0  |
| 4 | 0 | 0 | 1 | 1 | 1 | 0 | 0 | 2 | 2 | 2 | 2  | 2  | 0  | 0  | 0  | 0  |
| 5 | 0 | 0 | 1 | 1 | 1 | 0 | 0 | 2 | 2 | 2 | 2  | 2  | 0  | 0  | 0  | 0  |
| 6 | 0 | 0 | 1 | 1 | 1 | 0 | 0 | 0 | 2 | 2 | 2  | 0  | 0  | 0  | 0  | 0  |
| 7 | 0 | 0 | 0 | 0 | 1 | 0 | 0 | 0 | 0 | 2 | 0  | 0  | 3  | 0  | 0  | 0  |
| 8 | 0 | 0 | 0 | 0 | 0 | 0 | 0 | 0 | 0 | 0 | 0  | 0  | 3  | 0  | 0  | 0  |
| 9 | 0 | 0 | 0 | 0 | 0 | 0 | 0 | 0 | 0 | 0 | 3  | 3  | 3  | 0  | 0  | 0  |
| 10| 0 | 0 | 4 | 0 | 0 | 0 | 0 | 0 | 0 | 0 | 0  | 0  | 0  | 0  | 0  | 0  |
| 11| 4 | 4 | 4 | 0 | 0 | 0 | 0 | 0 | 0 | 0 | 0  | 0  | 0  | 0  | 0  | 0  |
| 12| 4 | 4 | 4 | 4 | 4 | 0 | 0 | 0 | 0 | 0 | 0  | 0  | 0  | 0  | 0  | 0  |
| 13| 0 | 0 | 0 | 0 | 0 | 5 | 5 | 5 | 0 | 0 | 0  | 0  | 0  | 0  | 6  | 6  |
| 14| 0 | 7 | 7 | 0 | 0 | 5 | 5 | 5 | 0 | 0 | 0  | 0  | 0  | 0  | 6  | 6  |
| 15| 0 | 7 | 7 | 0 | 0 | 0 | 5 | 0 | 0 | 0 | 0  | 0  | 0  | 0  | 6  | 6  |
| 16| 0 | 7 | 7 | 7 | 0 | 0 | 0 | 5 | 0 | 0 | 8  | 8  | 8  | 0  | 6  | 6  |
| 17| 0 | 7 | 7 | 0 | 0 | 0 | 0 | 0 | 5 | 0 | 0  | 0  | 0  | 0  | 6  | 6  |
| 18| 0 | 7 | 7 | 0 | 7 | 0 | 0 | 0 | 0 | 0 | 0  | 0  | 0  | 0  | 6  | 6  |
| 19| 0 | 0 | 0 | 0 | 7 | 0 | 6 | 6 | 6 | 6 | 6  | 6  | 6  | 6  | 6  | 6  |

SUB SCANNING DIRECTION (Y COORDINATE)

F I G. 7

| ADDRESS | IDENTIFIER | MINIMUM X COORDINATE VALUE | MINIMUM Y COORDINATE VALUE | MAXIMUM X COORDINATE VALUE | MAXIMUM Y COORDINATE VALUE | R | G | B | NUMBER OF PIXELS |
|---|---|---|---|---|---|---|---|---|---|
| 0 | 0 | 0 | 0 | 15 | 19 | 255 | 255 | 255 | 229 |
| 1 | 1 | 2 | 2 | 4 | 7 | 0 | 255 | 0 | 12 |
| 2 | 2 | 7 | 2 | 11 | 7 | 0 | 0 | 0 | 18 |
| 3 | 3 | 10 | 7 | 12 | 9 | 0 | 0 | 192 | 5 |
| 4 | 4 | 0 | 10 | 4 | 12 | 240 | 0 | 0 | 9 |
| 5 | 5 | 5 | 13 | 8 | 17 | 160 | 32 | 32 | 9 |
| 6 | 6 | 6 | 13 | 15 | 19 | 96 | 64 | 150 | 22 |
| 7 | 7 | 1 | 14 | 4 | 19 | 64 | 255 | 255 | 13 |
| 8 | 8 | 10 | 16 | 12 | 16 | 0 | 0 | 96 | 3 |

FIG. 8

MAIN SCANNING DIRECTION (X COORDINATE)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 1 | 0 | 0 | 0 |
| 8 | 0 | 0 | 0 | 0 | 0 | 0 | 0 | 0 | 0 | 0 | 0 | 0 | 1 | 0 | 0 | 0 |
| 9 | 0 | 0 | 0 | 0 | 0 | 0 | 0 | 0 | 0 | 0 | 1 | 1 | 1 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 |

SUB SCANNING DIRECTION (Y COORDINATE)

MAIN SCANNING DIRECTION (X COORDINATE)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 1 | 1 | 1 | 0 | 0 | 0 |
| 17 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 |

SUB SCANNING DIRECTION (Y COORDINATE)

| Idx | R | G | B | L | a | b |
|---|---|---|---|---|---|---|
| 1 | 0 | 255 | 0 | 88 | -79 | 81 |
| 2 | 0 | 0 | 0 | 0 | 0 | 0 |
| 3 | 0 | 0 | 192 | 21 | 55 | -90 |
| 4 | 240 | 0 | 0 | 51 | 77 | 67 |
| 5 | 160 | 32 | 32 | 36 | 52 | 35 |
| 6 | 96 | 64 | 150 | 34 | 29 | -43 |
| 7 | 64 | 255 | 255 | 91 | -47 | -14 |
| 8 | 0 | 0 | 96 | 6 | 33 | -55 |

FIG. 10B

| Idx | R | G | B | L | a | b | WtL | WtC |
|---|---|---|---|---|---|---|---|---|
| 1 | 0 | 255 | 0 | 88 | -79 | 81 | 2 | 2 |
| 2 | 0 | 0 | 0 | 0 | 0 | 0 | 0.5 | 2 |
| 3 | 0 | 0 | 192 | 21 | 55 | -90 | 0.5 | 0.5 |
| 4 | 240 | 0 | 0 | 51 | 77 | 67 | 2 | 2 |
| 5 | 160 | 32 | 32 | 36 | 52 | 35 | 0.5 | 2 |
| 6 | 96 | 64 | 150 | 34 | 29 | -43 | 0.5 | 0.5 |
| 7 | 64 | 255 | 255 | 91 | -47 | -14 | 2 | 0.5 |
| 8 | 0 | 0 | 96 | 6 | 33 | -55 | 0.5 | 0.5 |

FIG. 11

| COMBINATION | COLOR DIFFERENCE | | WEIGHTED COLOR DIFFERENCE | |
|---|---|---|---|---|
| 1-3 | 447 | | 447 | |
| 1-4 | 495 | | 7920 | |
| 1-5 | 415 | | 1660 | |
| 1-6 | 437 | | 437 | |
| 1-7 | 319 | | 1276 | |
| 1-8 | 351 | | 351 | |
| | | | | |
| 3-4 | 432 | | 432 | |
| 3-5 | 352 | | 88 | |
| 3-6 | 202 | 3 | 12 | 2 |
| 3-7 | 382 | | 95 | |
| 3-8 | 96 | 1 | 6 | 1 |
| | | | | |
| 4-5 | 144 | 2 | 576 | |
| 4-6 | 358 | | 358 | |
| 4-7 | 686 | | 2744 | |
| 4-8 | 336 | | 336 | |
| | | | | |
| 5-6 | 214 | | 53 | 4 |
| 5-7 | 542 | | 542 | |
| 5-8 | 256 | | 64 | |
| | | | | |
| 6-7 | 328 | | 82 | |
| 6-8 | 214 | | 13 | 3 |
| | | | | |
| 7-8 | 478 | | 119 | |

FIG. 12

MAIN SCANNING DIRECTION (X COORDINATE)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 2 | 0 | 0 | 0 | 0 | 0 | 0 |
| 3 | 0 | 0 | 1 | 0 | 0 | 0 | 0 | 0 | 2 | 2 | 2 | 0 | 0 | 0 | 0 | 0 |
| 4 | 0 | 0 | 1 | 1 | 1 | 0 | 0 | 2 | 2 | 2 | 2 | 2 | 0 | 0 | 0 | 0 |
| 5 | 0 | 0 | 1 | 1 | 1 | 0 | 0 | 2 | 2 | 2 | 2 | 2 | 0 | 0 | 0 | 0 |
| 6 | 0 | 0 | 1 | 1 | 1 | 0 | 0 | 0 | 2 | 2 | 2 | 0 | 0 | 0 | 0 | 0 |
| 7 | 0 | 0 | 0 | 0 | 1 | 0 | 0 | 0 | 0 | 2 | 0 | 0 | 3 | 0 | 0 | 0 |
| 8 | 0 | 0 | 0 | 0 | 0 | 0 | 0 | 0 | 0 | 0 | 0 | 0 | 3 | 0 | 0 | 0 |
| 9 | 0 | 0 | 0 | 0 | 0 | 0 | 0 | 0 | 0 | 0 | 3 | 3 | 3 | 0 | 0 | 0 |
| 10 | 0 | 0 | 4 | 0 | 0 | 0 | 0 | 0 | 0 | 0 | 0 | 0 | 0 | 0 | 0 | 0 |
| 11 | 4 | 4 | 4 | 0 | 0 | 0 | 0 | 0 | 0 | 0 | 0 | 0 | 0 | 0 | 0 | 0 |
| 12 | 4 | 4 | 4 | 4 | 4 | 0 | 0 | 0 | 0 | 0 | 0 | 0 | 0 | 0 | 0 | 0 |
| 13 | 0 | 0 | 0 | 0 | 0 | 4 | 4 | 4 | 0 | 0 | 0 | 0 | 0 | 0 | 6 | 6 |
| 14 | 0 | 7 | 7 | 0 | 0 | 4 | 4 | 4 | 0 | 0 | 0 | 0 | 0 | 0 | 6 | 6 |
| 15 | 0 | 7 | 7 | 0 | 0 | 0 | 4 | 0 | 0 | 0 | 0 | 0 | 0 | 0 | 6 | 6 |
| 16 | 0 | 7 | 7 | 7 | 0 | 0 | 0 | 4 | 0 | 0 | 3 | 3 | 3 | 0 | 6 | 6 |
| 17 | 0 | 7 | 7 | 0 | 0 | 0 | 0 | 0 | 4 | 0 | 0 | 0 | 0 | 0 | 6 | 6 |
| 18 | 0 | 7 | 7 | 0 | 7 | 0 | 0 | 0 | 0 | 0 | 0 | 0 | 0 | 0 | 6 | 6 |
| 19 | 0 | 0 | 0 | 0 | 7 | 0 | 6 | 6 | 6 | 6 | 6 | 6 | 6 | 6 | 6 | 6 |

SUB SCANNING DIRECTION (Y COORDINATE)

FIG. 13

MAIN SCANNING DIRECTION (X COORDINATE)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 0 | 0 | 0 | 0 | 0 | 0 | 0 | 0 | 0 | 0  | 0  | 0  | 0  | 0  | 0  |
| 1 | 0 | 0 | 0 | 0 | 0 | 0 | 0 | 0 | 0 | 0 | 0  | 0  | 0  | 0  | 0  | 0  |
| 2 | 0 | 0 | 1 | 0 | 0 | 0 | 0 | 0 | 0 | 2 | 0  | 0  | 0  | 0  | 0  | 0  |
| 3 | 0 | 0 | 1 | 0 | 0 | 0 | 0 | 0 | 2 | 2 | 2  | 0  | 0  | 0  | 0  | 0  |
| 4 | 0 | 0 | 1 | 1 | 1 | 0 | 0 | 2 | 2 | 2 | 2  | 2  | 0  | 0  | 0  | 0  |
| 5 | 0 | 0 | 1 | 1 | 1 | 0 | 0 | 2 | 2 | 2 | 2  | 2  | 0  | 0  | 0  | 0  |
| 6 | 0 | 0 | 1 | 1 | 1 | 0 | 0 | 0 | 2 | 2 | 2  | 0  | 0  | 0  | 0  | 0  |
| 7 | 0 | 0 | 0 | 0 | 1 | 0 | 0 | 0 | 0 | 2 | 0  | 0  | 6  | 0  | 0  | 0  |
| 8 | 0 | 0 | 0 | 0 | 0 | 0 | 0 | 0 | 0 | 0 | 0  | 0  | 6  | 0  | 0  | 0  |
| 9 | 0 | 0 | 0 | 0 | 0 | 0 | 0 | 0 | 0 | 0 | 6  | 6  | 6  | 0  | 0  | 0  |
| 10 | 0 | 0 | 4 | 0 | 0 | 0 | 0 | 0 | 0 | 0 | 0  | 0  | 0  | 0  | 0  | 0  |
| 11 | 4 | 4 | 4 | 0 | 0 | 0 | 0 | 0 | 0 | 0 | 0  | 0  | 0  | 0  | 0  | 0  |
| 12 | 4 | 4 | 4 | 4 | 4 | 0 | 0 | 0 | 0 | 0 | 0  | 0  | 0  | 0  | 0  | 0  |
| 13 | 0 | 0 | 0 | 0 | 0 | 5 | 5 | 5 | 0 | 0 | 0  | 0  | 0  | 0  | 6  | 6  |
| 14 | 0 | 7 | 7 | 0 | 0 | 5 | 5 | 5 | 0 | 0 | 0  | 0  | 0  | 0  | 6  | 6  |
| 15 | 0 | 7 | 7 | 0 | 0 | 0 | 5 | 0 | 0 | 0 | 0  | 0  | 0  | 0  | 6  | 6  |
| 16 | 0 | 7 | 7 | 7 | 0 | 0 | 0 | 5 | 0 | 0 | 6  | 6  | 6  | 0  | 6  | 6  |
| 17 | 0 | 7 | 7 | 0 | 0 | 0 | 0 | 0 | 5 | 0 | 0  | 0  | 0  | 0  | 6  | 6  |
| 18 | 0 | 7 | 7 | 0 | 7 | 0 | 0 | 0 | 0 | 0 | 0  | 0  | 0  | 0  | 6  | 6  |
| 19 | 0 | 0 | 0 | 0 | 7 | 0 | 6 | 6 | 6 | 6 | 6  | 6  | 6  | 6  | 6  | 6  |

SUB SCANNING DIRECTION (Y COORDINATE)

F I G. 14

| ADDRESS | IDENTIFIER | MINIMUM X COORDINATE VALUE | MINIMUM Y COORDINATE VALUE | MAXIMUM X COORDINATE VALUE | MAXIMUM Y COORDINATE VALUE | R | G | B | NUMBER OF PIXELS |
|---|---|---|---|---|---|---|---|---|---|
| 0 | 0 | 0 | 0 | 15 | 19 | 255 | 255 | 255 | 229 |
| 1 | 1 | 2 | 2 | 4 | 7 | 0 | 255 | 0 | 12 |
| 2 | 2 | 7 | 2 | 11 | 7 | 0 | 0 | 0 | 18 |
| 3 | 3 | 10 | 7 | 12 | 9→16 | 0 | 0 | 192 | 5→8 |
| 4 | 4 | 0 | 10 | 4→8 | 12→17 | 240 | 0 | 0 | 9→18 |
| 5 | 5→4 | 5 | 13 | 8 | 17 | 160 | 32 | 32 | 9→0 |
| 6 | 6 | 6 | 13 | 15 | 19 | 96 | 64 | 150 | 22 |
| 7 | 7 | 1 | 14 | 4 | 19 | 64 | 255 | 255 | 13 |
| 8 | 8→3 | 10 | 16 | 12 | 16 | 0 | 0 | 96 | 3→0 |

FIG. 15

| ADDRESS | IDENTIFIER | MINIMUM X COORDINATE VALUE | MINIMUM Y COORDINATE VALUE | MAXIMUM X COORDINATE VALUE | MAXIMUM Y COORDINATE VALUE | R | G | B | NUMBER OF PIXELS |
|---|---|---|---|---|---|---|---|---|---|
| 0 | 0 | 0 | 0 | 15 | 19 | 255 | 255 | 255 | 229 |
| 1 | 1 | 2 | 2 | 4 | 7 | 0 | 255 | 0 | 12 |
| 2 | 2 | 7 | 2 | 11 | 7 | 0 | 0 | 0 | 18 |
| 3 | 3→6 | 10 | 7 | 12 | 9 | 0 | 0 | 192 | 5→0 |
| 4 | 4 | 0 | 10 | 4 | 12 | 240 | 0 | 0 | 9 |
| 5 | 5 | 5 | 13 | 8 | 17 | 160 | 32 | 32 | 9 |
| 6 | 6 | 6 | 13→7 | 15 | 19 | 96 | 64 | 150 | 22→27→30 |
| 7 | 7 | 1 | 14 | 4 | 19 | 64 | 255 | 255 | 13 |
| 8 | 8→6 | 10 | 16 | 12 | 16 | 0 | 0 | 96 | 3→0 |

FIG. 16

MAIN SCANNING DIRECTION (X COORDINATE)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 1 | 0 | 0 | 0 |
| 8 | 0 | 0 | 0 | 0 | 0 | 0 | 0 | 0 | 0 | 0 | 0 | 0 | 1 | 0 | 0 | 0 |
| 9 | 0 | 0 | 0 | 0 | 0 | 0 | 0 | 0 | 0 | 0 | 1 | 1 | 1 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 1 | 1 | 1 | 0 | 0 | 0 |
| 17 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 |

SUB SCANNING DIRECTION (Y COORDINATE)

E3

E8

IMAGE COMPRESSING METHOD, IMAGE COMPRESSING APPARATUS AND IMAGE FORMING APPARATUS

CROSS-REFERENCE TO RELATED APPLICATIONS

This Nonprovisional application claims priority under 35 U.S.C. §119(a) on Patent Application No. 2009-12337 filed in Japan on Jan. 22, 2009, the entire contents of which are hereby incorporated by reference.

BACKGROUND

1. Technical Field

The present invention relates to an image compressing method, an image compressing apparatus and an image forming apparatus in which a color image is compressed.

2. Description of Related Art

Digital image processing systems have been remarkably developed in recent years, and establishment of digital image processing techniques have been proceeded. In the field of, for example, copying machines and multi-function printers (MFPs) employing an electrophotographic method or an ink-jet method, a document of a manuscript is read with a scanner to be stored as a document file of electronic data and the thus stored document file is managed. Furthermore, a document file is compressed to be submitted with an e-mail.

Since an image read with a scanner (hereinafter referred to as a scanned image) has a large file size in general, it is indispensable to compress a scanned image for storage or transmission. As one compression technique for compressing such an image in a high compression ratio, an image compression technique based on layer segmentation such as Mixed Raster Content (MRC) has been put to practical use.

In the image compression technique based on the layer segmentation, a foreground mask corresponding to a text and/or a line art is generated from a color image to be compressed, the color image is separated into a foreground layer and a background layer on the basis of the generated foreground mask, and the foreground layer and the background layer are respectively compressed by employing suitable compression techniques, so as to ultimately generate a highly compressed image (see Japanese Patent Application Laid-Open No. 2002-94805). At this point, a foreground layer is a layer of a foreground corresponding to a text and/or a line art and is generally compressed by employing a lossless compression technique such as JBIG (Joint Bilevel Image Group), MMR (Modified Modified Read code) or LZW (Lempel Ziv Welch).

On the other hand, a background layer is a layer of a background corresponding to an image content other than the text and/or line art and is generally compressed by employing a lossy compression technique such as JPEG (Joint Photographic Experts Group). In compression attained by the lossy compression technique, the image quality of a compressed image is more largely degraded than in compression attained by the lossless compression technique. Since the compression ratio is easily controlled in the lossy compression technique, however, priority can be placed on a small file size or high image quality in accordance with the use of a compressed image. On the contrary, since the compression ratio is difficult to control in the lossless compression technique, it is difficult to improve the compression ratio by employing this technique.

SUMMARY

In a conventionally proposed image compressing apparatus, a foreground layer separated from a color image is further separated before subjecting it to the lossless compression, and thus, the compression ratio can be improved as compared with the case where the foreground layer is directly subjected to the lossless compression. In this image compressing apparatus, one foreground layer is generated by replacing colors of a foreground of one color image with N kinds of identifiers, the generated foreground layer is separated into N binary images respectively corresponding to the N kinds of identifiers, and the separated binary images are individually subjected to the lossless compression. At this point, N is a natural number.

In the case where the number N of kinds of identifiers is large, the number of binary images to be subjected to the lossless compression is large, and hence, there arises a problem that the file size attained after the compression cannot be sufficiently small. In order to solve this problem, when colors correlated to different identifiers are similar to each other, these colors may be regarded as the same color to be correlated to the same identifier (namely, the different identifiers may be merged), so as to reduce the number of kinds of identifiers. Specifically, an image encoding apparatus working as follows has been proposed (see Japanese Patent Application Laid-Open No. 2003-309727): Color gravity values of color information correlated to different identifiers are compared with each other so as to determine whether or not colors expressed by these color information are similar to each other, and when they are determined to be similar to each other, the compared color information are merged to each other, and the identifiers correlated to these color information are also merged.

In the image encoding apparatus disclosed in Japanese Patent Application Laid-Open No. 2003-309727, however, it is determined whether or not colors are similar to each other by simply using the color gravity values alone without distinction of a chromatic color and an achromatic color. Therefore, a chromatic color close to an achromatic color (such as brown) may be determined to be similar to the achromatic color (such as black), so that foreground identifiers correlated to these colors may be merged. In this case, the merged identifier is allowed to correlate to, for example, one of the colors corresponding to a larger number of pixels or a color obtained as an average color of the compared colors. As a result, there arises a problem that a text in an achromatic color (or a chromatic color) before the compression is changed in color to a chromatic color (or an achromatic color) through the compression. In other words, it is apprehended that the quality attained after the compression may be largely degraded.

The present invention has been devised in consideration of the aforementioned circumstances, and a principal object is providing an image compressing method, an image compressing apparatus and an image forming apparatus in which a file size attained after compression is sufficiently small while suppressing large degradation of image quality attained after the compression by employing the following feature: When a number N of kinds of foreground identifiers for identifying color information of a foreground of a color image is to be reduced to a number M smaller than the number N, the number of kinds of foreground identifiers corresponding to chromatic colors and the number of kinds of foreground identifiers corresponding to achromatic colors are individually decreased, M binary images respectively corresponding to M kinds of identifiers are generated on the basis of a foreground layer including the M kinds of foreground identifiers, each of the M binary images are subjected to lossless compression, and a background layer is subjected to lossy compression.

The image compressing method of the present invention for compressing a color image consisting of a plurality of pixels, includes, in order to generate M (wherein M is a natural number) binary images respectively corresponding to specific foreground identifiers on the basis of a foreground layer including N (wherein N is a natural number satisfying M<N) kinds of foreground identifiers for identifying color information of respective pixels of a foreground corresponding to a text and/or a line art included in the color image and to compress the M binary images, the steps of reducing or retaining $n_1$ (wherein $n_1$ is an integer satisfying $n_1 \geq 0$) kinds of foreground identifiers for identifying color information expressing chromatic colors to $m_1$ (wherein $m_1$ is an integer satisfying $0 \leq m_1 \leq n_1$); and reducing or retaining $n_2$ (wherein $n_2$ is an integer satisfying $n_2 \geq 0$ and $N = n_1 + n_2$) kinds of foreground identifiers for identifying color information expressing achromatic colors to $m_2$ (wherein $m_2$ is an integer satisfying $0 \leq m_2 \leq n_2$ and $m_1 + m_2 = M$).

In the image compressing method of this invention, a foreground mask representing the respective pixels of the foreground on the basis of the color image is generated; on the basis of the generated foreground mask and the color image, a foreground layer in which color information of the respective pixels of the foreground is replaced with the N kinds of foreground identifiers for identifying color information of the foreground and color information of respective pixels of a background is replaced with a background identifier indicating that the pixels correspond to the background is generated; a table in which color information of the foreground, a foreground identifier for identifying the color information and a number of pixels having the foreground identifier out of all pixels included in the foreground layer are correlated and stored is generated; it is determined whether or not a number of kinds of foreground identifiers stored in the generated table is to be reduced to be smaller than N; the color information stored in the table is classified into the color information of the chromatic colors and the color information of the achromatic colors when it is determined that the number of kinds of foreground identifiers is to be reduced; it is determined, in order to retain or reduce the number $n_1$ of kinds of foreground identifiers for identifying the color information classified as the chromatic colors and the number $n_2$ of kinds of foreground identifiers for identifying the color information classified as the achromatic colors, the number $m_1$ of kinds of foreground identifiers for identifying the color information of the chromatic colors to be attained and the number $m_2$ of kinds of foreground identifiers for identifying the color information of the achromatic colors to be attained; a number of kinds of foreground identifiers stored in the table is reduced to M by retaining or reducing the numbers $n_1$ and $n_2$ of kinds of foreground identifiers for identifying the color information of the chromatic colors and the achromatic colors stored in the table to the numbers $m_1$ and $m_2$; the foreground layer is corrected to a foreground layer in which the number of kinds of foreground identifiers included therein has been reduced in accordance with a relationship between the foreground identifiers obtained before reducing the number of kinds thereof and the foreground identifiers attained after reducing the number of kinds thereof; on the basis of the corrected foreground layer, the M binary images each of which is obtained by binarizing a pixel value of one kind of foreground identifier and pixel values of the other kinds of foreground identifiers are generated correspondingly to the M kinds of foreground identifiers; lossless compression is performed on the generated M binary images; a background layer is generated on the basis of the foreground layer and the color image; and lossy compression is performed on the generated background layer.

The image compressing apparatus of this invention for compressing a color image consisting of a plurality of pixels, includes foreground mask generating means for generating, on the basis of the color image, a foreground mask representing respective pixels of a foreground corresponding to a text and/or a line art included in the color image; foreground layer generating means for generating, on the basis of the foreground mask generated by the foreground mask generating means and the color image, a foreground layer in which color information of the respective pixels of the foreground is replaced with N (wherein N is a natural number) kinds of foreground identifiers for identifying the color information of the foreground and color information of respective pixels of a background is replaced with a background identifier indicating that the pixels correspond to the background; table generating means for generating a table in which color information of the foreground, a foreground identifier for identifying the color information and a number of pixels having the foreground identifier out of all the pixels included in the foreground layer generated by the foreground layer generating means are correlated and stored; reduction determining means for determining whether or not a number of kinds of foreground identifiers stored in the table generated by the table generating means is to be reduced to be smaller than N; chromatic/achromatic color classifying means for classifying the color information stored in the table into color information of chromatic colors and color information of achromatic colors when the reduction determining means determines that the number of kinds of foreground identifiers is to be reduced; number determining means for determining, in order to retain or reduce a number $n_1$ of kinds of foreground identifiers for identifying the color information classified as the chromatic colors by the chromatic/achromatic color classifying means and a number $n_2$ of kinds of foreground identifiers for identifying the color information classified as the achromatic colors by the chromatic/achromatic color classifying means (wherein $n_1$ and $n_2$ are integers satisfying $n_1 \geq 0$, $n_2 \geq 0$ and $N = n_1 + n_2$), a number $m_1$ of kinds of foreground identifiers for identifying the color information of the chromatic colors to be attained and a number $m_2$ of kinds of foreground identifiers for identifying the color information of the achromatic colors to be attained (wherein $m_1$ and $m_2$ are integers satisfying $0 \leq m_1 \leq n_1$, $0 \leq m_2 \leq n_2$ and $0 < m_1 + m_2 < N$); number reducing means for reducing the number of kinds of foreground identifiers stored in the table to M (wherein M is a natural number satisfying $M = m_1 + m_2$) by retaining or reducing the numbers $n_1$ and $n_2$ of kinds of foreground identifiers for identifying the color information of the chromatic colors and the achromatic colors stored in the table to the numbers $m_1$ and $m_2$ determined by the number determining means; foreground layer correcting means for correcting the foreground layer generated by the foreground layer generating means to a foreground layer including foreground identifiers having been reduced in number by the number reducing means; binary image generating means for generating, on the basis of the foreground layer corrected by the foreground layer correcting means, M binary images each of which is obtained by binarizing a pixel value of one kind of foreground identifier and pixel values of the other kinds of foreground identifiers, correspondingly to the M kinds of foreground identifiers; binary image compressing means for performing lossless compression on the M binary images generated by the binary image generating means; background generating means for generating a background layer on the basis of the foreground layer corrected by the foreground layer correcting means or the foreground mask generated by the foreground mask generating means and the color image; and background image compressing means for performing lossy compression on the background layer generated by the background generating means.

The foreground mask generating means generates a foreground mask on the basis of a color image consisting of a plurality of pixels. The generated foreground mask represents pixels of a foreground corresponding to a text and/or a line art included in the color image.

The foreground layer generating means generates a foreground layer on the basis of the foreground mask generated by the foreground mask generating means and the color image. In the generated foreground layer, color information of each pixel of the foreground of the color image is replaced with a foreground identifier, and color information of each pixel of a background of the color image is replaced with a background identifier. A foreground identifier is used for identifying color information of a foreground and there are N kinds of foreground identifiers. At this point, N is a natural number. A background identifier indicates that a corresponding pixel is included in a background. As a result, in the foreground layer generated by the foreground layer generating means, a pixel having a foreground identifier corresponds to the foreground of the color image and a pixel having a background identifier corresponds to the background of the color image.

The table generating means generates a table. In the generated table, color information of the foreground of the color image, a foreground identifier for identifying the color information, and the number of pixels having the foreground identifier in the foreground layer generated by the foreground layer generating means are correlated and stored with to one another. One foreground identifier may be correlated to color information of a foreground pixel of a color image or correlated to color information of a representative color representing colors corresponding to a plurality of color information of foreground pixels of a color image.

The reduction determining means determines whether or not the number of kinds of foreground identifiers stored in the table generated by the table generating means is to be reduced to be smaller than N. When the reduction determining means determines that the number is to be reduced, the chromatic/achromatic color classifying means classifies each color information stored in the table generated by the table generating means into either a chromatic color or an achromatic color. At this point, the number $n_1$ of kinds of foreground identifiers for identifying color information of chromatic colors classified by the chromatic/achromatic color classifying means is an integer satisfying $n_1 \geq 0$, and the number $n_2$ of kinds of foreground identifiers for identifying color information of achromatic colors classified by the chromatic/achromatic color classifying means is an integer satisfying $n_2 \geq 0$. The number N of kinds of foreground identifiers stored in the table generated by the table generating means is a natural number satisfying $N=n_1+n_2$, and therefore, both of the numbers $n_1$ and $n_2$ cannot be "0".

The number determining means determines the number $m_1$ of kinds of foreground identifiers for identifying color information of chromatic colors and the number $m_2$ of kinds of foreground identifiers for identifying color information of achromatic colors. At this point, the number $m_1$ is an integer satisfying $0 \leq m_1 \leq n_1$, the number $m_2$ is an integer satisfying $0 \leq m_2 \leq n_2$ and $0 < m_1 + m_2 < N$. Accordingly, both of the numbers $m_1$ and $m_2$ cannot be "0". Furthermore, when $m_1 = n_1$, $m_2 < n_2$ always holds, and when $m_2 = n_2$, $m_1 < n_1$ always holds. In other words, when the number of kinds of foreground identifiers is reduced from N to M, at least one of the number of kinds of foreground identifiers corresponding to the chromatic colors and the number of kinds of foreground identifiers corresponding to the achromatic colors is reduced. Therefore, even when one of the numbers of kinds of foreground identifiers is reduced with the other number retained, it may be herein designated as reduction of the number of kinds of foreground identifiers.

The number reducing means reduces the number of kinds of foreground identifiers stored in the table generated by the table generating means from N to M, wherein M is a natural number satisfying $M=m_1+m_2$. At this point, the number reducing means retains or reduces the numbers $n_1$ and $n_2$ of kinds of foreground identifiers for identifying color information of chromatic colors and achromatic colors stored in the table generated by the table generating means to the numbers $m_1$ and $m_2$ determined by the number determining means. In this case, when $n_1 > m_1$ (or $n_2 > m_2$), the number of kinds of chromatic colors (or achromatic colors) is reduced, and when $n_1 = m_1$ (or $n_2 = m_2$), the number of kinds of chromatic colors (or achromatic colors) is retained.

In this manner, when the number of kinds of foreground identifiers is reduced from N to M, the number determining means can determine the numbers of kinds of foreground identifiers allowed to remain (namely, the numbers $m_1$ and $m_2$) separately with respect to chromatic colors and achromatic colors. Accordingly, separately with respect to chromatic colors and achromatic colors, the number reducing means executes processing for, for example, merging foreground identifiers or replacing a foreground identifier with a background identifier, so as to reduce the number of kinds of foreground identifiers stored in the table generated by the table generating means from N to M. A foreground identifier to be merged or replaced is generally determined so as to suppress degradation of the image quality attained after the compression as much as possible. As a result, suppression of image quality degradation related to chromatic colors and suppression of image quality degradation related to achromatic colors can be individually considered.

The foreground layer correcting means corrects the foreground layer generated by the foreground layer generating means (namely, the foreground layer including N kinds of foreground identifiers) to a foreground layer including M kinds of foreground identifiers having been reduced in number by the number reducing means. The binary image generating means generates M binary images respectively corresponding to the M kinds of foreground identifiers on the basis of the foreground layer having been corrected by the foreground layer correcting means. Each of the binary images is obtained by binarizing a pixel value of one kind of foreground identifier and pixel values of the other kinds of foreground identifiers. The binary image compressing means performs lossless compression on the M binary images generated by the binary image generating means. The data quantity of M binary images is smaller than that of N binary images, and therefore, the resultant file size can be thus made smaller.

The background generating means generates a background layer on the basis of the foreground layer having been corrected by the foreground layer correcting means and the color image or on the basis of the foreground mask having been generated by the foreground mask generating means and the color image. The background image compressing means performs lossy compression on the background layer generated by the background generating means. A background layer is generally generated on the basis of a foreground mask and a color image.

When the number reducing means reduces the number of kinds of foreground identifiers by merging foreground identifiers, pixels corresponding to the foreground in the foreground mask generated by the foreground mask generating means are identical to pixels corresponding to the foreground in the foreground layer corrected by the foreground layer correcting means. Therefore, no matter whether the background generating means uses the foreground layer corrected by the foreground layer correcting means or the foreground mask generated by the foreground mask generating means, the resultant background layer is the same.

When the number reducing means reduces the number of kinds of foreground identifiers by replacing a foreground identifier with a background identifier, however, part of pixels corresponding to the foreground in the foreground mask generated by the foreground mask generating means corresponds to the background in the foreground layer corrected by the foreground layer correcting means. In other words, the foreground mask generated by the foreground mask generating means is not affected by the result of the reduction of the identifiers performed by the number reducing means. If the foreground mask generated by the foreground mask generating means is to be affected by the result of replacement of identifiers performed by the number reducing means, necessary processing is complicated. Accordingly, in this case, the background generating means uses the foreground layer corrected by the foreground layer correcting means for generating the background layer. As a result, a background layer affected by the result of the replacement of identifiers performed by the number reducing means can be easily generated.

In the image compressing apparatus of this invention, when $n_1 \geq 3$ and $n_1 > m_1 \geq 2$, the number reducing means includes color difference calculating means for calculating, on the basis of the color information correlated to the foreground identifiers corresponding to the chromatic colors stored in the table generated by the table generating means, a color difference between colors expressed by every combination of color information; chromatic color combining means for calculating a combination of foreground identifiers having a smallest color difference obtained by the color difference calculating means; and chromatic color merging means for comparing numbers of pixels having the combination of foreground identifiers obtained by the chromatic color combining means by referring to the table, and for merging one of the foreground identifiers to the other foreground identifier when the numbers of pixels are the same and merging one of the foreground identifiers corresponding to a smaller number of pixels to the other foreground identifier corresponding to a larger number of pixels when the numbers of pixels are different, and calculation by the chromatic color combining means and mergence by the chromatic color merging means are repeatedly executed with a foreground identifier invalidated through the mergence removed until a number of kinds of foreground identifiers corresponding to the chromatic colors becomes equal to the number $m_1$ as a result of the mergence by the chromatic color merging means, and the foreground layer correcting means replaces the foreground identifiers obtained before the mergence and included in the foreground layer generated by the foreground layer generating means with foreground identifiers attained through the mergence in accordance with a relationship between the $n_1$ kinds of foreground identifiers obtained before reducing the number by the number reducing means and the $m_1$ kinds of foreground identifiers attained after reducing the number by the number reducing means.

A case where $n_1 > m_1$ corresponds to a case where the number $n_1$ is reduced to the number $m_1$. The color difference calculating means calculates a color difference between colors corresponding to every combination of color information on the basis of color information respectively correlated to foreground identifiers corresponding to chromatic colors stored in the table generated by the table generating means. When a color difference is small, the combination of chromatic colors may be regarded as similar colors.

Therefore, the chromatic color combining means calculates a combination of foreground identifiers having a smallest color difference calculated by the color difference calculating means. A combination of foreground identifiers calculated at this point is a combination of foreground identifiers corresponding to similar chromatic colors. Therefore, even when the foreground identifiers of the calculated combination are merged, the resultant image quality is not largely degraded. For further suppressing the degradation of the image quality, a foreground identifier corresponding to a smaller number of pixels is preferably merged into a foreground identifier corresponding to a larger number of pixels. When the numbers of pixels are the same, however, the influence on the image quality is the same no matter which foreground identifier is merged into the other foreground identifier.

The chromatic color merging means merges foreground identifiers to each other by referring to the table generated by the table generating means. At this point, the chromatic color merging means compares the numbers of pixels having the combination of foreground identifiers obtained by the chromatic color combining means, and when the numbers of pixels are the same, the chromatic color merging means merges one of the foreground identifiers into the other foreground identifier, and when the numbers of pixels are different, it merges one of the foreground identifiers corresponding to a smaller number of pixels into the other foreground identifier corresponding to a larger number of pixels. As a result of the mergence performed by the chromatic color merging means, the number of kinds of foreground identifiers corresponding to the chromatic colors is reduced by one as compared with the number obtained before the mergence. The thus reduced one kind of foreground identifier is regarded as an invalid foreground identifier, and the calculation by the chromatic color combining means and the mergence by the chromatic color merging means are repeatedly executed with a foreground identifier invalidated through the mergence removed until the number of kinds of foreground identifiers is reduced to be equal to the number $m_1$.

The number $n_1$ of kinds of foreground identifiers obtained before the reduction is 3 or more, and the number $m_1$ of kinds of foreground identifiers attained after the reduction is 2 or more. In other words, the number $m_1$ attained through the reduction by the mergence cannot be 1. Therefore, it is possible to prevent mergence of colors not similar to each other (such as red and blue) so as not to largely degrade the image quality.

The foreground layer correcting means replaces a foreground identifier obtained before the mergence and included in the foreground layer generated by the foreground layer generating means with a foreground identifier attained after the mergence in accordance with a relationship between the $n_1$ kinds of foreground identifiers obtained before reducing the number by the number reducing means and the $m_1$ kinds of foreground identifiers attained after reducing the number by the number reducing means. Thus, the foreground layer correcting means corrects the foreground layer including the N kinds of foreground identifiers to the foreground layer including the M kinds of foreground identifiers.

In the image compressing apparatus of this invention, the number reducing means further includes chromatic color coefficient calculating means for obtaining a coefficient in accordance with luminosity of a color expressed by color information correlated to the foreground identifier of each chromatic color, and the color difference calculating means calculates a color difference by multiplying an actual color difference between colors by the coefficient obtained by the chromatic color coefficient calculating means.

The chromatic color coefficient calculating means obtains a coefficient in accordance with the luminosity of a color expressed by color information correlated to the foreground identifier of each chromatic color stored in the table generated by the table generating means. The luminosity is a psychological physical quantity indicating the brightness of a color, and a color with high luminosity easily catches eyes of people. Therefore, when colors with low luminosity are with priority merged with colors with high luminosity allowed to remain if possible, visual unease derived from the degradation of the image quality can be reduced.

Accordingly, the color difference calculating means calculates a color difference by multiplying an actual color difference between colors expressed by two kinds of color information by a coefficient obtained by the chromatic color coefficient calculating means, and the chromatic color combining means calculates a combination of foreground identifiers having a smallest color difference calculated by the color difference calculating means. A combination of foreground identifiers calculated at this point is a combination of foreground identifiers corresponding to similar chromatic colors with low luminosity.

In the image compressing apparatus of this invention, when $n_2 \geq 3$ and $n_2 > m_2 \geq 2$, the number reducing means include luminance difference calculating means for calculating, on the basis of the color information correlated to the foreground identifiers corresponding to the achromatic colors stored in the table generated by the table generating means, a luminance difference between colors expressed by every combination of color information; achromatic color combining means for calculating a combination of foreground identifiers having a smallest luminance difference obtained by the luminance difference calculating means; and achromatic color merging means for comparing numbers of pixels having the combination of foreground identifiers obtained by the achromatic color combining means by referring to the table, and for merging one of the foreground identifiers into the other foreground identifier when the numbers of pixels are the same and merging one of the foreground identifiers corresponding to a smaller number of pixels into the other foreground identifier corresponding to a larger number of pixels when the numbers of pixels are different, and calculation by the achromatic color combining means and mergence by the achromatic color merging means are repeatedly executed with a foreground identifier invalidated through the mergence removed until a number of kinds of foreground identifiers corresponding to the achromatic colors becomes equal to the number $m_2$ as a result of the mergence by the achromatic color merging means, and the foreground layer correcting means replaces the foreground identifiers obtained before the mergence and included in the foreground layer generated by the foreground layer generating means with foreground identifiers attained through the mergence in accordance with a relationship between the $n_2$ kinds of foreground identifiers obtained before reducing the number by the number reducing means and the $m_2$ kinds of foreground identifiers attained after reducing the number by the number reducing means.

A case where $n_2 > m_2$ corresponds to a case where the number $n_2$ is reduced to the number $m_2$. The luminance difference calculating means calculates a luminance difference between colors corresponding to every combination of color information on the basis of color information respectively correlated to foreground identifiers corresponding to achromatic colors stored in the table generated by the table generating means. When a luminance difference is small, the combination of achromatic colors may be regarded as similar colors.

Therefore, the achromatic color combining means calculates a combination of foreground identifiers having a smallest luminance difference calculated by the luminance difference calculating means. A combination of foreground identifiers calculated at this point is a combination of foreground identifiers corresponding to similar achromatic colors. Therefore, even when the foreground identifiers of the calculated combination are merged, the resultant image quality is not largely degraded. For further suppressing the degradation of the image quality, a foreground identifier corresponding to a smaller number of pixels is preferably merged into a foreground identifier corresponding to a larger number of pixels. When the numbers of pixels are the same, however, the influence on the image quality is the same no matter which foreground identifier is merged into the other foreground identifier.

The achromatic color merging means merges foreground identifiers to each other by referring to the table generated by the table generating means. At this point, the achromatic color merging means compares the numbers of pixels having the combination of foreground identifiers obtained by the achromatic color combining means, and when the numbers of pixels are the same, the achromatic color merging means merges one of the foreground identifiers into the other foreground identifier, and when the numbers of pixels are different, it merges one of the foreground identifiers corresponding to a smaller number of pixels into the other foreground identifier corresponding to a larger number of pixels. As a result of the mergence performed by the achromatic color merging means, the number of kinds of foreground identifiers corresponding to the achromatic colors is reduced by one as compared with the number obtained before the mergence. The thus reduced one kind of foreground identifier is regarded as an invalid foreground identifier, and the calculation by the achromatic color combining means and the mergence by the achromatic color merging means are repeatedly executed with a foreground identifier invalidated through the mergence removed until the number of kinds of foreground identifiers is reduced to be equal to the number $m_2$.

The number $n_2$ of kinds of foreground identifiers obtained before the reduction is 3 or more, and the number $m_2$ of kinds of foreground identifiers attained after the reduction is 2 or more. In other words, the number $m_2$ attained through the reduction by the mergence cannot be 1. Therefore, it is possible to prevent mergence of colors not similar to each other (such as white and black) so as not to largely degrade the image quality.

The foreground layer correcting means replaces a foreground identifier obtained before the mergence and included in the foreground layer generated by the foreground layer generating means with a foreground identifier attained after the mergence in accordance with a relationship between the $n_2$ kinds of foreground identifiers obtained before reducing the number by the number reducing means and the $m_2$ kinds of foreground identifiers attained after reducing the number by the number reducing means. Thus, the foreground layer correcting means corrects the foreground layer including the N kinds of foreground identifiers to the foreground layer including the M kinds of foreground identifiers.

In the image compressing apparatus of this invention, the number reducing means further includes achromatic color coefficient calculating means for obtaining a coefficient in accordance with luminosity of a color expressed by color information correlated to the foreground identifier of each achromatic color, and the luminance difference calculating means calculates a luminance difference by multiplying an actual luminance difference between colors by the coefficient obtained by the achromatic color coefficient calculating means.

The achromatic color coefficient calculating means obtains a coefficient in accordance with the luminosity of a color expressed by color information correlated to the foreground identifier of each achromatic color stored in the table generated by the table generating means. The luminosity is a psychological physical quantity indicating the brightness of a color, and a color with high luminosity easily catches eyes of people. Therefore, when colors with low luminosity are with priority merged with colors with high luminosity allowed to remain if possible, visual unease derived from the degradation of the image quality can be reduced.

Accordingly, the luminance difference calculating means calculates a luminance difference by multiplying an actual luminance difference between colors expressed by two kinds of color information by a coefficient obtained by the achromatic color coefficient calculating means, and the achromatic color combining means calculates a combination of foreground identifiers having a smallest luminance difference calculated by the luminance difference calculating means. A combination of foreground identifiers calculated at this point is a combination of foreground identifiers corresponding to similar achromatic colors with low luminosity.

In the image compressing apparatus of this invention, the reduction determining means determines to reduce the number of kinds of foreground identifiers to be smaller than N when the number N of kinds of foreground identifiers is larger than a predetermined number P (wherein P is a natural number).

The reduction determining means determines to reduce the number of kinds of foreground identifiers to be smaller than N when the number N of kinds of foreground identifiers is larger than the predetermined number P. Therefore, it is easily determined whether or not the number of kinds of foreground identifiers is to be reduced. At this point, P is a natural number, and when the number N of kinds of foreground identifiers is larger than the number P, the file size attained after the compression is too large if the number of kinds of foreground identifiers remains N. On the other hand, when the number N of kinds of foreground identifiers is not more than the number P, the file size attained after the compression is sufficiently small even if the number of kinds of foreground identifiers remains N.

In the image compressing apparatus of this invention, P=M, and the number determining means determines the numbers $m_1$ and $m_2$ in such a manner that a ratio of the number $n_1$ to the number N and a ratio of the number $m_1$ to the number M substantially accord with each other and that a ratio of the number $n_2$ to the number N and a ratio of the number $m_2$ to the number M substantially accord with each other.

The predetermined number P is equal to the number M of kinds of foreground identifiers attained after the reduction. In this case, the number determining means determines the numbers $m_1$ and $m_2$ so that the ratio of the number $n_1$ to the number N and the ratio of the number $m_1$ to the number M can substantially accord with each other (namely, $m_1/M \approx n_1/N$) and that the ratio of the number $n_2$ to the number N and the ratio of the number $m_2$ to the number M can substantially accord with each other (namely, $m_2/M \approx n_2/N$).

In the image compressing apparatus of this invention, in order to merge achromatic colors with priority to chromatic colors, the number determining means performs a calculation of $m_1 = M \times n_2/N$ for determining the number $m_1$ with rounding up to the nearest whole number or performs a calculation of $m_2 = M \times n_2/N$ for determining the number $m_2$ with rounding up to the nearest whole number.

The number determining means obtains the number $m_1$ in accordance with an expression (M1) described below and obtains the number $m_2$ in accordance with an expression (M2) described below. Since the number $m_1$ is a natural number, if the calculation result of the expression (M1) is not a natural number, fractions of the quotient may be rounded off, rounded upward or discarded.

$$m_1 = M \times n_1/N \tag{M1}$$

$$m_2 = M - m_1 \tag{M2}$$

Alternatively, the number determining means obtains the number $m_2$ in accordance with an expression (M3) described below and obtains the number $m_1$ in accordance with an expression (M4) described below. Since the number $m_2$ is a natural number, if the calculation result of the expression (M3) is not a natural number, fractions of the quotient may be rounded off, rounded upward or discarded.

$$m_2 = M \times n_2/N \tag{M3}$$

$$m_1 = M - m_2 \tag{M4}$$

When the numbers $m_1$ and $m_2$ attained after the reduction are thus determined, the numbers $m_1$ and $m_2$ can be affected by the numbers $n_1$ and $n_2$ obtained before the reduction, namely, the numbers of chromatic colors and achromatic colors included in the foreground. Accordingly, the degradation of the image quality can be suppressed. In this invention, achromatic colors are merged with priority to chromatic colors. In other words, chromatic colors are allowed to remain with priority to achromatic colors. Therefore, the number determining means rounds up to the nearest whole number in the calculation of the expression (M1) for determining the number $m_1$, or rounds up to the nearest whole number in the calculation of the expression (M3) for determining the number $m_2$.

Accordingly, a reduced number of the number of kinds of foreground identifiers corresponding to chromatic colors (namely, a calculation result obtained by subtracting the number $m_1$ from the number $n_1$) is larger by "1" in the case where the fractions are rounded up in the calculation of the expression (M1) or discarded in the calculation of the expression (M3) than in the case where the fractions are discarded in the calculation of the expression (M1) or rounded up in the calculation of the expression (M3). In other words, chromatic colors are allowed to remain with priority. Similarly, a reduced number of the number of kinds of foreground identifiers corresponding to achromatic colors (namely, a calculation result obtained by subtracting the number $m_2$ from the number $n_2$) is smaller by "1" in the case where the fractions are rounded up in the calculation of the expression (M1) or discarded in the calculation of the expression (M3) than in the case where the fractions are discarded in the calculation of the expression (M1) or rounded up in the calculation of the expression (M3). In other words, achromatic colors are merged with priority. Since people tend to pay more attention to chromatic colors than to achromatic colors, the visual unease derived from the degradation of the image quality can be reduced when the numbers $m_1$ and $m_2$ attained after the reduction are thus determined.

In the image compressing apparatus of this invention, the number determining means includes first comparing means for comparing the number $n_1$ with a predetermined number $Q_1$ (wherein $Q_1$ is a natural number satisfying $2 \leq Q_1 < M$) and second comparing means for comparing the number $n_2$ with a predetermined number $Q_2$ (wherein $Q_2$ is a natural number satisfying $2 \leq Q_2 < M$ and $Q_1 + Q_2 \leq M$). The number determining means determines the numbers $m_1$ and $m_2$ in such a manner as to attain $m_1 \geq Q_1$ when the first comparing means obtains a comparison result of $n_1 \geq Q_1$, to attain $m_1 = n_1$ when the comparison result is $n_1 \leq Q_1$, to attain $m_2 \geq Q_2$ when the second comparing means obtains a comparison result of $n_2 > Q_2$, and to attain $m_2 = n_2$ when the comparison result is $n_2 \leq Q_2$.

The first comparing means compares the number $n_1$ with the predetermined number $Q_1$, and the second comparing means compares the number $n_2$ with the predetermined number $Q_2$. At this point, the numbers $Q_1$ and $Q_2$ are natural numbers satisfying $2 \leq Q_1 < M$ and $2 \leq Q_2 < M$, and $Q_1 + Q_2 \leq M < N$.

When the comparison result obtained by the first comparing means is $n_1 > Q_1$, the number $m_1$ of kinds of foreground identifiers corresponding to chromatic colors is sufficiently large, and hence, the number determining means determines the number $m_1$ attained after the reduction so as to be not more than the predetermined number $Q_1$. As a result, the reduced number of kinds of foreground identifiers corresponding to chromatic colors (namely, the result obtained by subtracting the number $m_1$ from the number $n_1$) can be suppressed. If the number of kinds of foreground identifiers corresponding to chromatic colors is excessively large, it is apprehended that the resultant image quality may be degraded. On the other hand, when the comparison result obtained by the first comparing means is $n_1 \leq Q_1$, the number $n_1$ of kinds of foreground identifiers corresponding to chromatic colors is too small, and hence, the number determining means determines the number $m_1$ to be equal to the number $n_1$ (namely, determines to retain the number of kinds of foreground identifiers). As a result, in the case where, for example, red and blue alone are included as chromatic colors in the foreground of a color image, the red and the blue are not merged, so as to suppress large degradation of the image quality.

When the comparison result obtained by the second comparing means is $n_2 > Q_2$, the number $n_2$ of kinds of foreground identifiers corresponding to achromatic colors is sufficiently large, and therefore, the number determining means determines the number $m_2$ attained after the reduction so as not to be smaller than the predetermined number $Q_2$. As a result, the reduced number of the number of kinds of foreground identifiers corresponding to achromatic colors (namely, the result obtained by subtracting the number $m_2$ from the number $n_2$) can be suppressed. If the number of kinds of foreground identifiers corresponding to achromatic colors is excessively large, it is apprehended that the resultant image quality may be degraded. On the other hand, when the comparison result obtained by the second comparing means is $n_2 \leq Q_2$, the number $n_2$ of kinds of foreground identifiers corresponding to achromatic colors is too small, and hence, the number determining means determines the number $m_2$ to be equal to the number $n_2$ (namely, determines to retain the number of kinds of foreground identifiers). As a result, in the case where, for example, black and white alone are included as achromatic colors in the foreground of a color image, the black and the white are not merged, so as to suppress large degradation of the image quality.

The image forming apparatus of this invention includes the aforementioned image compressing apparatus and image forming means for forming an image on a recording sheet.

In the image compression apparatus, the file size attained after compression can be sufficiently small while suppressing large degradation of image quality attained after the compression, and therefore, the image forming apparatus can store a compressed image with a small file size or can form, on a recording sheet, a high quality color image obtained by decompressing a compressed image.

According to the present invention, a recording medium records a computer program that realizes, in the form of software, the foreground mask generating means, the foreground layer generating means, the table generating means and the like of the aforementioned image compressing apparatus by using hardware components of a computer. The recording medium of this invention may record an image processing program into which the image compression process performed by the aforementioned image compressing apparatus is incorporated. Furthermore, according to the recording medium of this invention, convenience in distribution, storage and the like of a computer program for allowing a computer to function as the aforementioned image compressing apparatus can be improved.

According to image compression of the present invention, the number of kinds of foreground identifiers can be reduced from N to M with distinction of chromatic colors and achromatic colors. Therefore, image quality degradation caused through compression derived from change from a chromatic color to an achromatic color or vice versa can be prevented. Accordingly, as compared with the case where the number of kinds of foreground identifiers is reduced without distinction of chromatic colors and achromatic colors, the file size attained after the compression can be sufficiently small while suppressing large degradation of image quality through the compression. Furthermore, since the number of binary images is also reduced correspondingly to the reduction of the number of kinds of foreground identifiers, time necessary for transferring M binary images and time necessary for compressing the M binary images can be both reduced.

The above and further objects and features of the invention will more fully be apparent from the following detailed description with accompanying drawings.

BRIEF DESCRIPTION OF THE SEVERAL VIEWS OF THE DRAWINGS

FIG. 3 is a schematic diagram of an exemplary color image subjected to an image compression process in the compression process section of the image forming apparatus of Embodiment 1;

FIG. 4 is a schematic diagram of an exemplary foreground mask generated by the compression process section included in the image forming apparatus of Embodiment 1;

FIG. 6 is a schematic diagram of an exemplary generated foreground layer generated by the compression process section included in the image forming apparatus of Embodiment 1;

FIG. 7 is a schematic diagram of an exemplary generated IC table corresponding to the generated foreground layer of FIG. 6;

FIG. 8 is a schematic diagram of an exemplary binary image corresponding to a foreground identifier "3" generated based on the generated foreground layer of FIG. 6;

FIG. 9 is a schematic diagram of an exemplary binary image corresponding to a foreground identifier "8" generated based on the generated foreground layer of FIG. 6;

FIGS. 10A and 10B are schematic diagrams of exemplary color information tables used for calculating similar colors;

FIG. 11 is a schematic diagram of an exemplary color difference calculation result table obtained based on the color information tables of FIGS. 10A and 10B;

FIG. 12 is a schematic diagram of an exemplary corrected foreground layer obtained by correcting the generated foreground layer of FIG. 6;

FIG. 13 is a schematic diagram of another exemplary corrected foreground layer obtained by correcting the generated foreground layer of FIG. 6;

FIG. 14 is a schematic diagram of an exemplary corrected IC table corresponding to the corrected foreground layer of FIG. 12;

FIG. 15 is a schematic diagram of an exemplary corrected IC table corresponding to the corrected foreground layer of FIG. 13;

FIG. 16 is a schematic diagram of an exemplary binary image generated based on the corrected foreground layer of FIG. 12;

DETAILED DESCRIPTION

The present invention will now be described in detail with reference to the accompanying drawing illustrating preferred embodiments.

Embodiment 1

Figure 1:
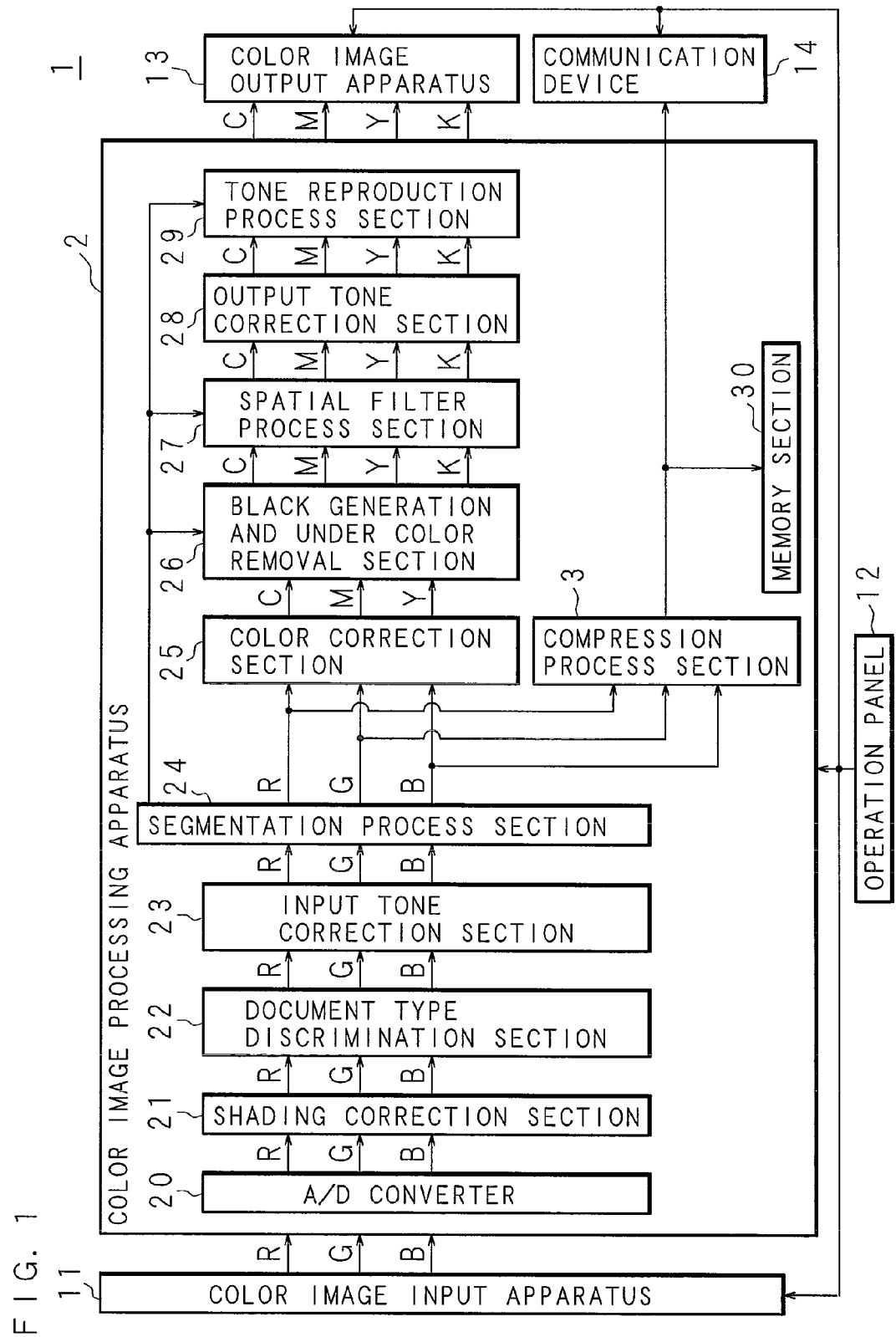
FIG. 1 is a block diagram illustrating the internal functional configuration of an image forming apparatus according to Embodiment 1.

The present embodiment exemplarily describes an image compressing apparatus included as a part in an image forming apparatus. FIG. 1 is a block diagram illustrating the internal functional configuration of an image forming apparatus 1 according to Embodiment 1 of the invention. The image forming apparatus 1 is a digital multi-function printer having a color copier function, a color scanner function and the like. The image forming apparatus 1 includes a color image input apparatus 11 for optically reading a color image from a document.

The color image input apparatus 11 is connected to a color image processing apparatus 2 for generating image data and a compression file of the read color image. The color image processing apparatus 2 is connected to a color image output apparatus 13 for outputting a color image on the basis of the image data generated by the color image processing apparatus 2 and to a communication device 14 for externally transmitting the compression file generated by the color image processing apparatus 2. The color image input apparatus 11, the color image processing apparatus 2, the color image output apparatus 13 and the communication device 14 are connected to an operation panel 12.

The operation panel 12 includes an operation unit of setting buttons, ten keys and the like used by a user for setting an operation mode of the image forming apparatus 1 and a display unit of a liquid crystal display or the like. Various processes executed in the image forming apparatus 1 are controlled by a CPU (Central Processing Unit) not shown. The CPU of the image forming apparatus 1 performs data communication through a network card and a LAN cable not shown with computers and other digital multi-function printers connected to a network.

The respective components of the image forming apparatus 1 will now be described in detail. The color image input apparatus 11 includes a color scanner having, for example, a CCD (Charge Coupled Device), and reads a reflected light image from a document as analog signal of RGB (R: red, G: green and B: blue) by using the CCD and outputs the analog signals to the color image processing apparatus 2.

The color image processing apparatus 2 executes, on the RGB analog signals inputted from the color image input apparatus 11, image processing described below by using an A/D converter 20, a shading correction section 21, a document type discrimination section 22, an input tone correction section 23 and a segmentation process section 24, so as to generate image data of RGB digital signals (hereinafter referred to as the RGB signals). In the following description, the intensity of an RGB signal is expressed as RGB values (r, g, b).

Furthermore, the color image processing apparatus 2 executes, on the RGB signals outputted from the segmentation process section 24, image processing described below by using a color correction section 25, a black generation and under color removal section 26, a spatial filter process section 27, an output tone correction section 28 and a tone reproduction process section 29, so as to generate image data of digital signals of CMYK (C: cyan, M: magenta, Y: yellow and K: black), and outputs the generated data as a stream to the color image output apparatus 13. Incidentally, the image data may be temporarily stored in a memory section 30 before being outputted to the color image output apparatus 13. The memory section 30 is a nonvolatile storage (such as a hard disk).

The color image output apparatus 13 forms a color image on a recording sheet (such as a recording paper) on the basis of the image data inputted from the color image processing apparatus 2 by a thermal transfer method, an electrophotographic method, an inkjet method or the like. The color image output apparatus 13 functions as an image forming unit of the invention. It is noted that the image forming apparatus 1 may include, instead of the color image output apparatus 13, a monochrome image output apparatus for outputting a monochrome image formed on a recording sheet. In this case, image data of a color image is converted into image data of a monochrome image in the color image processing apparatus 2 before being outputted to the monochrome image output apparatus.

Furthermore, the color image processing apparatus 2 executes, on the RGB signals outputted by the segmentation process section 24, an image compression process of this embodiment by using a compression process section 3, so as to generate a compression file containing image data of a compressed color image and output the generated compression file to the communication device 14. The compression process section 3 functions as an image compressing apparatus of the invention. Incidentally, a compression file may be temporarily stored in the memory section 30 before being outputted to the communication device 14.

The communication device 14 is connectable to a communication network not shown such as a public line network, a LAN (Local Area Network) or the Internet, and transmits a compression file to the outside through the communication network by employing a communication method of facsimile, an e-mail or the like. When, for example, a "scan to e-mail" mode is selected in the operation panel 12, a compression file is attached to an e-mail by the communication device 14 using a network card, a modem or the like to be transmitted to a set destination. In the case where facsimile transmission is performed, the CPU of the image forming apparatus 1 proceeds a communication procedure by using the communication device 14 including a modem, and when a state ready for sending is attained, it successively transmits a compression file to a destination through a communication circuit while subjecting the compression file to necessary processing for converting a compression format or the like.

The color image processing apparatus 2 subjects the received compression file to a decompression process by using a compression/decompression process section not shown. Image data of a color image obtained by decompressing the compression file is subjected to a rotation process and/or a resolution conversion process if necessary by a processing unit not shown, is subjected to output tone correction by the output tone correction section 28, and is subjected to a tone reproduction process by the tone reproduction process section 29. The image data of the color image having been subjected to the various image processing is outputted to the color image output apparatus 13, and the color image output apparatus 13 forms a color image on a recording sheet.

Now, the image processing and the compression process performed in the color image processing apparatus 2 will be described in detail. The A/D converter 20 receives RGB analog signals inputted from the color image input apparatus 11 to the color image processing apparatus 2, converts the RGB analog signals to RGB digital signals (namely, RGB signals) and outputs the converted RGB signals to the shading correction section 21. The shading correction section 21 performs, on the RGB signals inputted from the A/D converter 20, a process for removing various distortions caused in a lighting system, an image focusing system and an image sensing system of the color image input apparatus 11. Subsequently, the shading correction section 21 outputs the RGB signals from which the distortions have been removed to the document type discrimination section 22.

The document type discrimination section 22 converts the RGB signals inputted from the shading correction section 21 (namely, reflectance signals of RGB) into RGB signals that can be dealt with in the color image processing apparatus 2 (such as density signals of RGB) and executes a document type discrimination process for discriminating a document mode such as a text, a printed picture, a photograph or the like. When the document type discrimination process is manually set by a user with the operation panel 12, the document type discrimination section 22 directly outputs the RGB signals inputted from the shading correction section 21 to the input tone correction section 23 disposed at the following stage. The result of the document type discrimination process affects image processing subsequently performed.

The input tone correction section 23 subjects the RGB signals inputted from the document type discrimination section 22 to an image quality adjustment process such as adjustment of color balance, removal of background color (background density) and adjustment of contrast, and outputs the resultant to the segmentation process section 24. The segmentation process section 24 separates respective pixels of an image represented by the RGB signals inputted from the input tone correction section 23 into a text segment, a halftone segment and a photograph segment. Also, the segmentation process section 24 outputs, on the basis of the result of the separation, a segmentation class signal representing which segment each pixel corresponds to the black generation and under color removal section 26, the spatial filter process section 27 and the tone reproduction process section 29. Furthermore, the segmentation process section 24 outputs the RGB signals inputted from the input tone correction section 23 directly to the color correction section 25 and the compression process section 3 disposed at the subsequent stage.

The color correction section 25 converts the RGB signals inputted from the segmentation process section 24 into CMY digital signals (hereinafter simply referred to as CMY signals) and performs, for reproducing colors with fidelity, a process for removing color impurity on the basis of the spectral characteristics of color materials of CMY including unnecessary absorbed components. Subsequently, the color correction section 25 outputs the CMY signals having been subjected to color correction to the black generation and under color removal section 26. The black generation and under color removal section 26 performs, on the basis of the CMY signals inputted from the color correction section 25, a black generation process for generating black (K) signals from the CMY signals and a process for generating new CMY signals by subtracting the K signals obtained through the black generation from the original CMY signals. As a result, the CMY three-color digital signals are converted into CMYK four-color digital signals (hereinafter simply referred to as CMYK signals). Subsequently, the black generation and under color removal section 26 outputs the CMYK signals obtained by converting the CMY signals to the spatial filter process section 27.

As an example of the black generation process, a method for generating black by using skeleton black is employed in general. In this method, assuming that the input/output characteristic of a skeleton curve is $y=f(x)$, that input data are C, M and Y, that output data are C', M', Y' and K', and that a UCR (Under Color Removal) ratio is a $(0<\alpha<1)$, a black generation and under color removal process is executed in accordance with the following expressions (M5) through (M8):

$$K'=f(\min(C,M,Y)) \quad (M5)$$

$$C'=C-\alpha K' \quad (M6)$$

$$M'=M-\alpha K' \quad (M7)$$

$$Y'=Y-\alpha K' \quad (M8)$$

At this point, the UCR ratio α (wherein 0<α<1) is a ratio of CMY reduced by replacing, with K, a portion where CMY overlap. The expression (M5) indicates that a K signal is generated in accordance with the minimum signal intensity out of all the signal intensities of CMY.

The spatial filter process section 27 performs, for correcting the spatial frequency characteristic, a spatial filtering process on image data of the CMYK signals inputted from the black generation and under color removal section 26 by using a digital filter on the basis of the segmentation class signal inputted from the segmentation process section 24, so as to prevent blur and graininess degradation of the image. For example, in a region separated as a text segment by the segmentation process section 24, the spatial filter process section 27 performs the spatial filter process by using a filter for sharpening a high frequency component so as to improve the reproducibility of a text. Alternatively, in a region separated as a halftone segment by the segmentation process section 24, the spatial filter process section 27 performs a low-pass filtering process for removing an input halftone component. Subsequently, the spatial filter process section 27 outputs the CMYK signals having been processed to the output tone correction section 28.

The output tone correction section 28 performs, on the CMYK signals inputted from the spatial filter process section 27, an output tone correction process on the basis of a halftone area ratio, that is, a characteristic value of the color image output apparatus 13, and outputs the CMYK signals having been subjected to the output tone correction process to the tone reproduction process section 29. The tone reproduction process section 29 performs, on the CMYK signals inputted from the output tone correction section 28, a halftone process in accordance with a segment on the basis of the segmentation class signal inputted from the segmentation process section 24. For example, in a region separated as a text segment by the segmentation process section 24, the tone reproduction process section 29 performs a binarization process or a multi-level dithering process with a high resolution screen suitable for reproducing a high frequency component. Alternatively, in a region separated as a halftone segment by the segmentation process section 24, the tone reproduction process section 29 performs a binarization process or a multi-level dithering process with a screen suitable for tone reproduction. Subsequently, the tone reproduction process section 29 outputs the image data having been processed to the color image output apparatus 13.

The compression process section 3 generates a compression file by employing an image compressing method of this embodiment on the basis of the image data of the RGB signals inputted from the segmentation process section 24. The image data of the color image inputted to the compression process section 3 includes a plurality of pixels arranged in the form of a matrix. The image data is separated into a foreground layer and a background layer, the foreground layer is further separated into binary images, each of the binary images is subjected to lossless compression by, for example, the MMR, and the background layer is subjected to lossy compression by, for example, the JPEG. Ultimately, the binary images having been subjected to the lossless compression, the background layer having been subjected to the lossy compression and decompression information for decompressing these data into image data of a color image are brought into one file. This file corresponds to a compression file. Also, as the decompression information, information representing a compressing method, an index color table (hereinafter referred to as an IC table) or the like is used.

This compression file has a smaller file size and is suppressed in degradation of image quality as compared with the case where image data of a color image is directly compressed or a foreground layer and a background layer are respectively compressed. In addition, there is no need to provide three or more kinds of compressing means but one kind of lossless compressing means for binary images and one kind of lossy compressing means for a background layer alone may be provided.

Figure 2:
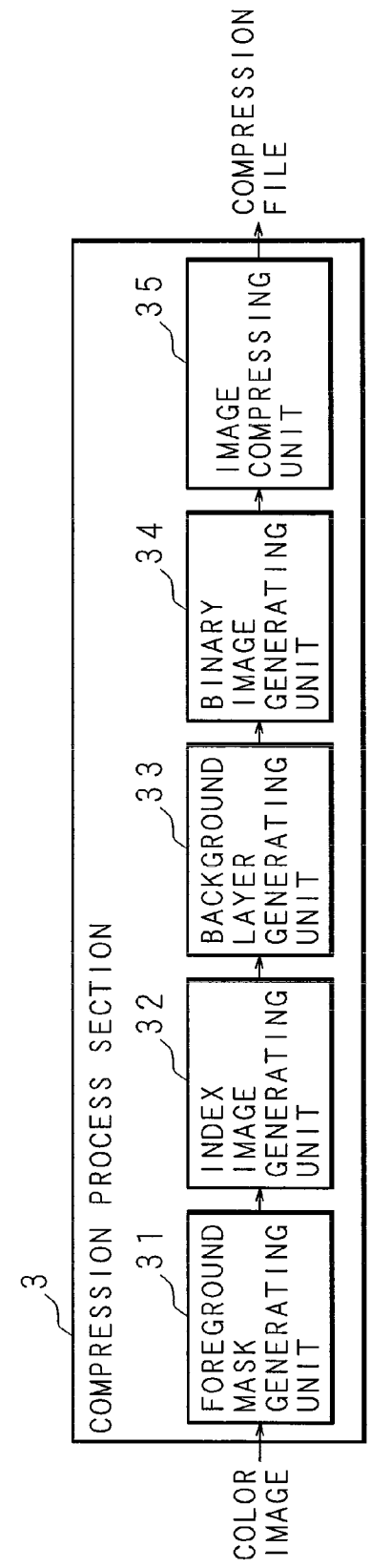
FIG. 2 is a block diagram illustrating the internal configuration of a compression process section included in the image forming apparatus of Embodiment 1.

FIG. 2 is a block diagram illustrating the internal configuration of the compression process section 3. The compression process section 3 includes a foreground mask generating unit 31 and an index image generating unit 32 that functions as a foreground layer generating unit, a table generating unit, a reduction determining unit, a chromatic/achromatic color classifying unit, a number determining unit, a number reducing unit and a foreground layer correcting unit of the invention. The compression process section 3 also includes a background layer generating unit 33 functioning as a background generating unit of the invention, a binary image generating unit 34, and an image compressing unit 35 functioning as a binary image compressing unit and a background image compressing unit of the invention.

Now, the respective units included in the compression process section 3 will be described in detail. The foreground mask generating unit 31 is supplied with image data of one color image inputted from the segmentation process section 24 to the compression process section 3. The foreground mask generating unit 31 generates, on the basis of the supplied image data of the color image, one foreground mask representing pixels of a foreground corresponding to a text and/or a line art included in the color image. For example, in the foreground mask generating unit 31, luminance values of respective pixels of the image data of the color image are differentiated so as to detect an edge region where the luminance is increased to be bright and an edge region where the luminance is decreased to be dark. Pixels determined to correspond to the foreground based on the detected edge regions are provided with a pixel value of "0", and pixels determined to correspond to the background are provided with a pixel value of "1".

The foreground mask generating unit 31 outputs the generated foreground mask and the image data of the color image to the index image generating unit 32. Incidentally, the compression process section 3 may receive a segmentation class signal from the segmentation process section 24 so that the foreground mask generating unit 31 may determine that a pixel included in a text segment represented by the segmentation class signal corresponds to the foreground.

FIG. 3 is a schematic diagram of an exemplary color image subjected to the image compression process in the compression process section 3. FIG. 4 is a schematic diagram of an exemplary foreground mask generated by the compression process section 3. FIG. 3 exemplarily illustrates one color image. The image data of such a color image is inputted to the compression process section 3, and the inputted image data is directly supplied to the foreground mask generating unit 31.

The color image of FIG. 3 is formed on a white recording sheet with color inks or color toners of black, red, green, blue, violet, light blue and the like. The color image includes thick characters of "TEST" respectively colored with light blue, red, violet and blue and drawn in a rectangular area filled in with green; a sentence of small characters of "This is a test image." colored with black on the white ground; and a colorful landscape picture. Among these components, the word "TEST" and the sentence "This is a test image." correspond to a foreground, and the rest corresponds to a background. In other words, the area filled in with green, the landscape picture and a bare portion of the white ground are all the background. Pixels included in such a color image have, as pixel values, multivalued color information for directly expressing a plurality of colors (of, for example, 256 colors).

FIG. 4 exemplarily illustrates one foreground mask generated on the basis of the color image illustrated in FIG. 3. In a foreground mask, a foreground pixel and a background pixel have different pixel values. In the foreground mask illustrated in FIG. 4, the foreground is expressed with white alone and the background is expressed with black (hatched in the drawing) alone. Pixels of such a foreground mask have binary pixel values, and specifically, each pixel of the foreground has a pixel value of "0" and each pixel of the background has a pixel value of "1". Accordingly, in the foreground mask, it is easy to find a pixel with a pixel value of "0" as a foreground pixel and a pixel with a pixel value of "1" as a background pixel.

The index image generating unit 32 of FIG. 2 generates a foreground layer and an IC table by a known method on the basis of the foreground mask and the image data of the color image inputted from the foreground mask generating unit 31, and corrects the foreground layer and the IC table as described later if necessary. Hereinafter, an IC table and a foreground layer generated on the basis of image data of a color image and a foreground mask are designated respectively as a generated IC table and a generated foreground layer, and an IC table and a foreground layer obtained by correcting a generated IC table and a generated foreground layer are designated respectively as a corrected IC table and a corrected foreground layer. Furthermore, when there is no need to distinguish a generated IC table and a generated foreground layer from a corrected IC table and a corrected foreground layer, they are simply designated as an IC table and a foreground layer.

When the generated foreground layer and the generated IC table are not corrected, the index image generating unit 32 of this embodiment outputs the generated foreground layer, the generated IC table, the foreground mask and the image data of the color image to the background layer generating unit 33. On the other hand, when the generated foreground layer and the generated IC table are corrected, the index image generating unit 32 of this embodiment outputs the corrected foreground layer, the corrected IC table, the foreground mask and the image data of the color image to the background layer generating unit 33.

The background layer generating unit 33 of FIG. 2 generates a background layer by a known method on the basis of the foreground mask and the image data of the color image inputted from the index image generating unit 32. Subsequently, the background layer generating unit 33 outputs the generated background layer, the foreground layer and the IC table to the binary image generating unit 34. Incidentally, although a background layer is generated in this embodiment on the basis of a foreground mask and image data of a color image, it may be generated on the basis of a foreground layer and image data of a color image as described later.

Figure 5B:
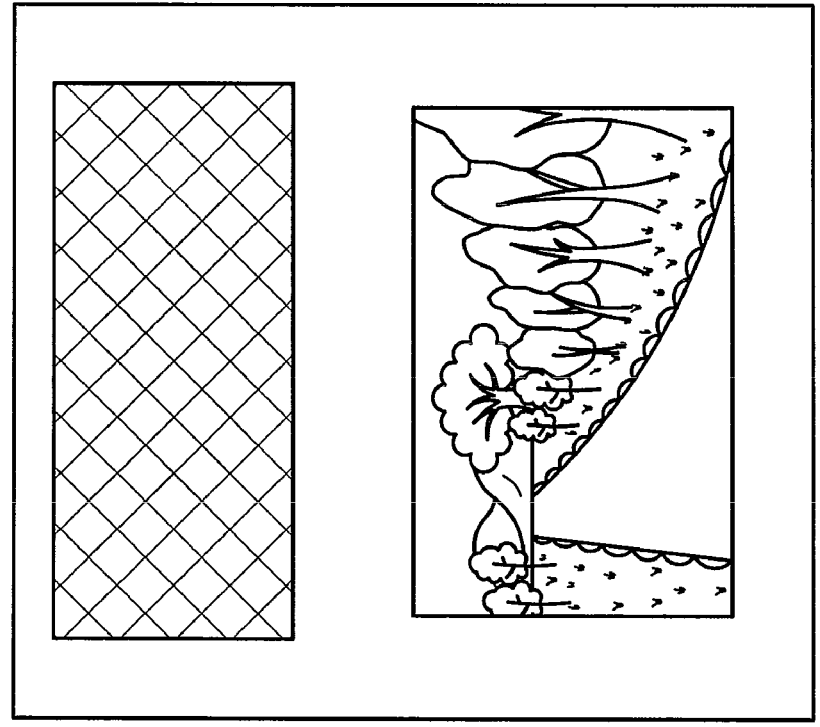
FIG. 5B is a schematic diagram of an exemplary background layer generated by the compression process section included in the image forming apparatus of Embodiment 1.
Figure 5A:
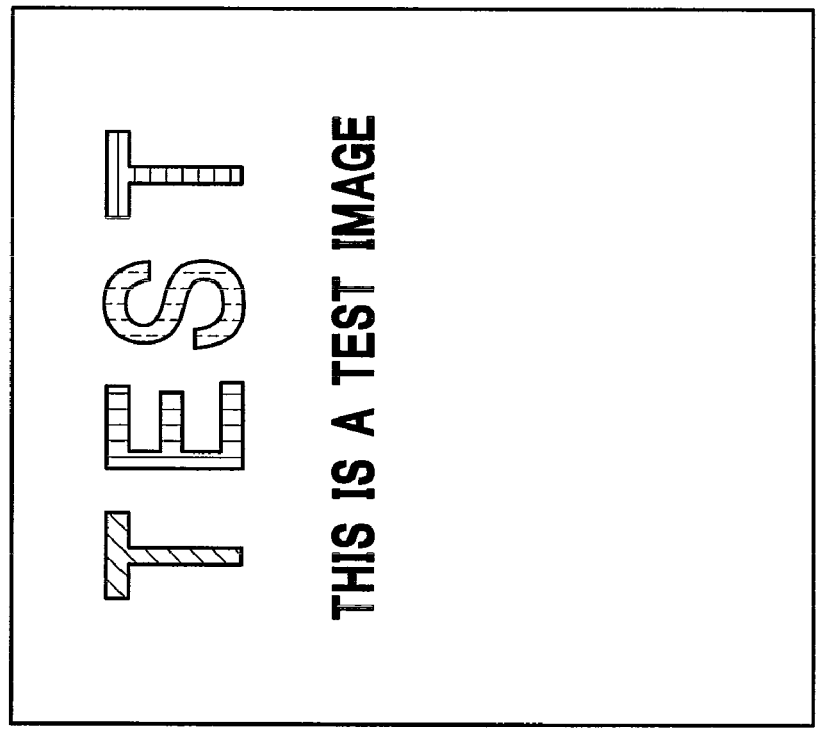
FIG. 5A is a schematic diagram of an exemplary foreground layer generated by the compression process section included in the image forming apparatus of Embodiment 1.

FIGS. 5A and 5B are schematic diagrams of an exemplary foreground layer and an exemplary background layer generated in the compression process section 3. FIG. 5A exemplarily illustrates one foreground layer generated on the basis of image data of one color image illustrated in FIG. 3 and one foreground mask illustrated in FIG. 4. In a foreground layer, a foreground is expressed with colors of the foreground of the color image, and a background is expressed with colors other than the colors of the foreground. In the foreground layer of FIG. 5A, as the foreground, the word "TEST" is expressed with light blue, red, violet and blue, and the sentence "This is a test image." is expressed with black alone. On the other hand, the background is expressed with white alone.

While respective pixels of a color image have, as pixel values, color information for directly expressing a large number of colors, respective pixels of a foreground layer have, as pixel values, identifiers (indexes) for indirectly expressing a small number of colors. For example, respective pixels of a foreground layer have multivalued identifiers for expressing eight colors, which is smaller in number than the 256 colors of a color image. Each of eight kinds of identifiers respectively expressing the eight colors can be indicated as a pixel value having a data length of 3 bits. On the other hand, each of 256 kinds of color information for respectively expressing the 256 colors can be indicated as a pixel value having a data length of 8 bits. Therefore, a foreground layer is smaller in data quantity than a color image.

In more detail, in a foreground layer, each foreground pixel has, as a pixel value, one of N kinds of identifiers, and each background pixel has, as a pixel value, one identifier different from all the N kinds of identifiers. At this point, N is a natural number, and N≧2 in general but N may be 1. An identifier and color information are stored in an IC table (see FIG. 7 described below) in one-to-one correlation. In the following description, an identifier used for identifying color information included in a foreground is designated as a foreground identifier, and an identifier used for distinguishing a background from a foreground is designated as a background identifier, and a word "an identifier" is simply used when there is no need to distinguish a foreground identifier and a background identifier from each other.

Color information allowed to correlate to a specific foreground identifier is color information expressing one color included in a foreground of a color image or color information of a representative color representing a plurality of colors included in a foreground of a color image. A representative color is obtained by, for example, simply averaging a plurality of colors or averaging a plurality of colors with weights provided in accordance with the numbers of pixels. Specifically, color information expressing a color with RGB values of (255, 0, 0) included in a foreground of a color image is allowed to correlate to a specific foreground identifier. Alternatively, color information expressing a representative color obtained by simply averaging a color with RGB values of (255, 0, 0), a color with RGB values of (255, 51, 0) and a color with RGB values of (255, 0, 51) is allowed to correlate to a specific foreground identifier.

In the following description, it is assumed that white is allowed to correlate to an identifier "0", that green is allowed to correlate to an identifier "1", that light blue is allowed to correlate to an identifier "2", that red is allowed to correlate to an identifier "3", that violet is allowed to correlate to an identifier "4", that blue is allowed to correlate to an identifier "5", etc., that black is allowed to correlate to an identifier "7", that a background identifier is "0" and that foreground identifiers are "1" through "7". Accordingly, in the foreground layer illustrated in FIG. 5A, a pixel of the foreground layer corresponding to a pixel of the foreground having color information of light blue in the color image of FIG. 3 has the foreground identifier "2". Similarly, pixels of the foreground layer corresponding to pixels of the foreground respectively having color information of red, violet, blue and black in the color image have the identifiers of "3", "4", "5" and "7", respectively. On the other hand, each pixel of the foreground layer corresponding to a pixel of the background of the color image has the background identifier "0" as a pixel value.

The index image generating unit 32 of FIG. 2 generates a generated IC table and a generated foreground layer on the basis of the image data of the color image and the foreground mask inputted thereto by employing, for example, a method disclosed in Japanese Patent Application Laid-Open No. 2002-94805 (see S11 through S16 of FIG. 17 described later). In this method, if color information of one foreground pixel has not been stored in the IC table, a new foreground identifier is allocated to the color information, and the color information and the allocated foreground identifier are stored in the generated IC table, and the color information of this pixel is replaced with the foreground identifier stored in the generated IC table. On the other hand, if color information of one foreground pixel has already been stored in the generated IC table, the color information of this pixel is replaced with the foreground identifier stored in the generated IC table. Furthermore, the color information of respective background pixels is all replaced with the predetermined background identifier stored in the generated IC table.

FIG. 6 is a schematic diagram of an exemplary generated foreground layer. The X coordinate and the Y coordinate illustrated in FIG. 6 respectively correspond to the main scanning direction and the sub scanning direction in reading a color image with the color image input apparatus 11. A coordinate (x, y) corresponds to the position of a pixel on an image, and each pixel can be specified by a coordinate. Pixel groups E1 through E8 surrounded with thick lines in FIG. 6 are pixel groups corresponding to a foreground, and a pixel group other than the pixel groups E1 through E8 corresponds to a background. Pixels belonging to the pixel groups E1 through E8 respectively have the foreground identifiers "1" through "8". Specifically, in the generated foreground layer of FIG. 6, pixels having the foreground identifier "1" together form the pixel group E1, pixels having the foreground identifier "2" together form the pixel group E2, etc., and pixels having the foreground identifier "8" together form the pixel group E8. The background identifier is "0".

FIG. 7 is a schematic diagram of an exemplary generated IC table corresponding to the generated foreground layer illustrated in FIG. 6. The IC table generated by the index image generating unit 32 stores an address, a foreground or background identifier (which is listed as an "identifier" in the drawing), a minimum X coordinate value, a minimum Y coordinate value, a maximum X coordinate value, a maximum Y coordinate value, R, G and B values (which are respectively listed as "R", "G" and "B" in the drawing) and the number of pixels correlatively to one another.

At this point, the address stored in the IC table is an address for storing the corresponding identifier in a storage area of a memory not shown. The minimum X coordinate value, the minimum Y coordinate value, the maximum X coordinate value and the maximum Y coordinate value stored in the IC table are the minimum coordinate values and the maximum coordinate values along the main scanning direction and the sub scanning direction of positions of pixels having the corresponding identifier in the generated foreground layer. The number of pixels stored in the IC table is a number of pixels having the corresponding identifier in the generated foreground layer.

The RGB values stored in the IC table correspond to color information for identifying the corresponding identifier. In the generated IC table of FIG. 7, a background identifier "0" is correlated to white with RGB values of (255, 255, 255), a foreground identifier "1" is correlated to green with RGB values of (0, 255, 0), a foreground identifier "2" is correlated to black with RGB values of (0, 0, 0), a foreground identifier "3" is correlated to blue with RGB values of (0, 0, 192), . . . etc. and a foreground identifier "8" is correlated to dark blue with RGB values of (0, 0, 96).

It is noted that when a numerical value of the address accords with a numerical value of the identifier, the address may be omitted in the IC table. In this case, however, when foreground identifiers are merged as described below, the relationship between foreground identifiers obtained before the mergence and a foreground identifier attained after the mergence should be stored in the IC table. Furthermore, the IC table may be divided into a plurality of parts. For example, three kinds of IC tables, that is, an identifier table for storing an address and an identifier correlatively to each other, a coordinate table for storing the address correlatively to a minimum X coordinate value, a minimum Y coordinate value, a maximum X coordinate value and a maximum Y coordinate value and a color table for storing the address correlatively to RGB values may be generated. These three kinds of tables are correlated to one another through the address.

Assuming that the generated foreground layer of FIG. 6 is separated into binary images, binary images in number equal to the number of kinds of foreground identifiers, namely, 8 binary images, are generated. FIGS. 8 and 9 are schematic diagrams of exemplary binary images generated based on the generated foreground layer of FIG. 6. The binary image of FIG. 8 corresponds to the foreground identifier "3" and the binary of FIG. 9 corresponds to the foreground identifier "8".

In the binary image of FIG. 8, pixels having the foreground identifier "3" in the generated foreground layer of FIG. 6 (namely, pixels belonging to the pixel group E3) alone have a pixel value of "0" and all the other pixels have a pixel value of "1". In the binary image of FIG. 9, pixels having the foreground identifier "8" in the generated foreground layer of FIG. 6 (namely, pixels belonging to the pixel group E8) alone have a pixel value of "0" and all the other pixels have a pixel value of "1".

Similarly, a binary image in which pixels having the foreground identifier "1" in the generated foreground layer of FIG. 6 (namely pixels belonging to the pixel group E1) alone have a pixel value of "0" and all the other pixels have a pixel value of "1", a binary image in which pixels having the foreground identifier "2" in the generated foreground layer of FIG. 6 (namely, pixels belonging to the pixel group E2) alone have a pixel value of "0" and all the other pixels have a pixel value of "1", . . . , etc. are generated. In this manner, when binary images are generated based on the generated foreground layer of FIG. 6, the number of binary images is 8 in one-to-one correspondence with the pixel groups E1 through E8.

Therefore, in order to suppress a disadvantage that a file size attained after the compression is excessively large, the index image generating unit 32 of the compression process section 3 may reduce the number of kinds of foreground identifiers included in a generated foreground layer so as to reduce the number of binary images to be generated correspondingly to the reduction of the number of kinds of foreground identifiers. For this purpose, the index image generating unit 32 of this embodiment merges foreground identifiers corresponding to similar colors. Accordingly, in a generated IC table and a generated foreground layer, foreground identifiers are not merged after being generated on the basis of image data of a color image and a foreground mask, and a corrected IC table and a corrected foreground layer are obtained by correcting the generated IC table and the generated foreground layer in accordance with the result of mergence of foreground identifiers.

When the number of kinds of foreground identifiers included in a foreground layer is unnecessarily reduced, however, the image quality attained after the compression may be largely degraded. This is because it is apprehended that a color included in a foreground of a color image prior to the compression may be changed to a completely different color through the compression when the number of kinds of foreground identifiers is reduced by merging foreground identifiers. Therefore, the index image generating unit 32 determines whether or not the number N of kinds of foreground identifiers is to be reduced to a number smaller than N.

Figure 17:
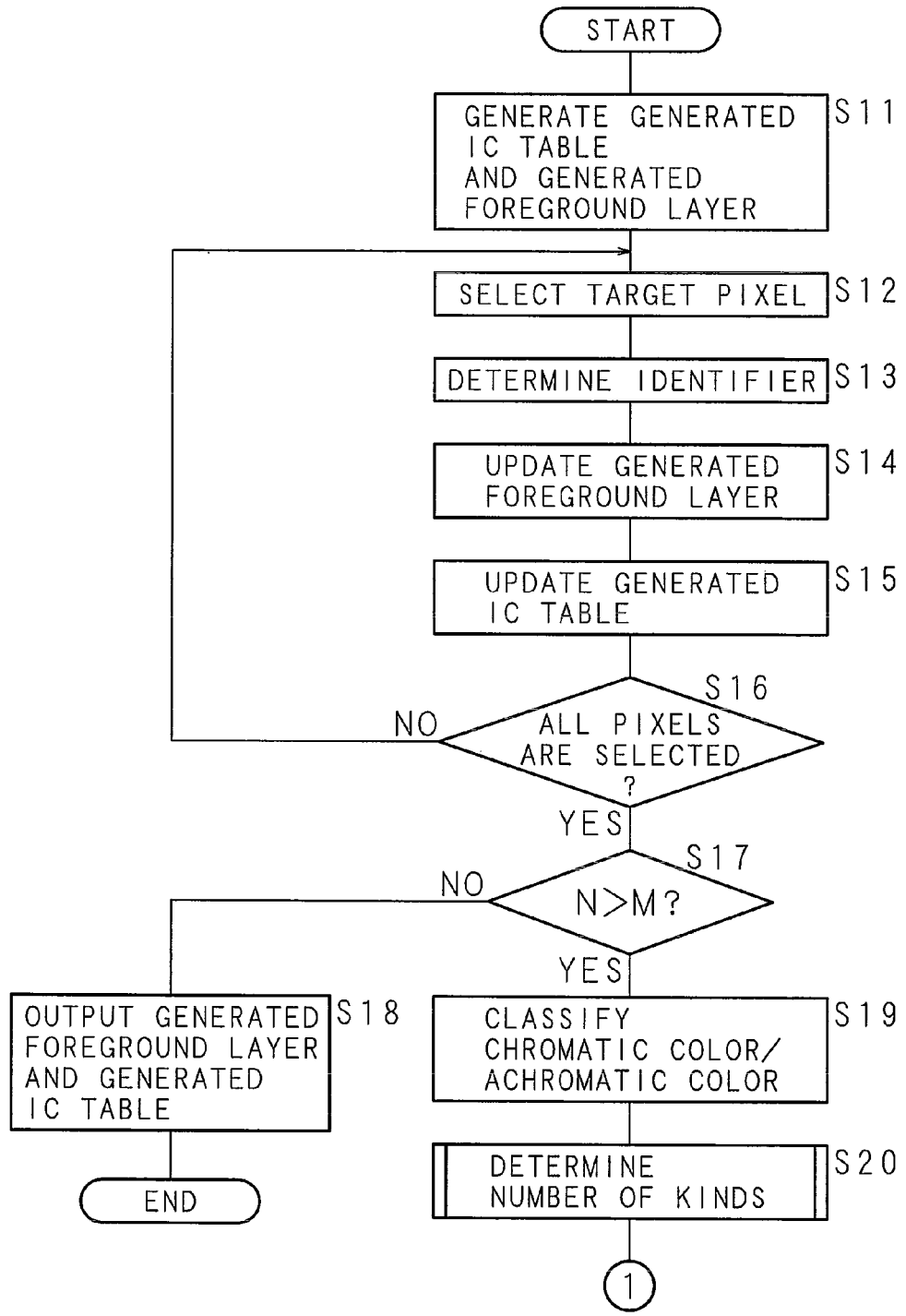
FIG. 17 is a flowchart illustrating procedures in an indexing process executed in the compression process section included in the image forming apparatus of Embodiment 1.

Specifically, the index image generating unit 32 of this embodiment determines whether or not the number N of kinds of foreground identifiers is larger than a predetermined number M, and when it is larger than M, it is determined that the number of kinds of foreground identifiers is to be reduced to M (see S17 of FIG. 17). At this point, the number M is a natural number. Alternatively, when the number N of kinds of foreground identifiers is not more than the predetermined number M, the index image generating unit 32 determines that the number of kinds of foreground identifiers is not to be reduced. In this case, the number of kinds of foreground identifiers remains N.

A generated IC table stores {N+1} kinds of identifiers (namely, N kinds of foreground identifiers and one kind of background identifier), and a generated foreground layer includes the {N+1} kinds of identifiers. In the generated IC table of FIG. 7, N=8, and hence, it includes 9 kinds of identifiers. When the number N of kinds of foreground identifiers is reduced to M, a corrected IC table stores {M+1} kinds of identifiers (namely, M kinds of foreground identifiers and one kind of background identifier), and a corrected foreground layer includes the {M+1} kinds of identifiers. In each of corrected IC tables respectively illustrated in FIGS. 14 and 15 described below, M=6, and hence, 7 kinds of identifiers are included.

Alternatively, the index image generating unit 32 may determine whether or not the number N of kinds of foreground identifiers is larger than a predetermined number P. At this point, the number P is a natural number. When the number of kinds of foreground identifiers is larger than the number P, the index image generating unit 32 determines that the number of kinds of foreground identifiers is to be reduced to the number M not more than the number P. Alternatively, when the number N of kinds of foreground identifiers is not more than the number P, the index image generating unit 32 determines that the number of kinds of foreground identifiers is not to be reduced. In this case, the number of kinds of foreground identifiers remains N.

Furthermore, the index image generating unit 32 may determine whether or not the number of kinds of foreground identifiers is to be reduced by determining whether a compression mode set by a user is a size priority mode in which priority is placed on a small file size over high image quality or a quality priority mode in which priority is placed on high image quality over a small file size. Alternatively, the index image generating unit 32 may change, in accordance with a compression mode set by a user, a criterion used for determining whether or not the number of kinds of identifiers is to be reduced. For example, the predetermined number M employed in the size priority mode is set to a value smaller than the predetermined number M employed in the quality priority mode.

After it is determined that the number N of kinds of foreground identifiers is larger than the predetermined number M and hence the number N is to be reduced to be smaller, the index image generating unit 32 subsequently determines the numbers of kinds of foreground identifiers respectively corresponding to chromatic colors and achromatic colors to be attained after the reduction. By referring to the generated IC table, the index image generating unit 32 acquisitions a number $n_1$ of kinds of foreground identifiers for identifying color information of chromatic colors and a number $n_2$ of kinds of foreground identifiers for identifying color information of achromatic colors. The numbers $n_1$ and $n_2$ are integers satisfying $n_1 \geq 0$, $n_2 \geq 0$ and $n_1 + n_2 = N$. Since the number N is a natural number, when $n_1 = n_2$, both the numbers $n_1$ and $n_2$ are natural numbers.

Subsequently, the index image generating unit 32 determines a number $m_1$ of kinds of foreground identifiers for identifying color information of chromatic colors and the number $m_2$ of kinds of foreground identifiers for identifying color information of achromatic colors to be attained after the reduction. The numbers $m_1$ and $m_2$ are integers satisfying $m_1 \geq 0$, $m_2 \geq 0$ and $m_1 + m_2 = M$. Since the number M is a natural number, when $m_1 = m_2$, both the numbers $m_1$ and $m_2$ are natural numbers. Furthermore, although $m_1 < n_1$ and $m_2 < n_2$, since M<N, $m_2 < n_2$ if $m_1 = n_1$ and $m_1 < n_1$ if $m_2 = n_2$.

The index image generating unit 32 of this embodiment determines the numbers $m_1$ and $m_2$ so that $m_1 > 0$ when $n_1 > 0$ and that $m_2 > 0$ when $n_2 > 0$. Accordingly, the numbers $m_1$ and $m_2$ are determined so that at least one chromatic color (or achromatic color) is included in a compressed color image when at least one chromatic color (or achromatic color) is included in a color image prior to the compression.

Figure 19:
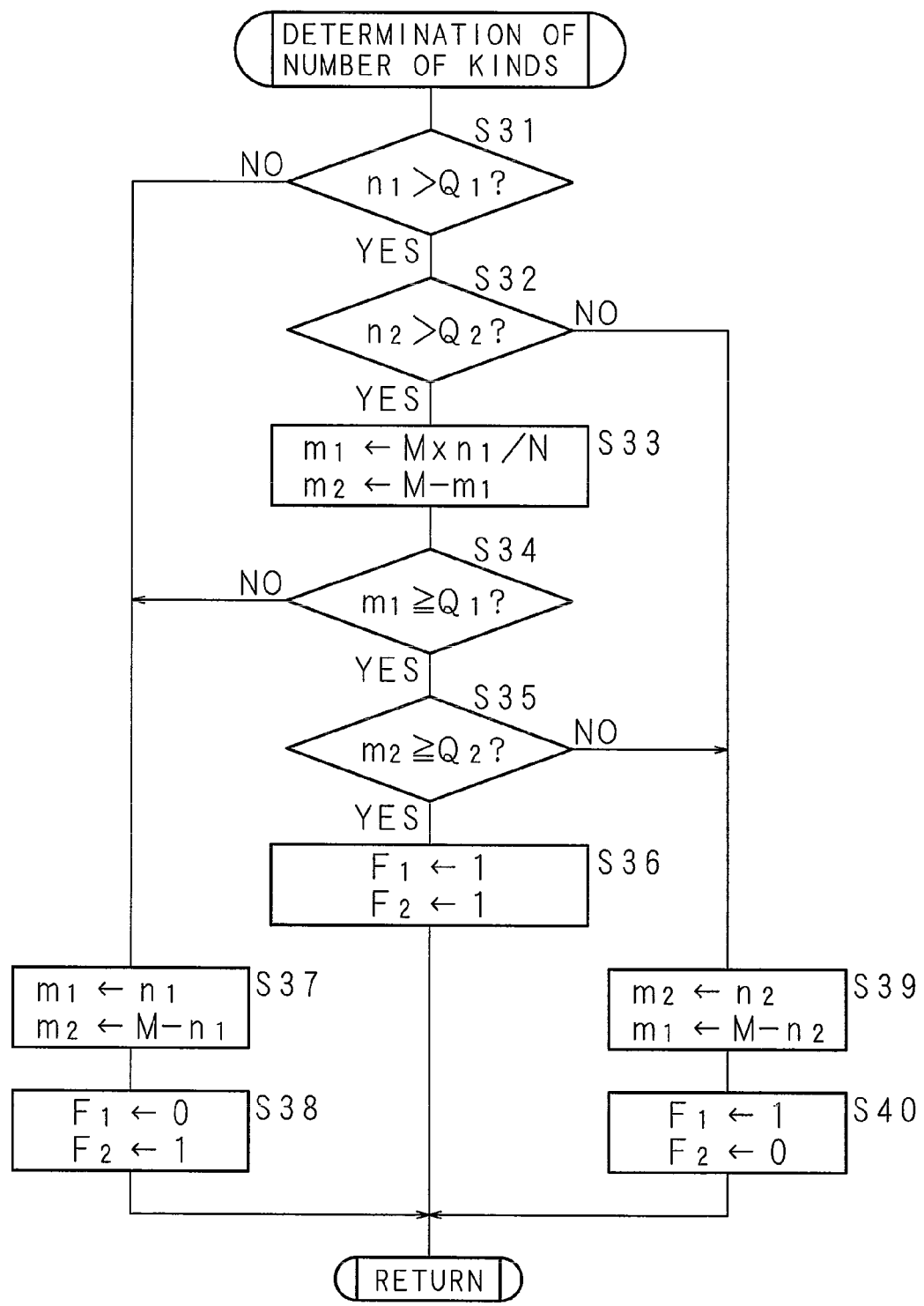
FIG. 19 is a flowchart illustrating procedures in a subroutine of a number determining process executed in the compression process section included in the image forming apparatus of Embodiment 1.

Before determining the numbers $m_1$ and $m_2$, the index image generating unit 32 of this embodiment determines whether or not the number $n_1$ is larger than a predetermined number $Q_1$ and whether or not the number $n_2$ is larger than a predetermined number $Q_2$ (see S31 and S32 of FIG. 19). At this point, the predetermined number $Q_1$ is a natural number satisfying $2 \leq Q_1 < M$, and the predetermined number $Q_2$ is a natural number satisfying $2 \leq Q_2 < M$, and $Q_1 + Q_2 \leq M$. Accordingly, as the predetermined number M, an appropriate value of 4 or more is set in advance. Furthermore, since M<N, $n_2 > Q_2$ when $n_1 \leq Q_1$, and $n_1 > Q_1$ when $n_2 \leq Q_2$.

In the case where the number $n_1$ is not more than the predetermined number $Q_1$, the index image generating unit 32 determines the numbers $m_1$ and $m_2$ on the basis of the result of calculation of the following expressions (M9) and (M10) (see S37 of FIG. 19):

$$m_1 = n_1 \tag{M9}$$

$$m_2 = M - n_1 \tag{M10}$$

In the case where the number $n_2$ is not more than the predetermined number $Q_2$, the index image generating unit 32 determines the numbers $m_1$ and $m_2$ on the basis of the result of calculation of the following expressions (M11) and (M12) (see S39 of FIG. 19):

$$m_2 = n_2 \tag{M11}$$

$$m_1 = M - n_2 \tag{M12}$$

In the case where the number $n_1$ is larger than the predetermined number $Q_1$ and the number $n_2$ is larger than the predetermined number $Q_2$, the index image generating unit 32 determines the numbers $m_1$ and $m_2$ on the basis of the result of calculation of the following expressions (M13) and (M14), whereas fractions of decimal places are rounded up in the calculation of the number $m_1$ (see S33 of FIG. 19):

$$m_1 = M \times n_1 / N \tag{M13}$$

$$m_2 = M - m_1 \tag{M14}$$

Incidentally, the index image generating unit 32 may determine the numbers $m_1$ an $m_2$ on the basis of the results of calculation of the following expressions (M15) and (M16) instead of the expressions (M13) and (M14), whereas fractions of decimal places are discarded in the calculation of the number $m_2$:

$$m_2 = M \times n_2 / N \tag{M15}$$

$$m_1 = M - m_2 \tag{M16}$$

In the case where the number $n_1$ is not more than the predetermined number $Q_1$, there is a possibility that merely one chromatic color or no chromatic color is included in a color image prior to the compression. Alternatively, there is a possibility that chromatic colors included in a color image prior to the compression are colors not regarded as similar colors in general, such as red and blue. Accordingly, in order to allow merely one chromatic color to remain or in order to suppress mergence of the colors not regarded as similar colors in general, the expressions (M9) and (M10) are used for determining the numbers $m_1$ and $m_2$. Therefore, when $n_1=0$, $m_1=0$ and hence, $m_2=M$.

Similarly, in the case where the number $n_2$ is not more than the predetermined number $Q_2$, there is a possibility that merely one achromatic color or no achromatic color is included in a color image prior to the compression. Alternatively, there is a possibility that achromatic colors included in a color image prior to the compression are colors not regarded as similar colors in general, such as black and white. Accordingly, in order to allow merely one achromatic color to remain or in order to suppress mergence of the colors not regarded as similar colors in general, the expressions (M11) and (M12) are used for determining the numbers $m_1$ and $m_2$. Therefore, when $n_2=0$, $m_2=0$ and hence, $m_1=M$.

When the number $m_1$ obtained as a result of the calculation of the expression (M13) (or the expression (M16)) is smaller than the number $Q_1$. (i.e., $m_1 < Q_1$), the index image generating unit 32 determines the numbers $m_1$ and $m_2$ on the basis of the calculation results of the expressions (M9) and (M10). On the other hand, when the number $m_2$ obtained as a result of the calculation of the expression (M14) (or the expression (M15)) is smaller than the number $Q_2$ (i.e., $m_2 < Q_2$), the index image generating unit 32 determines the numbers $m_1$ and $m_2$ on the basis of the calculation results of the expressions (M11) and (M12).

At this point, an exemplary case in which the number $n_1$ is larger than the predetermined number $Q_1$ and the number $n_2$ is larger than the predetermined number $Q_2$ will be described. It is assumed in a generated IC table that the number N of kinds of foreground identifiers is 12, that the number $n_1$ of kinds of foreground identifiers corresponding to chromatic colors is 8, that the number $n_2$ of kinds of foreground identifiers corresponding to achromatic colors is 4, that the predetermined number M is 8, that the predetermined number $Q_1$ is 3, and that the predetermined number $Q_2$ is 2. Since $n_1 > Q_1$ and $n_2 > Q_2$, the numbers $m_1$ and $m_2$ are determined in accordance with the following expressions (M17) and (M18) by using the expressions (M13) and (M14)

$$m_1 = 8 \times 8/12 = 5.3 = 6 \tag{M17}$$

$$m_2 = 8 - 6 = 2 \tag{M18}$$

If it is rounded down to the whole number or rounded off, the numbers $m_1$ and $m_2$ are 5 and 3, respectively. In other words, when the number $m_1$ is determined by using the expression (M13), if fractions of decimal places are rounded up, foreground identifiers corresponding to chromatic identifiers are allowed to remain with priority to foreground identifiers corresponding to achromatic colors and the foreground identifiers corresponding to achromatic colors are merged with priority to the foreground identifiers corresponding to chromatic colors. As a result, the number of reducing foreground identifiers corresponding to chromatic colors is suppressed. This is because people tend to pay more attention to chromatic colors than to achromatic colors, and hence, when chromatic colors are excessively reduced, the visual image quality is degraded.

Next, a specific example will be described with reference to the generated IC table of FIG. 7. The index image generating unit 32 determines, on the basis of RGB values stored in the generated IC table of FIG. 7, whether a color with the RGB values is a chromatic color or an a chromatic color (see S19 of FIG. 17). To be precise, the color is an achromatic color when all the RGB values are the same and is a chromatic color in the other case. This criterion is, however, too severe. Therefore, the index image generating unit 32 of this embodiment calculates a color reference value Col on the basis of the following expressions (M19) through (M22), so that a color with a color reference value Col not more than a predetermined RGB threshold value Col0 (of, for example, "10") can be regarded as an achromatic color and that a color with a color reference value Col exceeding the predetermined RGB threshold value Col0 can be regarded as a chromatic color, whereas RGB values are expressed as RGB values (r, g, $$\text{Col1} = |r - g| \tag{M19}$$

$$\text{Col1} = |g - b| \tag{M20}$$

$$\text{Col3} = |b - r| \tag{M21}$$

$$\text{Col} = \text{Col1} + \text{Col2} + \text{Col3} \tag{M22}$$

Incidentally, the index image generating unit 32 may convert RGB values into a coordinate (with an L⁻ value of lightness and a* and b* values of chromaticity) on a uniform color space of the L*a*b* color system (CIE1976; CIE: Comission Internationale de l'Eclairage: International Commission on Illumination), and when the a* value and the b* value are not more than a predetermined threshold value (which is, for example, "16" when the a* and b* values are respectively expressed with 8 bits), the corresponding color may be regarded as an achromatic color, and when they exceed the predetermined threshold value, the color may be regarded as a chromatic color.

Accordingly, in the generated IC table of FIG. 7, merely black with the RGB values (0, 0, 0) correlated to the foreground identifier "2" is regarded as an achromatic color, and other colors with the RGB values respectively correlated to the foreground identifiers "1" and "3" through "8" are regarded as chromatic colors. Therefore, in the generated IC table of FIG. 7, the number N is 8, the number $n_1$ corresponding to chromatic colors is 7, and the number $n_2$ corresponding to achromatic colors is 1. At this point, it is assumed that the predetermined number M is 6, that the predetermined number $Q_1$ is 3 and that the predetermined number $Q_2$ is 2. Since $n_1 > Q_1$ and $n_1 \leq Q_2$, the numbers $m_1$ and $m_2$ are determined in accordance with the following expressions (M23) and (M24) by using the expressions (M11) and (M12):

$$m_2 = 1 \tag{M23}$$

$$m_1 = 6 - 1 = 5 \tag{M24}$$

As a result, in the generated IC table of FIG. 7, with the foreground identifier corresponding to the achromatic color allowed to remain, the foreground identifiers corresponding to chromatic colors similar to each other are merged. At this point, it is assumed that a number of kinds of foreground identifiers corresponding to chromatic colors to be reduced (hereinafter referred to as a reducing number) is $D_1$ and that a reducing number of foreground identifiers corresponding to achromatic colors is $D_2$, the reducing numbers $D_1$ and $D_2$ are calculated in accordance with the following expressions (M25) and (M26) (see S51 of FIG. 20 and S71 of FIG. 21 described later):

$$D_1 = n_1 - m_1 \tag{M25}$$

$$D_2 = n_2 - m_2 \tag{M26}$$

In the generated IC table of FIG. 7, the reducing number $D_1$ corresponding to the chromatic colors is 2 and the reducing number $D_2$ corresponding to the achromatic color is 0. Therefore, the index image generating unit 32 merges two kinds of foreground identifiers corresponding to chromatic colors to other foreground identifiers corresponding to chromatic colors respectively similar to the former chromatic colors.

In this manner, the index image generating unit 32 of this embodiment determines the numbers $m_1$ and $m_2$ to be attained after the reduction in accordance with ratios of the numbers $n_1$ and $n_2$ of kinds of foreground identifiers respectively corresponding to chromatic colors and achromatic colors to the number N of kinds of all the foreground identifiers, which does not limit the invention. Alternatively, the index image generating unit 32 may determine the numbers $m_1$ and $m_2$ in accordance with, for example, ratios of the numbers of pixels respectively having chromatic colors and achromatic colors to the total number of pixels. Alternatively, the index image generating unit 32 may determine the numbers $m_1$ and $m_2$ in consideration of both the number of kinds of foreground identifiers and the number of pixels. For example, the index image generating unit 32 may extract foreground identifiers correlated to pixels in number not less than a predetermined number, so as to determine the numbers $m_1$ and $m_2$ in accordance with ratios, in the extracted foreground identifiers, of the numbers of kinds of foreground identifiers corresponding to chromatic colors and achromatic colors.

Next, two methods for calculating similar colors will be exemplarily described. In a first similar color calculation method of this embodiment, a color difference is used for the calculation for chromatic colors and a luminance difference is used for the calculation for achromatic colors. In a second similar color calculation method, a color difference provided with a weight in accordance with luminosity is used for the calculation for chromatic colors, and a luminance difference provided with a weight in accordance with luminosity is used for the calculation for achromatic colors.

In the generated IC table of FIG. 7, if a conventional method is employed for calculating similar colors, black with the RGB values of (0, 0, 0) correlated to the foreground identifier "2" and dark blue with the RGB values of (0, 0, 96) correlated to the foreground identifier "8" may be regarded as similar colors. According to this invention, however, a combination of a chromatic color and an achromatic color is never considered. Therefore, a chromatic color and an achromatic color are never merged even when they are similar to each other, and similar colors of chromatic colors and/or similar colors of achromatic colors are merged. As a result, it is possible to prevent the problem that the image quality is largely degraded because a portion of a foreground in a chromatic color (or an achromatic color) in a color image prior to compression is changed in color to an achromatic color (or a chromatic color) in a compressed color image.

FIGS. 10A and 10B are schematic diagrams of exemplary color information tables used for the calculation of similar colors. FIG. 10A illustrates a color information table used in employing the first similar color calculation method, and FIG. 10B illustrates a color information table used in employing the second similar color calculation method. Such a color information table is preferably generated separately from an IC table.

In the color information tables of FIGS. 10A and 10B, a foreground identifier (listed as "Idx" in the drawings), RGB values (listed as "R", "G" and "B" in the drawings) and L*a*b* values (listed as "L", "a" and "b" in the drawings) are correlated and stored with one another. RGB values stored in a color information table correspond to color information for identifying a corresponding foreground identifier, and L*a*b* values correspond to color information obtained by converting the RGB values of the corresponding foreground identifier into values of the L*a*b* color system. In the color information table of FIG. 10B, a weighting coefficient WtL and a weighting coefficient WtC are further stored correlatively to a foreground identifier.

The weighting coefficient WtL is a coefficient for providing a weight to a luminance difference on the basis of the luminosity of brightness. In the index image generating unit 32 of this embodiment, when an L* value correlated to a specific foreground identifier is larger than a predetermined first threshold value "50", the weighting coefficient WtL is set to "2", and when the L* value is not more than the predetermined first threshold value "50", the weighting coefficient WtL is set to "0.5". Color information with a large L* value (namely, with the weighting coefficient WtL of "2") expresses a bright color, and color information with a small L* value (namely, with the weighting coefficient WtL of "0.5") expresses a dark color. Since bright colors are more conspicuous than dark colors, it is preferred that bright colors are not merged. In order to merge dark colors with priority to bright colors, the weighting coefficient WtL given to bright colors is set to a larger value than the weighting coefficient WtL given to dark colors.

The weighting coefficient WtC is a coefficient for providing a weight to a color difference on the basis of the luminosity of chromaticity. In the index image generating unit 32 of this embodiment, when a b* value correlated to a specific foreground identifier is smaller than a predetermined second threshold value "0", the weighting coefficient WtC is set to "0.5", and when the b* value is not less than the predetermined second threshold value "0", the weighting coefficient WtC is set to "2". Color information with a large b* value (namely, with the weighting coefficient WtC of "2") expresses a yellow color, and color information with a small b* value (namely, with the weighting coefficient WtC of "0.5") expresses a blue color. Since yellow colors are more conspicuous than blue colors, it is preferred that yellow colors are not merged. In order to merge blue colors with priority to yellow colors, the weighting coefficient WtC given to yellow colors is set to a larger value than the weighting coefficient WtC given to blue colors.

In the generated IC table of FIG. 7, a foreground identifier corresponding to an achromatic color is not merged. Therefore, the RGB values and the L*a*b* values correlated to the foreground identifier "2" are not used in the calculation of similar colors. In the first similar color calculation method, a color difference between chromatic colors is calculated on the basis of RGB values of the chromatic colors stored in the color information table of FIG. 10A. In the second similar color calculation method, a color difference between chromatic colors is calculated on the basis RGB values of the chromatic colors stored in the color information table of FIG. 10B, and the calculated color difference is multiplied by the weighting coefficients WtL and WtC.

FIG. 11 is a schematic diagram of an exemplary color difference calculation result table obtained on the basis of the color information tables of FIGS. 10A and 10B. In FIG. 11, "1-3", "1-4", . . . , and "7-8" respectively indicate a combination of the foreground identifiers "1" and "3", a combination of the foreground identifiers "1" and "4", . . . and a combination of the foreground identifiers "7" and "8".

When the first similar color calculation method is employed, the index image generating unit 32 of this embodiment calculates a color difference $\Delta ColC$ of a combination of foreground identifiers "i" and "j" (wherein i is a natural number and j is a natural number satisfying $j \geq i+1$) in accordance with expressions (M27) through (M30) below. A "color difference" listed in the color difference calculation result table of FIG. 11 corresponds to the color difference $\Delta ColC$ obtained as a result of the calculation of the expression (M30). Also, a numerical value listed on the right hand side of the "color difference" corresponds to a number in the ascending order of the corresponding color difference $\Delta ColC$ in the drawing. It is assumed that RGB values correlated to the foreground identifier "i" are indicated as (R[i], B[i]) and that RGB values correlated to the foreground identifier "j" are indicated as (R[j], G[j], B[j]). Furthermore, in the generated IC table of FIG. 7, the foreground identifiers "i" and "j" are not the foreground identifier "2".

$$\times ColR = |R[i] - R[j]| \tag{M27}$$

$$\Delta ColG = |G[i] - G[j]| \tag{M28}$$

$$\Delta ColB = |B[i] - B[j]| \tag{M29}$$

$$\Delta ColC = \Delta ColR + \Delta ColG + \Delta ColB \tag{M30}$$

When the second similar color calculation method is employed, the index image generating unit 32 of this embodiment calculates a weighted color difference $\Delta WtColC$ in accordance with the expressions (M27) through (M30) and an expression (M31) described below. A "weighted color difference" listed in the color difference calculation result table of FIG. 11 corresponds to the weighted color difference $\Delta WtColC$ obtained as a result of the calculation of the expression (M31). Also, a numerical value listed on the right hand side of the "weighted color difference" corresponds to a number in the ascending order of the corresponding weighted color difference $\Delta WtColC$ in the drawing.

$$\Delta WtColC = \Delta ColC \times WtL \times WtC \tag{M31}$$

In this manner, a color difference is taken into consideration in the calculation for chromatic colors and a luminance difference is taken into consideration in the calculation for achromatic colors. When the first similar color calculation method is employed, the index image generating unit 32 of this embodiment calculates a luminance difference $\Delta ColL$ of a combination of foreground identifiers "i" and "j" in accordance with an expression (M32) described below, whereas an L* value correlated to the foreground identifier "i" is indicated as (*LW) and an L* value correlated to the foreground identifier "j" is indicated as (*L[j]). Furthermore, in the generated IC table of FIG. 7, the foreground identifiers "i" and "j" are not the foreground identifier "2".

$$\Delta ColL = |L*[i] - L*L[j]| \tag{M32}$$

When the second similar color calculation method is employed, the index image generating unit 32 of this embodiment calculates a weighted luminance difference $\Delta WtColL$ in accordance with the expression (M32) and the following expression (M33):

$$\Delta WtColL = \Delta ColL \times WtL \tag{M33}$$

When the first similar color calculation method is employed, by referring to the "color difference" listed in the color difference calculation result table of FIG. 11, a combination of foreground identifiers with the smallest color difference $\Delta ColC$ is a combination of the foreground identifiers "3" and "8", a combination with the second smallest color difference is a combination of the foreground identifiers "4" and "5" and a combination with the third smallest color difference is a combination of foreground identifiers "3" and "6".

Since the reducing number $D_1$ is 2, the index image generating unit 32 first determines to merge the foreground identifiers "3" and "8", which combination has the smallest color difference $\Delta ColC$. With respect to the foreground identifiers "3" and "8", the foreground identifier "8" is merged into the foreground identifier "3" as described below, and hence, the foreground identifier "8" becomes an invalid foreground identifier. Therefore, the index image generating unit 32 determines to merge the foreground identifiers "4" and "5", which combination has the smallest color difference $\Delta ColC$ excluding the invalidated foreground identifier "8" (namely, originally has the second smallest color difference).

When the foreground identifiers "3" and "8" are merged and the foreground identifiers "4" and "5" are merged, the number of kinds of foreground identifiers corresponding to chromatic colors is "6", which is obtained by reducing the number N by "2" (equal to the reducing number $D_1$). Accordingly, the index image generating unit 32 does not determine to merge a combination of foreground identifiers having the third or above smallest color difference $\Delta ColC$.

Specifically, when the first similar color calculation method is employed, the blue with the RGB values of (0, 0, 192) correlated to the foreground identifier "3" and the dark blue with the RGB values of (0, 0, 96) correlated to the foreground identifier "8" are regarded as similar colors. Also, the red with RGB values of (240, 0, 0) correlated to the foreground identifier "4" and the brown with RGB values of (160, 32, 32) correlated to the foreground identifier "5" are regarded as similar colors.

When the second similar color calculation method is employed, by referring to the "weighted color difference" listed in the color difference calculation result table of FIG. 11, a combination of foreground identifiers with the smallest weighted color difference $\Delta WtColC$ is a combination of the foreground identifiers "3" and "8", a combination with the second smallest weighted color difference is a combination of the foreground identifiers "3" and "6", a combination with the third smallest weighted color difference is a combination of the foreground identifiers "6" and "8" and a combination with the fourth smallest weighted color difference is a combination of the foreground identifiers "5" and "6".

Since the reducing number $D_1$ is 2, the index image generating unit 32 first determines to merge the foreground identifiers "3" and "8", which combination has the smallest weighted color difference $\Delta WtColC$. With respect to the foreground identifiers "3" and "8", the foreground identifier "8" is merged into the foreground identifier "3" as described below, and hence, the foreground identifier "8" becomes an invalid foreground identifier. Therefore, the index image generating unit 32 determines to merge the foreground identifiers "3"

and "6", of which combination has the smallest weighted color difference ΔWtColC excluding the invalidated foreground identifier "8" (namely, originally has the second smallest weighted color difference).

When the foreground identifiers "3" and "8" are merged and the foreground identifiers "3" and "6" are merged, the number of kinds of foreground identifiers corresponding to chromatic colors is "6", which is obtained by reducing the number N by "2" (equal to the reducing number $D_1$). Accordingly, the index image generating unit 32 does not determine to merge a combination of foreground identifiers having the third or above smallest weighted color difference ΔWtColC.

Specifically, when the second similar color calculation method is employed, the blue with the RGB values of (0, 0, 192) correlated to the foreground identifier "3", the violet with RGB values of (96, 64, 150) correlated to the foreground identifier "6" and the dark blue with the RGB values of (0, 0, 96) correlated to the foreground identifier "8" are regarded as similar colors.

With respect to the foreground identifiers "3" and "6", the foreground identifier "3" is merged into the foreground identifier "6" as described below, and hence, the foreground identifier "3" becomes an invalid foreground identifier. Therefore, if the reducing number $D_1$ is 3, the index image generating unit 32 determines to merge the foreground identifiers "5" and "6", of which combination has the smallest weighted color difference ΔWtColC excluding the invalidated foreground identifiers "3" and "8" (namely, originally has the fourth smallest weighted color difference).

As is understood from the generated IC table of FIG. 7 and the color difference calculation result table of FIG. 11, when a color difference is simply considered, the blue with the RGB values of (0, 0, 192) and the dark blue with the RGB values of (0, 0, 96) are regarded as the most similar colors, and the red with the RGB values of (240, 0, 0) and the brown with the RGB values of (160, 32, 32) are regarded as the second similar colors. The blue with the RGB values of (0, 0, 192) and the dark blue with the RGB values of (0, 0, 96) are both dark colors and both blue colors.

However, the red with the RGB values of (240, 0, 0) and the brown with the RGB values of (160, 32, 32) are both yellow colors, and the red with the RGB values of (240, 0, 0) is bright. Therefore, when they are merged, it is apprehended that color change in a compressed color image may be conspicuous when compared with a color image obtained before the compression.

On the other hand, when a weighted color difference is considered, the blue with the RGB values of (0, 0, 192) and the dark blue with the RGB values of (0, 0, 96) are regarded as the most similar colors, and the blue with the RGB values of (0, 0, 192) and the violet with the RGB values of (96, 64, 150) are regarded as the second similar colors. The blue with the RGB values of (0, 0, 192), the dark blue with the RGB values of (0, 0, 96) and the violet with the RGB values of (96, 64, 150) are all dark colors and all blue colors. Therefore, even when these colors are merged, it seems that color change in a compressed color image is not conspicuous when compared with a color image obtained before the compression.

The index image generating unit 32 of this embodiment uses the sum of absolute differences in the R, G, B values as the color difference ΔColC in accordance with the expressions (M27) through (M30), which does not limit the invention. The index image generating unit 32 may use, for example, the sum of absolute differences in the a* and b* values as the color difference ΔColC. Furthermore, the index image generating unit 32 may calculate the color difference ΔColC and the luminance difference ΔColL by using another color system (such as the HLS color system) instead of the RGB color system and the L*a*b* color system.

In the case where there are a plurality of combinations having the smallest color difference ΔColC or the smallest weighted color difference ΔWtColC, the index image generating unit 32 may merge a combination including a foreground identifier with the smallest value with priority or a combination of foreground identifiers corresponding to a smallest number of pixels in total. Furthermore, in the case where there are combinations having the same color difference ΔColC (or the same weighted color difference ΔWtColC), the index image generating unit 32 may determine a combination to be merged by comparing the weighted color difference ΔWtColC (or the color difference ΔColC) of these combinations. Also in the case where there are a plurality of combinations having the smallest luminance difference ΔColL or the smallest weighted luminance difference ΔWtColL, the index image generating unit 32 may perform a process similarly to the case where there are plurality of combinations having the smallest color difference ΔColC or the smallest weighted color difference ΔWtColC.

FIGS. 12 and 13 are schematic diagrams of exemplary corrected foreground layers obtained by correcting the generated foreground layer of FIG. 6. FIG. 12 illustrates an exemplary corrected foreground layer obtained by merging foreground identifiers by employing the first similar color calculation method, and FIG. 13 illustrates an exemplary corrected foreground layer obtained by merging foreground identifiers by employing the second similar color calculation method.

In each of these drawings, pixel groups E1 through E8 surrounded with thick lines respectively correspond to the pixel groups E1 through E8 of FIG. 6. In the corrected foreground layer of FIG. 12, however, pixels belonging to the pixel group E5 have the foreground identifier "4" instead of the foreground identifier "5", and pixels belonging to the pixel group E8 have the foreground identifier "3" instead of the foreground identifier "8". Also, in the corrected foreground layer of FIG. 13, pixels belonging to the pixel groups E3 and E8 have the foreground identifier "6" instead of the foreground identifier "3" or "8".

FIGS. 14 and 15 are schematic diagrams of exemplary corrected IC tables. The corrected IC table of FIG. 14 is obtained by correcting the generated IC table of FIG. 7 and corresponds to the corrected foreground layer of FIG. 12. The corrected IC table of FIG. 15 is obtained by correcting the generated IC table of FIG. 7 and corresponds to the corrected foreground layer of FIG. 13. In these drawings, a symbol "→" means correction from a numerical value on the left hand side of the symbol to a numerical value on the right hand side. Herein, the corrected foreground layer is illustrated in FIG. 12 or 13 before illustrating the corrected IC table in FIG. 14 or 15 for the sake of explanation. In actual processing, however, the index image generating unit 32 corrects the generated IC table of FIG. 7 to the corrected IC table of FIG. 14 or FIG. 15 before correcting the generated foreground layer of FIG. 6 to the corrected foreground layer of FIG. 12 or FIG. 13.

In order to correct a generated IC table to a corrected IC table, the index image generating unit 32 of this embodiment compares the numbers of pixels having foreground identifiers "i" and "j" to be merged, so as to determine whether the foreground identifier "j" is merged into the foreground identifier "i" or the foreground identifier "i", is merged into the foreground identifier "j".

When the first similar color calculation method is employed, by referring to the generated IC table of FIG. 7, the number of pixels correlated to the foreground identifier "3" is "5", and the number of pixels correlated to the foreground identifier "8" is "3". Therefore, the index image generating unit 32 determines that the foreground identifier "8" is merged into the foreground identifier "3" (see S56 of FIG. 20). Furthermore, the sum of pixels correlated to the foreground identifiers "3" and "8" is "8". Therefore, the index image generating unit 32 corrects, as illustrated in FIG. 14, the number of pixels correlated to the foreground identifier "3" from "5" to "8" and the number of pixels correlated to the foreground identifier "8" from "3" to an invalid value (which is "0" in this embodiment).

Furthermore, by referring to the generated IC table of FIG. 7, respective coordinate values correlated to the foreground identifiers "3" and "8" are respectively minimum X coordinate values of "10" and "10", minimum Y coordinate values of "7" and "16", maximum X coordinate values of "12" and "12" and maximum Y coordinate values of "9" and "16". Therefore, the index image generating unit 32 corrects or retains, as illustrated in FIG. 14, coordinate values correlated to the foreground identifier "3" as the minimum X coordinate value of "10", the minimum Y coordinate value of "7", the maximum X coordinate value of "12" and the maximum Y coordinate value of "16". This is because the minimum X coordinate value and the minimum Y coordinate value correlated to the foreground identifier "3" are not more than those correlated to the foreground identifier "8", the maximum X coordinate value correlated to the foreground identifier "3" is not less than that correlated to the foreground identifier "8", and the maximum Y coordinate value correlated to the foreground identifier "3" is smaller than that correlated to the foreground identifier "8".

Furthermore, the index image generating unit 32 corrects the foreground identifier "8" to the foreground identifier "3" as illustrated in FIG. 14. As is understood from the generated IC table of FIG. 7, a numerical value corresponding to an address in the corrected IC table is equal to the numerical value of the corresponding foreground identifier obtained before the mergence. Accordingly, by referring to an address stored in the corrected IC table and the foreground identifier correlated to the address, the relationship between a foreground identifier obtained before the mergence and a foreground identifier attained after the mergence is obviously understood.

The index image generating unit 32 of this embodiment does not change the RGB values correlated to the foreground identifier "3". In other words, the foreground identifier "3" attained after the mergence is correlated to color information of a color corresponding to a larger number of pixels before the mergence. As a result, the blue corresponding to a larger number of pixels in the generated foreground layer of FIG. 6 is allowed to remain in the corrected foreground layer of FIG. 12 with priority to the dark blue corresponding to a smaller number of pixels. If the foreground identifiers "3" and "8" are merged into the foreground identifier "8", a color corresponding to a smaller number of pixels in the generated foreground layer of FIG. 6 is allowed to remain in the corrected foreground layer of FIG. 12 with priority to a color corresponding to a larger number of pixels. Therefore, color change in a compressed color image is conspicuous when compared with a color image obtained before the compression, and hence, the visual image quality is degraded.

Subsequently, referring to the generated IC table now being corrected, the number of pixels correlated to the foreground identifier "4" is "9", and the number of pixels correlated to the foreground identifier "5" is "9". Accordingly, there is no difference in influence on the image quality attained after the compression no matter whether the foreground identifier "4" is merged into the foreground identifier "5" or vice versa. Therefore, the index image generating unit 32 determines for convenience that the foreground identifier "5" with a larger address is merged into the foreground identifier "4" with a smaller address.

The total number of pixels correlated to the foreground identifiers "4" and "5" is "18". Therefore, the index image generating unit 32 corrects, as illustrated in FIG. 14, the number of pixels correlated to the foreground identifier "4" from "9" to "18" and the number of pixels correlated to the foreground identifier "5" from "9" to "0". Furthermore, the index image generating unit 32 corrects or retains, as illustrated in FIG. 14, coordinate values correlated to the foreground identifier "4" as the minimum X coordinate value of "0", the minimum Y coordinate value of "10", the maximum X coordinate value of "8" and the maximum Y coordinate value of "17". Moreover, the index image generating unit 32 corrects the foreground identifier "5" to the foreground identifier "4" as illustrated in FIG. 14.

As a result, the number of pixels having the foreground identifiers "3" is "8" and the number of pixels having the foreground identifier "8" is "0" in the corrected foreground layer as illustrated in FIG. 12. Also, the number of pixels having the foreground identifier "4" is "18" and the number of pixels having the foreground identifier "5" is "0".

Incidentally, the index image generating unit 32 is not limited to the configuration for correlating a foreground identifier attained after mergence to color information of a color corresponding to a larger number of pixels before the mergence. Instead, the index image generating unit 32 may calculate color information of a representative color by averaging color information of colors obtained before the mergence with weights in proportion to the numbers of pixels corresponding to the color information provided, so as to correlate the calculated color information to a foreground identifier attained after the mergence. In this case, the numbers of pixels corresponding to respective foreground identifiers affect the color information of the representative color, and hence, there is no need to merge a foreground identifier corresponding to a smaller number of pixels into a foreground identifier corresponding to a larger number of pixels, but a foreground identifier with, for example, a smaller address may be merged into a foreground identifier with a larger address.

When the second similar color calculation method is employed, by referring to the generated IC table of FIG. 7, the number of pixels correlated to the foreground identifier "3" is "5", and the number of pixels correlated to the foreground identifier "6" is "22". Therefore, the index image generating unit 32 determines that the foreground identifier "3" is merged into the foreground identifier "6" (see S57 of FIG. 20).

Furthermore, the sum of pixels correlated to the foreground identifiers "3" and "6" is "27". Therefore, the index image generating unit 32 corrects, as illustrated in FIG. 14, the number of pixels correlated to the foreground identifier "3" from "5" to "0" and the number of pixels correlated to the foreground identifier "6" from "22" to "27".

Furthermore, by referring to the generated IC table of FIG. 7, respective coordinate values correlated to the foreground identifiers "3" and "6" are respectively minimum X coordinate values of "10" and "6", minimum Y coordinate values of "7" and "13", maximum X coordinate values of "12" and "15" and maximum Y coordinate values of "9" and "19". Therefore, the index image generating unit 32 corrects or retains, as illustrated in FIG. 14, coordinate values correlated to the foreground identifier "3" as the minimum X coordinate value of "6", the minimum Y coordinate value of "7", the maximum X coordinate value of "15" and the maximum Y coordinate value of "19". Furthermore, the index image generating unit 32 corrects the foreground identifier "3" to the foreground identifier "6" as illustrated in FIG. 14.

Subsequently, referring to the generated IC table now being corrected, the number of pixels correlated to the foreground identifier "6" is "27", and the number of pixels correlated to the foreground identifier "8" is "3". Accordingly, the index image generating unit 32 determines that the foreground identifier "8" generating unit 32 determines that the foreground identifier "8" is merged into the foreground identifier "6". Also, the sum of pixels correlated to the foreground identifiers "6" and "8" is "30".

Therefore, the index image generating unit 32 corrects, as illustrated in FIG. 14, the number of pixels correlated to the foreground identifier "6" from "27" to "30" and the number of pixels correlated to the foreground identifier "8" from "3" to "0". Furthermore, the index image generating unit 32 retains, as illustrated in FIG. 14, coordinate values correlated to the foreground identifier "6" as the minimum X coordinate value of "7", the minimum Y coordinate value of "7", the maximum X coordinate value of "15" and the maximum Y coordinate value of "19". This is because the minimum X coordinate value and the minimum Y coordinate value correlated to the foreground identifier "6" are not more than those correlated to the foreground identifier "8", and the maximum X coordinate value and the maximum Y coordinate value correlated to the foreground identifier "6" are not less than those correlated to the foreground identifier "8", and hence, there is no need to change them.

Furthermore, the index image generating unit 32 corrects the foreground identifier "8" to the foreground identifier "6" as illustrated in FIG. 14. As a result, the number of pixels having the foreground identifiers "6" is "30" and the number of pixels having the foreground identifiers "3" and "8" is "0" in the corrected foreground layer as illustrated in FIG. 13.

FIG. 16 is a schematic diagram of an exemplary binary image generated based on the corrected foreground layer of FIG. 12. In the binary image of FIG. 16, merely the pixels having the foreground identifier "3" in the corrected foreground layer of FIG. 12 (namely, the pixels belonging to the pixel groups E3 and E8) have a pixel value of "0" and all the other pixels have a pixel value of "1". The pixels belonging to the pixel groups E3 and E8 are pixels having the foreground identifiers "3" and "8" in the generated foreground layer of FIG. 6. Accordingly, the binary images of FIGS. 8 and 9 are not generated based on the corrected foreground layer of FIG. 12.

Similarly, a binary image in which merely the pixels having the foreground identifier "1" in the corrected foreground layer of FIG. 12 (namely, the pixels belonging to the pixel group E1) have a pixel value of "0" and all the other pixels have a pixel value of "1", a binary image in which merely the pixels having the foreground identifier "2" in the corrected foreground layer of FIG. 12 (namely, the pixels belonging to the pixel group E2) have a pixel value of "0" and all the other pixels have a pixel value of "1", etc. are generated. In this manner, when binary images are generated based on the corrected foreground layer of FIG. 12, the number of generated binary images is not 8 in one-to-one correspondence with the pixel groups E1 through E8 but 6. Specifically, 6 binary images, that is, a binary image corresponding to the pixel group E1, a binary image corresponding to the pixel group E2, a binary image corresponding to the pixel groups E3 and E8, a binary image corresponding to the pixel groups E4 and E5, a binary image corresponding to the pixel group E6 and a binary image corresponding to the pixel group E7, are generated.

Similarly, when binary images are generated based on the corrected foreground layer of FIG. 13, the number of generated binary images is 6. Specifically, 6 binary images, that is, a binary image corresponding to the pixel group E1, a binary image corresponding to the pixel group E2, a binary image corresponding to the pixel group E4, a binary image corresponding to the pixel group E5, a binary image corresponding to the pixel groups E3, E6 and E8 and a binary image corresponding to the pixel group E7, are generated.

Although the mergence of chromatic colors is mainly described in this embodiment, achromatic colors may be similarly merged.

Incidentally, the index image generating unit 32 is not limited to the configuration for reducing the number of kinds of foreground identifiers by merging similar colors. The index image generating unit 32 may employ a configuration for reducing the number of kinds of foreground identifiers by, for example, replacing a foreground identifier corresponding to a small number of pixels with a background identifier. In other words, the number of kinds of foreground identifiers may be reduced by regarding a part of a foreground as a background. In this case, a part of the foreground regarded as the background is not included in a foreground layer and also in binary images, and hence should be included in a background layer. Accordingly, if a foreground mask is used for generating a background layer, the foreground mask should be corrected before generating the background layer so as to make the foreground mask affected by the replacement of the foreground identifier, which process is disadvantageously complicated. In order to overcome such a disadvantage, a foreground layer may be used for generating a background layer in this case.

Alternatively, the index image generating unit 32 may employ a plurality of methods together, for example, so that foreground identifiers are merged with respect to a combination with a color difference ΔColC not more than a predetermined threshold value and that foreground identifiers are replaced with a background identifier with respect to a combination with a color difference ΔColC exceeding the predetermined threshold value.

In the case where the first or second similar color calculation method is employed for chromatic colors (or achromatic colors) as in this embodiment, the numbers $n_1$ and $m_1$ of kinds of chromatic colors should satisfy $n_1 \geq 3$ and $n_1 > m_1 \geq 2$ (or the numbers $n_2$ and $m_2$ of kinds of achromatic colors should satisfy $n_2 \geq 3$ and $n_2 \geq m_2 > 2$). In this embodiment, the numbers $Q_1$ and $Q_2$ are both 2 or more, and hence, if $n_1 > Q_1$ (or $n_2 > Q_2$), $n_1 \geq 3$ and $n_1 > m_1 \geq 2$ (or $n_2 \geq 3$ and $n_2 > m_2 > 2$) automatically hold.

Figure 18:
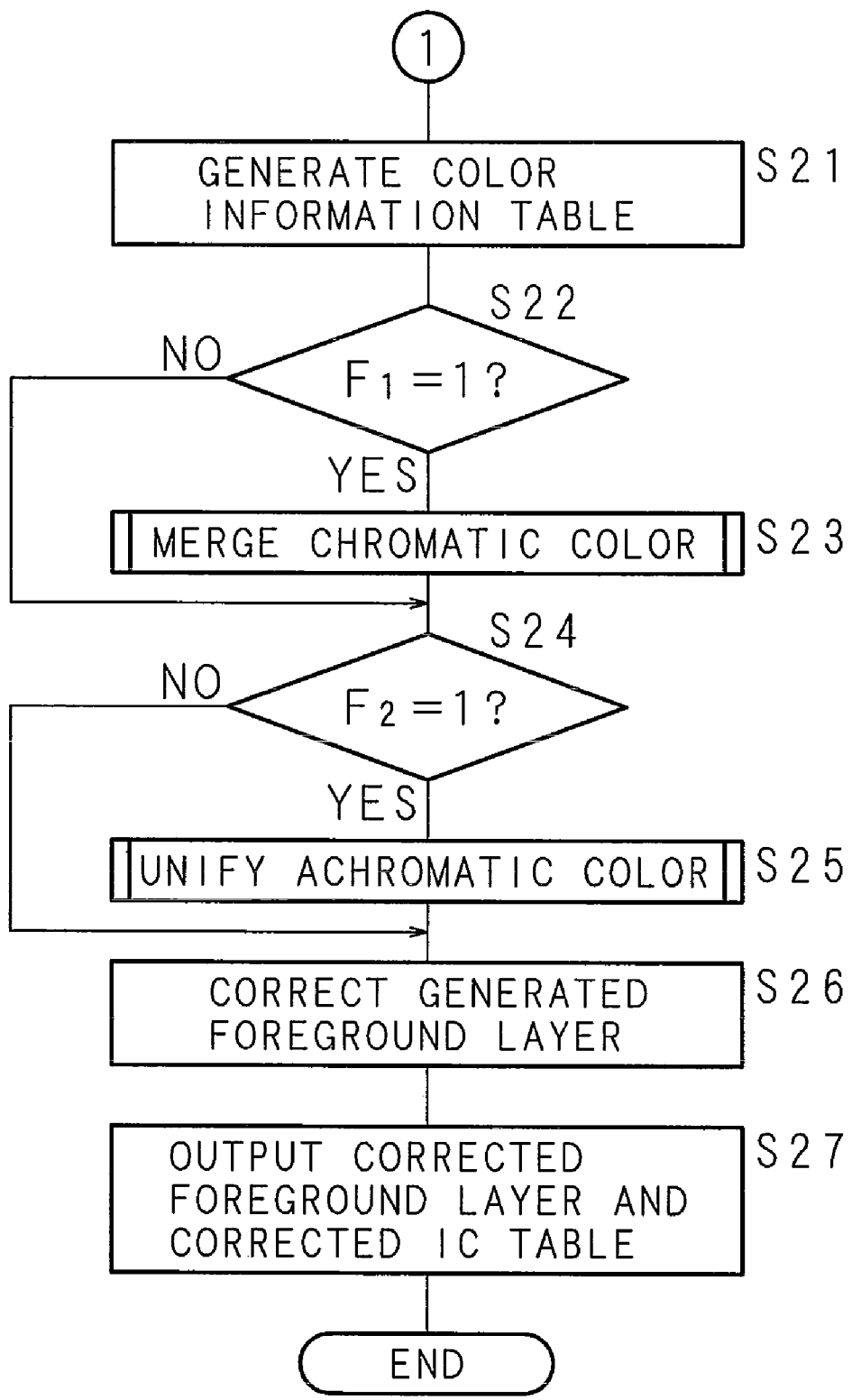
FIG. 18 is a flowchart illustrating procedures in the indexing process executed in the compression process section included in the image forming apparatus of Embodiment 1.

FIGS. 17 and 18 are flowcharts illustrating procedures in an indexing process executed the compression process section 3.

As illustrated in FIG. 17, the index image generating unit 32 first generates a generated IC table and a generated foreground layer (S11). In the generated IC table generated in S11, however, an address and an identifier are stored, and invalid values are stored as respective coordinate values, color information and the number of pixels. Furthermore, each pixel of the generated foreground layer has an invalid value. Subsequently, the index image generating unit 32 selects a pixel included in the generated foreground layer but not selected yet as a target pixel (S12), and determines an identifier to be allocated to the target pixel by referring to the pixel values of pixels in a foreground mask and a color image corresponding to the target pixel selected in S12 (S13).

The index image generating unit 32 updates the generated foreground layer by providing the target pixel selected in S12 with the identifier determined in S13 (S14), and updates necessary data out of the respective coordinate values, the color information and the number of pixels stored in the generated IC table correlatively with the identifier determined in S13 (S15). More specifically, the number of pixels correlated to the identifier determined in S13 is incremented in S15.

Furthermore, the respective coordinate values are updated or retained in S15 on the basis of a coordinate (x, y) of the target pixel selected in S12. When the respective coordinate values stored in the generated IC table have invalid values, the coordinate value x of the target pixel is stored as a minimum X coordinate maximum X coordinate value, and the coordinate value y of the target pixel is stored as a minimum Y coordinate value and a maximum Y coordinate value. On the other hand, when the respective coordinate values stored in the generated IC table are valid values, the minimum X coordinate value, the minimum Y coordinate value, the maximum X coordinate value and the maximum Y coordinate value are compared with the coordinate (x, y) of the target pixel so as to update or retain the respective coordinate values in accordance with the result of the comparison. When the color information stored in the generated IC table has an invalid value in executing the procedure of S15, the color information stored in the generated IC table is updated in S15 on the basis of the color information of the target pixel selected in S12.

Furthermore, the index image generating unit 32 determines whether or not all pixels included in the generated foreground layer have been selected (S16), and when there remains a pixel not selected (NO in S16), it returns the processing to S12. When all the pixels have been selected (YES in S16), the index image generating unit 32 proceeds the processing to S17 and after that. In S11 through S16 described above, the index image generating unit 32 functions as foreground layer generating unit and a table generating unit.

The index image generating unit 32 determines whether or not a number N is larger than a number M (S17), and when N≦M (NO in S17), it outputs the generated foreground layer, the generated IC table, the foreground mask and the image data of the color image to the background layer generating unit 33 (S18) and terminates the indexing process. When N≦M (YES in S17), the index image generating unit 32 proceeds the processing to S19. In S18, the index image generating unit 32 functions as a reduction determining unit.

The index image generating unit 32 classifies a foreground identifier into a foreground identifier corresponding to a chromatic color or a foreground identifier corresponding to an achromatic color on the basis of RGB values stored in the generated IC table correlatively to the foreground identifier (S19). In S19, the index image generating unit 32 functions as a chromatic/achromatic color classifying unit. Subsequently, the index image generating unit 32 determines numbers $m_1$ and $m_2$ by invoking a subroutine of a number determining process (see FIG. 19) (S20). In S20, the index image generating unit 32 functions as a number determining unit.

FIG. 19 is a flowchart illustrating procedures in the subroutine of the number determining process executed in the compression process section 3.

The index image generating unit 32 determines whether or not the number $n_1$ is larger than the predetermined number $Q_1$ by referring to the generated IC table (S31), and when $n_1 > Q_1$ (YES in S31), it determines whether or not the number $n_2$ is larger than the predetermined number $Q_2$ (S32). In S31 and S32, the index image generating unit 32 functions as a first comparing unit and a second comparing unit.

When $n_2 > Q_2$ (YES in S32), the index image generating unit 32 assigns the calculation results of the expressions (M13) and (M14) to the numbers $m_1$ and $m_2$ (S33). Furthermore, the index image generating unit 32 determines whether or not the number $m_1$ calculated in S33 is not less than the number $Q_1$ (S34), and when $m_1 \geq Q_1$ (YES in S34), it determines whether or not the number $m_2$ calculated in S33 is not less than the number $Q_2$ (S35). When $m_2 > Q_2$ (YES in S35), the index image generating unit 32 sets "1" to a flag $F_1$ for indicating whether or not foreground identifiers corresponding to chromatic colors are to be merged, and sets "1" to a flag $F_2$ for indicating whether or not foreground identifiers corresponding to achromatic colors are to be merged (S36).

When $n_1 \leq Q_1$ (NO in S31) or $m_1 < Q_1$ (NO in S34), the index image generating unit 32 assigns the calculation results of the expressions (M9) and (M10) to the numbers $m_1$ and $m_2$ (S37), sets "0" to the flag $F_1$ and sets "1" to the flag $F_2$ (S38). When $n_2 \leq Q_2$ (NO in S32) or $m_2 < Q_2$ (NO in S35), the index image generating unit 32 assigns the calculation results of the expressions (M11) and (M12) to the numbers $m_1$ and $m_2$ (S39), sets "1" to the flag $F_1$ and sets "0" to the flag $F_2$ (S40).

After completing the procedure of S36, S38 or S40, the index image generating unit 32 terminates the number determining process and returns the processing to the main routine.

As illustrated in FIG. 18, the index image generating unit 32 generates a color information table as illustrated in FIG. 10A or 10B on the basis of the generated IC table of FIG. 7 (S21) and determines whether or not the flag $F_1$ is set to "1" (S22). When $F_1=1$ (YES in S22), the index image generating unit 32 reduces the number $n_1$ to the number $m_1$ by invoking a subroutine of a chromatic color merging process (see FIG. 20 described below) (S23). In S23, the index image generating unit 32 functions as a number reducing unit for chromatic colors.

After completing the procedure of S23 or when $F_1=0$ (NO in S22), the index image generating unit 32 determines whether or not the flag $F_2$ is set to "1" (S24). When $F_2=1$ (YES in S24), the index image generating unit 32 reduces the number $n_2$ to the number $m_2$ by invoking a subroutine of an achromatic color merging process (see FIG. 21 described below) (S25). In S25, the index image generating unit 32 functions as a number reducing unit for achromatic colors. Through the execution of the procedure of S23 and/or S25, the generated IC table is corrected to a corrected IC table.

After completing the procedure of S25 or when $F_2=0$ (NO in S24), the index image generating unit 32 corrects the generated foreground layer to a corrected foreground layer by referring to the corrected IC table (S26). In S26, the index image generating unit 32 extracts a foreground identifier having a value different from its own address in the corrected IC table and replaces, out of foreground identifiers included in the generated foreground layer, a foreground identifier having the same value as the extracted address (namely, a foreground identifier obtained before mergence) with the extracted foreground identifier (namely, a foreground identifier attained after the mergence). In S26, the index image generating unit 32 functions as a foreground layer correcting unit.

Ultimately, the index image generating unit 32 outputs the corrected foreground layer, the corrected IC table, the foreground mask and the image data of the color image to the background layer generating unit 33 (S27) and terminates the indexing process.

Figure 20:
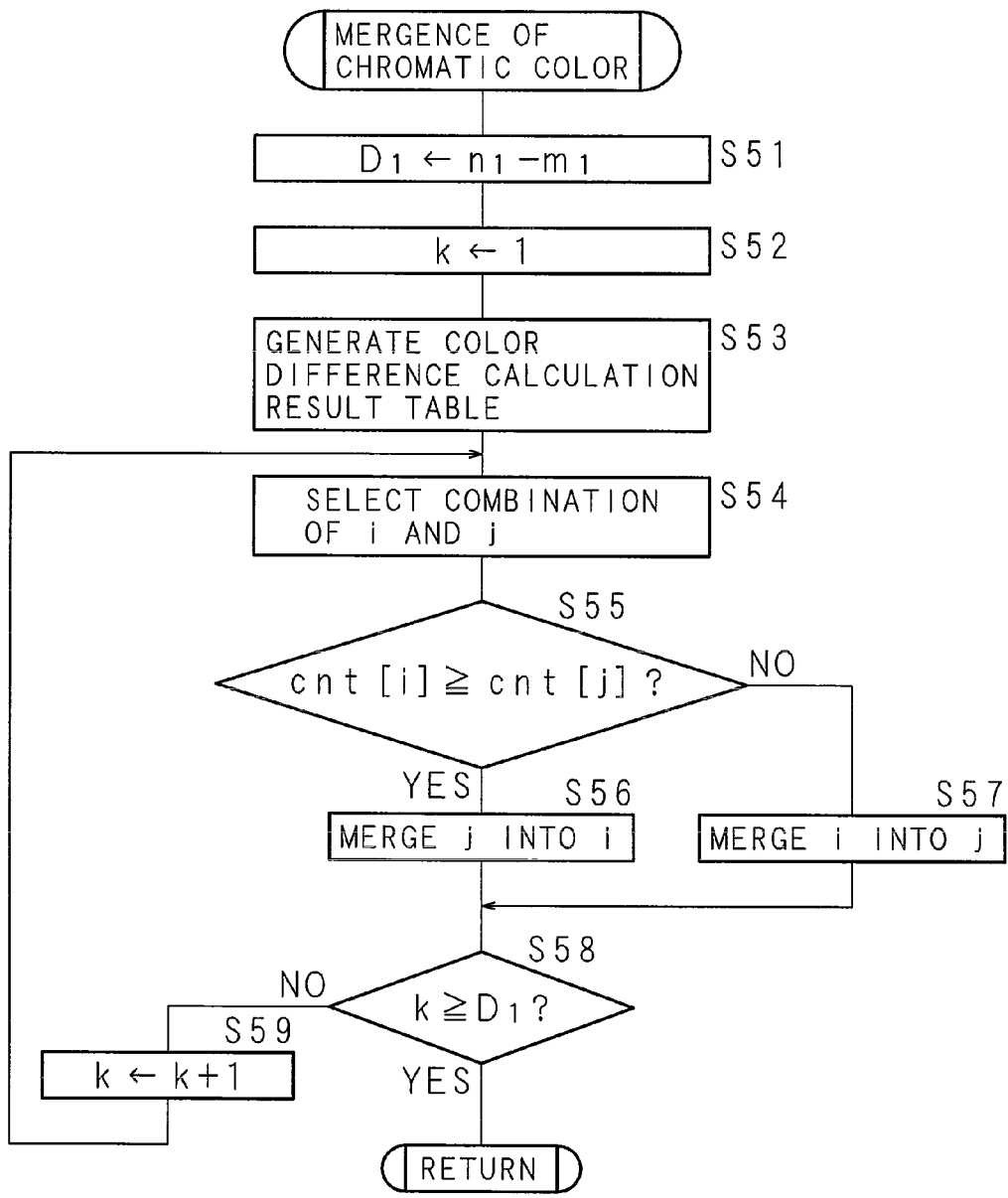
FIG. 20 is a flowchart illustrating procedures in a subroutine of a chromatic color merging process executed in the compression process section included in the image forming apparatus of Embodiment 1.

FIG. 20 is a flowchart illustrating procedures in the subroutine of the chromatic color merging process executed in the compression process section 3.

The index image generating unit 32 assigns the calculation result of the expression (M25) to the reducing number $D_1$ (S51) and substitutes "1" for a variable k (S52), and then, generates a color difference calculation result table as illustrated in FIG. 11 on the basis of the color information table generated in S21 (S53). In S53, the index image generating unit 32 functions as a color difference calculating unit. In S21, a color information table as illustrated in FIG. 10A is generated when the first similar color calculation method is employed, and a color information table as illustrated in FIG. 10R is generated when the second similar color calculation method is employed. In S53, when the first similar color calculation method is employed, a color difference ΔColC of a combination of foreground identifiers "i" and "j" is calculated in accordance with the expressions (M27) through (M30), and when the second similar color calculation method is employed, a weighted color difference ΔWtColC of a combination of foreground identifiers "i" and "j" is calculated in accordance with the expressions (M27) through (M31).

Subsequently, referring to the color difference calculation result table generated in S53, the index image generating unit 32 selects a combination of foreground identifiers "i" and "j" having the smallest color difference ΔColC or the smallest weighted color difference ΔWtColC (S54). In S54, a combination of foreground identifiers "i" and "j" is selected with a foreground identifier invalidated through a procedure of S56 or S57 described below removed. In S54, the index image generating unit 32 functions as a chromatic color combining unit.

Furthermore, referring to the generated IC table, the index image generating unit 32 determines whether or not a number cnt[i] of pixels correlated to the foreground identifier "i" is not less than a number cnt[j] of pixels correlated to the foreground identifier "j" (S55). When cnt[i]≧cnt[j] (YES in S55), the index image generating unit 32 merges the foreground identifier "j" into the foreground identifier "i" (S56). On the other hand, when cnt[i]<cnt[j] (NO in S55), the index image generating unit 32 merges the foreground identifier "i" into the foreground identifier "j" (S57).

Through the procedures of S56 and S57, the index image generating unit 32 corrects the IC table in accordance with the result of the mergence. In S56, the number of pixels correlated to the foreground identifier "i" is corrected as described above, and respective coordinate values are corrected or retained as described above. Furthermore, the number of pixels correlated to the foreground identifier "j" is corrected to "0", and the foreground identifier "j" is replaced with the foreground identifier "i". Incidentally, respective coordinate values and color information correlated to the foreground identifier "j" may be replaced with invalid values at this point. The procedure of S57 is similar to the procedure of S56 as far as the foreground identifiers "i" and "j" are respectively replaced with the foreground identifiers "j" and "i". In S55 through S57, the index image generating unit 32 functions as a chromatic color merging unit.

After completing the procedure of S56 or S57, the index image generating unit 32 determines whether or not the variable k is not less than the reducing number $D_1$ (S58). When k<$D_1$ (NO in S58), the index image generating unit 32 increments the variable k (S59) and returns the processing to S54. When k≧$D_1$ (YES in S58), the index image generating unit 32 terminates the chromatic color merging process and returns the processing to the original routine.

Figure 21:
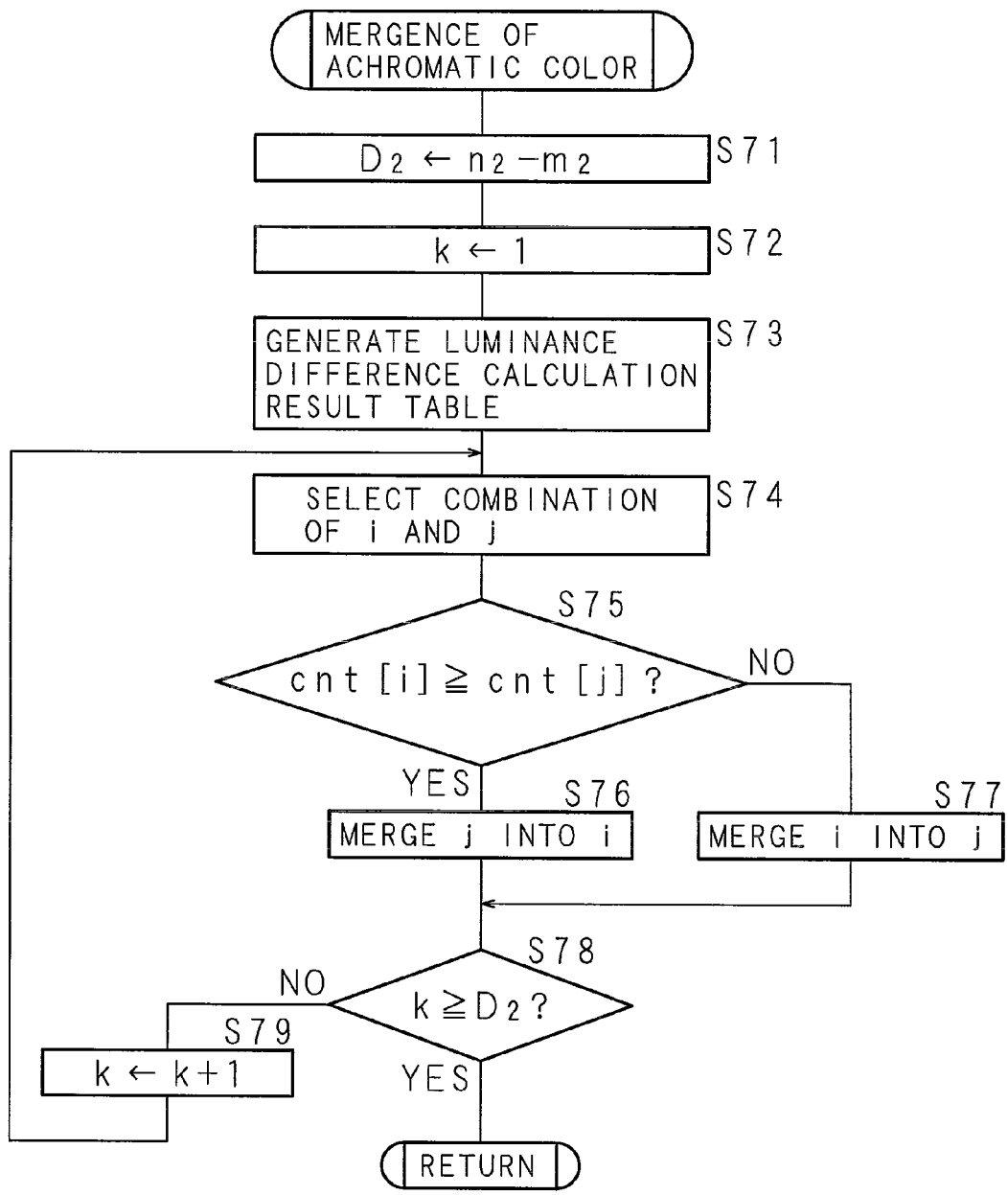
FIG. 21 is a flowchart illustrating procedures in a subroutine of an achromatic color merging process executed in the compression process section included in the image forming apparatus of Embodiment 1.

FIG. 21 is a flowchart illustrating procedures in the subroutine of the achromatic color merging process executed in the compression process section 3.

The index image generating unit 32 assigns the calculation result of the expression (M26) to the reducing number $D_2$ (S71) and substitutes "1" for a variable k (S72), and then generates luminance difference calculation result table similar to the color difference calculation result table illustrated in FIG. 11 on the basis of the color information table generated in S21 (S73). In S73, the index image generating unit 32 functions as a luminance difference calculating unit. In S73, when the first similar color calculation method is employed, a luminance difference ΔColL of a combination of foreground identifiers "i" and "j" is calculated in accordance with the expression (M32), and when the second similar color calculation method is employed, a weighted luminance difference ΔWtColL of a combination of foreground identifiers "i" and "j" is calculated in accordance with the expression (M33).

Subsequently, referring to the luminance difference calculation result table generated in S73, the index image generating unit 32 selects a combination of foreground identifiers "i" and "j" having the smallest luminance difference ΔColL or the smallest weighted luminance difference ΔWtColL (S74). In S54, a combination of foreground identifiers "i" and "j" is selected with a foreground identifier invalidated through a procedure of S76 or S77 described below removed. In S74, the index image generating unit 32 functions as an achromatic color combining unit.

Furthermore, referring to the generated IC table, the index image generating unit 32 determines whether or not a number cnt[i] of pixels correlated to the foreground identifier "i" is not less than a number cnt[j] of pixels correlated to the foreground identifier "j" (S75). When cnt[i]≧cnt [j] (YES in S75), the index image generating unit 32 merges the foreground identifier "j" into the foreground identifier "i" (S76). On the other hand, when cnt[i]<cnt[j] (NO in S75), the index image generating unit 32 merges the foreground identifier "i" into the foreground identifier "j" (S77).

Through the procedures of S76 and S77, the index image generating unit 32 corrects the IC table in accordance with the result of the mergence. In S76, the number of pixels correlated to the foreground identifier "i" is corrected as described above, and respective coordinate values are corrected or retained as described above. Furthermore, the number of pixels correlated to the foreground identifier "j" is corrected to "0", and the foreground identifier "j" is replaced with the foreground identifier "i". Incidentally, respective coordinate values and color information correlated to the foreground identifier "j" may be replaced with invalid values at this point. The procedure of S77 is similar to the procedure of S76 as far as the foreground identifiers "i" and "j" are respectively replaced with the foreground identifiers "j" and "i". In S75 through S77, the index image generating unit 32 functions as an achromatic color merging unit.

After completing the procedure of S76 or S77, the index image generating unit 32 determines whether or not the variable k is not less than the reducing number $D_2$ (S78). When k<$D_2$ (NO in S78), the index image generating unit 32 increments the variable k (S79) and returns the processing to S74. When k≧$D_2$ (YES in S78), the index image generating unit 32 terminates the achromatic color merging process and returns the processing to the main routine.

A background layer will now be described. FIG. 5B exemplarily illustrates one background layer generated on the basis of the image data of the color image illustrated in FIG. 3 and the foreground mask illustrated in FIG. 4 (or the foreground layer illustrated in FIG. 5B). In a background layer, the background is expressed with colors of the background of the color image, and the foreground is expressed with colors of the background. More specifically, in a background layer, a color of the foreground of the color image is replaced with (i.e., covered by, as it is called) a color of a portion of the background disposed in the vicinity of the foreground.

In the background layer of FIG. 5B, the word "TEST" expressed with light blue, red, violet and blue in the color image is expressed with green, which is the same color as the area filled in with green, and hence cannot be distinguished from the area filled in with green. Also, a portion where the sentence "This is a test image." is expressed with black in the color image is a white ground in the background layer.

More specifically, the background layer generating unit 33 of FIG. 2 determines whether each pixel of the image data of the color image corresponds to the foreground or the background by referring to the foreground mask (or the foreground layer), and covers a foreground pixel by a pixel value of a background pixel disposed in the vicinity of the foreground pixel. When there is no background pixel in the vicinity of the foreground pixel, namely, when there are merely foreground pixels in the vicinity of the target foreground pixel, the background layer generating unit 33 covers the target foreground pixel by a pixel value of another foreground pixel having been already covered. Incidentally, the background layer generating unit 33 may use, for covering a foreground pixel, an average value of pixel values of a plurality of pixels having been already covered instead of a pixel value of one pixel already covered.

At this point, a background pixel is a pixel having a pixel value corresponding to the background in the foreground mask (which pixel value is "1" in this embodiment) and a foreground pixel is a pixel having a pixel value corresponding to the foreground in the foreground mask (which pixel value is "0" in this embodiment). Incidentally, in a foreground layer, a background pixel is a pixel having a background identifier (which is "0" in this embodiment) and a foreground pixel is a pixel having a foreground identifier (which is an identifier other than "0" in this embodiment).

The background layer generating unit 33 subjects the thus generated background layer to conventional various image processing performed on a background layer (such as a resolution lowering process for lowering the resolution of the background layer to a half). Subsequently, the background layer generating unit 33 outputs the generated background layer, the foreground layer and the IC table to the binary image generating unit 34.

The binary image generating unit 34 generates binary images correspondingly to the respective foreground identifiers included in the foreground layer on the basis of the foreground layer and the IC table inputted from the background layer generating unit 33. More specifically, the binary image generating unit 34 repeatedly executes, with respect to the N or M kinds of foreground identifiers, generation of one binary image in which pixels having a specific foreground identifier have a pixel value of "1" and pixels having other foreground identifiers have a pixel value of "0". As a result, N or M binary images respectively corresponding to the N or M kinds of foreground identifiers are generated. Subsequently, the binary image generating unit 34 outputs the generated N or M binary images, the background layer and the IC table to the image compressing unit 35.

The image compressing unit 35 generates a compression file by compressing the N or M binary images, the background layer and the IC table inputted from the binary image generating unit 34 and by bringing the thus compressed data into one file, and outputs the generated compression file to the memory section 30 or the communication device 14. In this case, the binary images and the IC table are compressed by the lossless compression technique such as the MMR and the background layer is compressed by the lossy compression technique such as the JPEG. Incidentally, instead of compressing the IC table itself, the image compressing unit 35 may take out necessary and sufficient data (at least color information corresponding to the respective binary images) from the IC table mid compress merely the data taken out with other unnecessary data (such as the address and the number of pixels) discarded.

Alternatively, instead of compressing each binary image itself, the image compressing unit 35 may cut out and compress merely a necessary and sufficient portion of each binary image (specifically, a rectangular area restricted as a pixel range defined by the minimum X coordinate value, the minimum Y coordinate value, the maximum X coordinate value and the maximum Y coordinate value recorded in the IC table correlatively to a specific foreground identifier). Furthermore, the image compressing unit 35 may be provided with a function to change a data compression method in accordance with a predetermined instruction accepted in the operation panel 12. Further alternatively, the rectangular area may be cut out not by the image compressing unit 35 but by the binary image generating unit 34.

Alternatively, the binary image generating unit 34 may be disposed at the previous stage of the background layer generating unit 33. Further alternatively, the processing performed by the background layer generating unit 33 and the processing performed by the binary image generating unit 34 may be simultaneously executed. When the background layer is generated on the basis of the foreground mask, the processing performed by the index image generating unit 32 and the processing performed by the background layer generating unit 33 may be simultaneously executed.

In the image forming apparatus described so far, the compression process section 3 executes the various image processing, so as to attain a sufficiently small file size after the compression while suppressing large degradation of the image quality attained after the compression.

Embodiment 2

While the image compressing apparatus of this invention is included as a part of the image forming apparatus in Embodiment 1, an image compressing apparatus of this invention included as a part of a scanner apparatus will be exemplarily described in this embodiment, whereas like reference numerals are used to refer to like elements of Embodiment 1 so as to omit the description.

Figure 22:
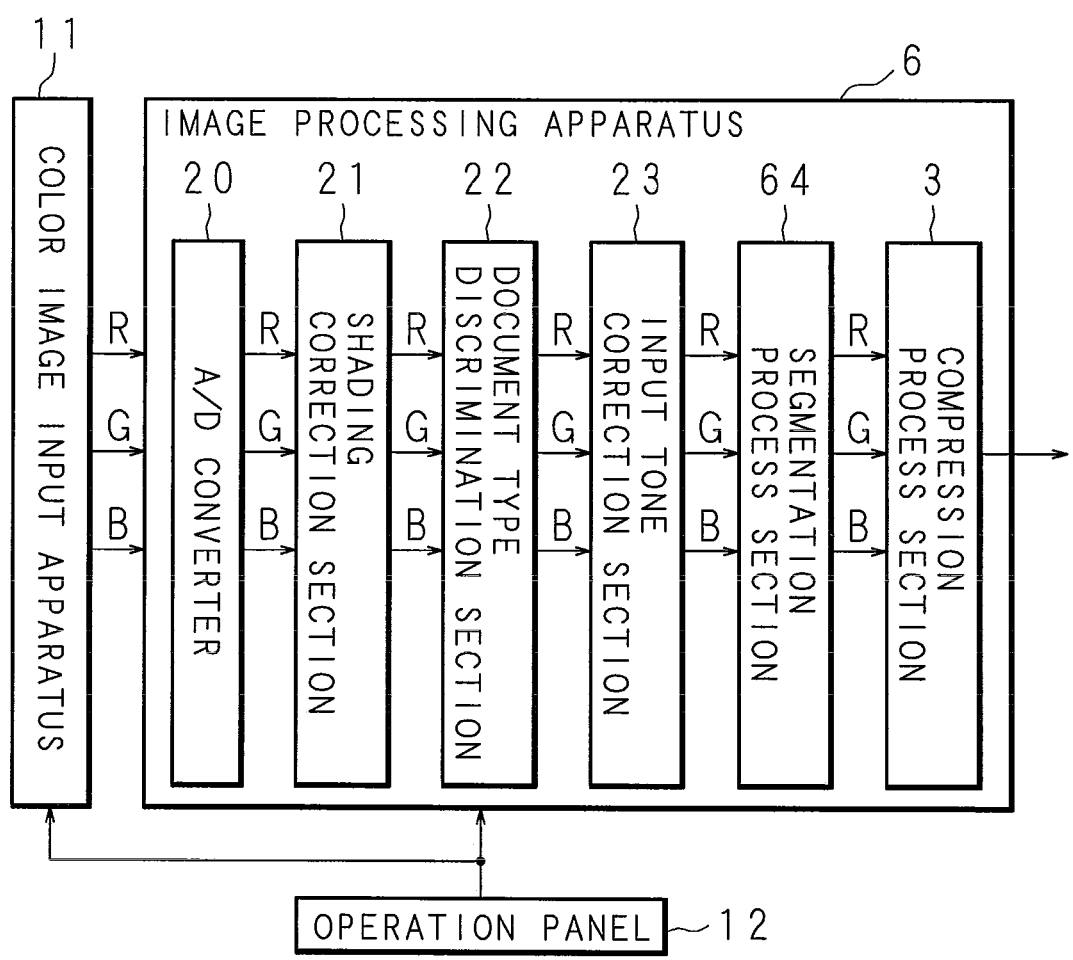
FIG. 22 is a block diagram illustrating the internal functional configuration of a scanner apparatus including an image compressing apparatus according to Embodiment 2.

FIG. 22 is a block diagram illustrating the internal functional configuration of a scanner apparatus including an image compressing apparatus according to Embodiment 2 of the invention.

The scanner apparatus includes an image processing apparatus 6, whose input side is connected to a color image input apparatus 11 and whose output side is connected to a host apparatus not shown such as a personal computer (PC) or a digital multi-function printer through a communication cable or a communication network not shown. The color image input apparatus 11 and the image processing apparatus 6 are connected to an operation panel 12.

The image processing apparatus 6 executes, on RGB analog signals inputted from the color image input apparatus 11, image processing similar to that of Embodiment 1 by using an A/D converter 20, a shading correction section 21, a document type discrimination section 22 and an input tone correction section 23, executes image processing described below by using a segmentation process section 64, and executes image processing similar to that of Embodiment 1 by using a compression process section 3. Subsequently, the image processing apparatus 6 transmits the thus generated compression file to the host apparatus.

The segmentation process section 64 performs the image processing similar to that of the segmentation process section 24 of Embodiment 1 but outputs the resultant signals and data to the compression process section 3 alone. The host apparatus executes a process for, for example, storing the compression file received from the image processing apparatus 6, transmitting the compression file to the outside or outputting an image obtained based on image data of a color image obtained by decompressing the compression file.

The scanner apparatus having the aforementioned configuration exhibits the similar effects to those of the image forming apparatus 1 of Embodiment 1.

Embodiment 3

Figure 23:
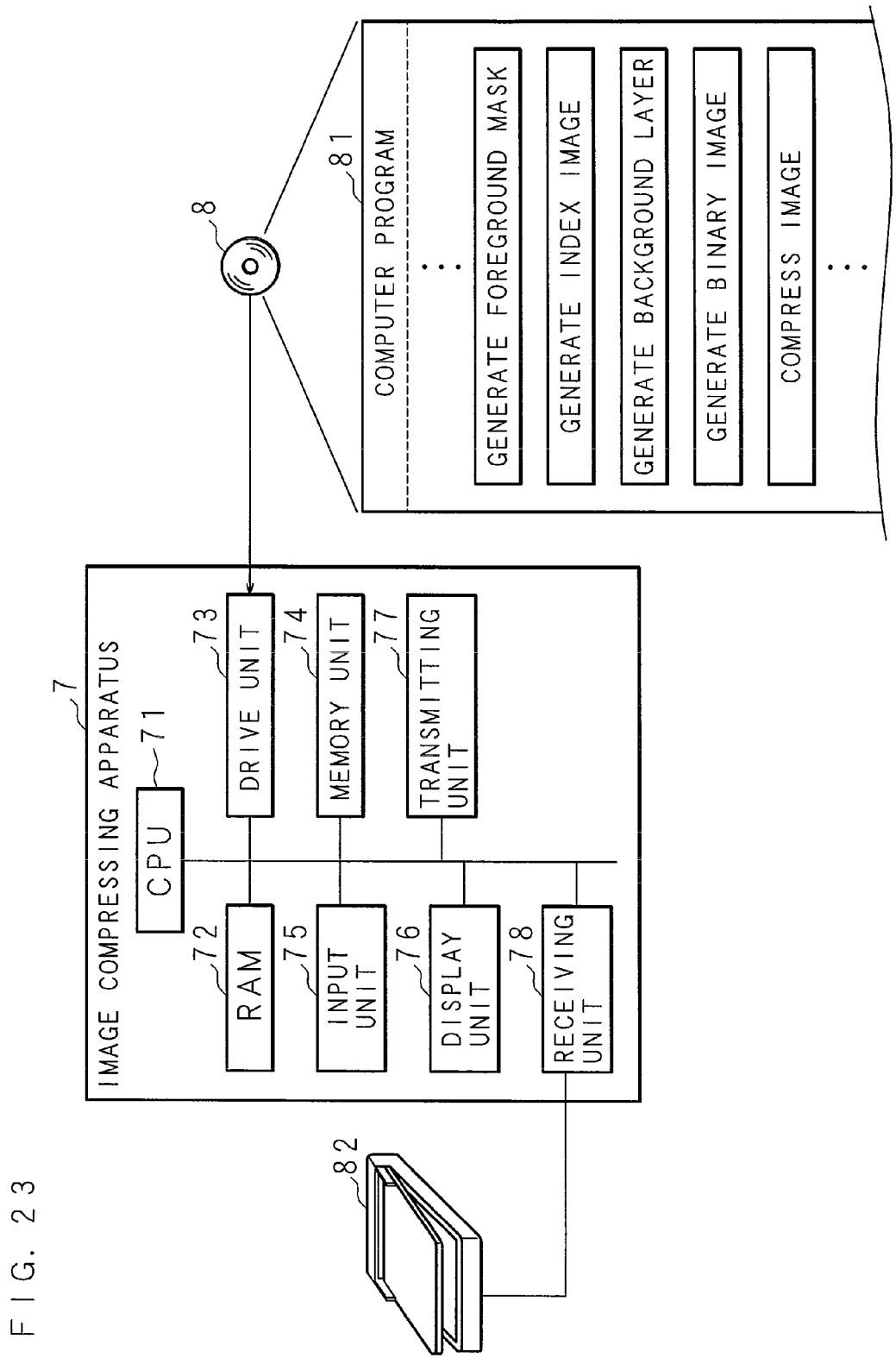
FIG. 23 is a block diagram illustrating the functional configuration of an image compressing apparatus according to Embodiment 3.

An image compressing apparatus of the present invention realized by a general purpose computer will be described in Embodiment 3. FIG. 23 is a block diagram illustrating the functional configuration of an image compressing apparatus 7 according to Embodiment 3 of the invention.

The image compressing apparatus 7 of this embodiment uses a general purpose computer (such as a PC) and includes a CPU 71 for performing various calculations, a RAM 72 for temporarily storing information generated during the calculations, a drive unit 73 for reading information from a recording medium 8 and a memory unit 74. For example, the recording medium 8 is an optical disk, the drive unit 73 is a CD-ROM drive and the memory unit 74 is a hard disk.

The CPU 71 allows the drive unit 73 to read a computer program 81 from the recording medium 8 and allows the memory unit 74 to store the read computer program 81. Furthermore, the image compressing apparatus 7 includes an input unit 74 and a display unit 76. The input unit 75 is a keyboard, a pointing device, or the like that is operated by a user for inputting various information (such as a process instruction), and the display unit 76 is, for example, a liquid crystal display for displaying various information. Furthermore, the image compressing apparatus 7 includes a transmitting unit 77 connectable to an external communication network not shown and a receiving unit 78 connected to an external image reader apparatus 82.

The CPU 71 transmits data to the outside through the transmitting unit 77 by a communication method such as facsimile or an e-mail. The image reader apparatus 82 is a scanner apparatus, a digital multi-function printer or the like, which generates image data of a color image by optically reading a document and transmits the generated image data of the color image to the image compressing apparatus 7. The receiving unit 78 of the image compressing apparatus 7 receives the image data transmitted from the image reader apparatus 82.

Figure 24:
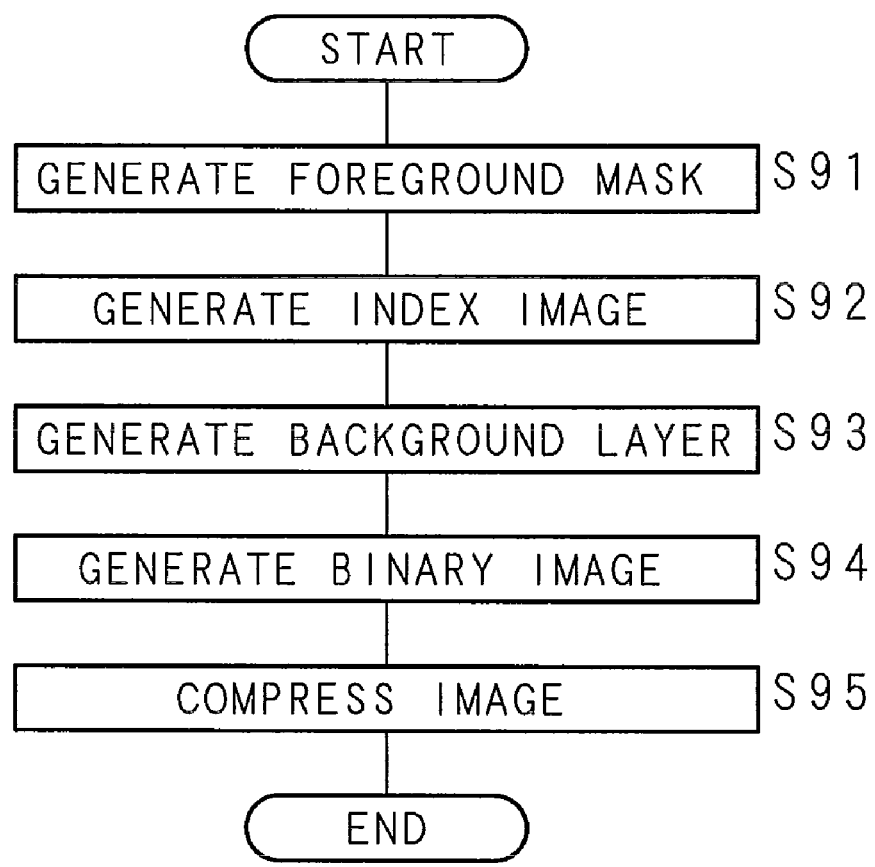
FIG. 24 is a flowchart illustrating procedures in a color image compression process executed in the image compressing apparatus of Embodiment 3.

The CPU 71 loads the computer program 81 into the RAM 72 and executes a color image compression process employing an image compressing method according to an embodiment of the invention in accordance with the loaded computer program 81. FIG. 24 is a flowchart illustrating procedures in the color image compression process executed in the image compressing apparatus 7 of Embodiment 3 of the invention. The color image compression process is executed when the receiving unit 78 receives image data of a color image.

The CPU 71 executes a foreground mask generating process similar to the process executed by the foreground mask generating unit 31 of Embodiment 1 (S91), and executes an index image generating process similar to the process executed by the index image generating unit 32 of Embodiment 1 (S92). Subsequently, the CPU 71 executes a background layer generating process similar to the process executed by the background layer generating unit 33 of Embodiment 1 (S93), executes a binary image generating process similar to the process executed by the binary image generating unit 34 of Embodiment 1 (S94), and ultimately executes an image compression process similar to the process executed by the image compressing unit 35 of Embodiment 1 (S95), and the color image compression process is terminated. Incidentally, the computer program 81 may employ a constitution for executing the procedure of S94 before executing the procedure of S93.

The CPU 71 allows a compression file generated by executing the color image compression process to be stored in the memory unit 74 or to be sent to the transmitting unit 77. Also, the CPU 71 transmits a generated compression file or a compression file read from the memory unit 74 to the outside through the transmitting unit 77.

The image compressing apparatus 7 having the aforementioned configuration exhibits similar effects to those of the image forming apparatus 1 of Embodiment 1.

Incidentally, the recording medium of this invention where the computer program of this invention is recorded may be any of a magnetic tape, a magnetic disk, a portable hard disk, an optical disk such as a CD-ROM, an MO, an MD or a DVD, and a card type recording medium such as an IC card (including a memory card) or an optical card. Alternatively, the recording medium of this invention may be a semiconductor memory that may be loaded in the image compressing apparatus 7 to read contents recorded therein by the CPU 71, such as a mask ROM, an EPROM (Erasable Programmable Read Only Memory), an EEPROM (Electrically Erasable Programmable Read Only Memory) or a flash ROM.

Furthermore, the computer program of this invention may be downloaded into the image compressing apparatus 7 to be stored in the memory unit 74 from an external server not shown connected to the image compressing apparatus 7 through a communication network such as the Internet or a LAN. In this case, a program necessary for downloading the computer program may be stored in advance in the memory unit 74 or may be read from a predetermined recording medium by the drive unit 73 to be loaded into the RAM 72 if necessary.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image compressing method for generating, from a foreground layer including N (wherein N is a natural number) kinds of foreground identifiers for identifying color information of respective pixels of a foreground corresponding to a text and/or a line art included in a color image consisting of a plurality of pixels, M (wherein M is a natural number satisfying M<N) binary images respectively corresponding to specific foreground identifiers and compressing the M binary images, comprising steps of:

reducing or retaining $n_1$ (wherein $n_1$ is an integer satisfying $n_1 \geq 0$) kinds of foreground identifiers for identifying color information of chromatic colors to $m_1$ (wherein $m_1$ is an integer satisfying $0 \leq m_1 \leq n_1$); and reducing or retaining $n_2$ (wherein $n_2$ is an integer satisfying $n_2 \geq 0$ and $N=n_1+n_2$) kinds of foreground identifiers for identifying color information of achromatic colors to $m_2$ (wherein $m_2$ is an integer satisfying $0 \leq m_2 \leq n_2$ and $m_1+m_2=M$); and further comprising the steps of:

generating a foreground mask representing the respective pixels of the foreground on the basis of the color image;

generating, on the basis of the generated foreground mask and the color image, a foreground layer in which color information of the respective pixels of the foreground is replaced with the N kinds of foreground identifiers for identifying color information of the foreground and color information of respective pixels of a background is replaced with a background identifier indicating that the pixels correspond to the background;

generating a table in which color information of the foreground, a foreground identifier for identifying the color information and a number of pixels having the foreground identifier out of all pixels included in the foreground layer are correlated and stored;

determining whether or not a number of kinds of foreground identifiers stored in the generated table is to be reduced to be smaller than N;

classifying the color information stored in the table into the color information of the chromatic colors and the color information of the achromatic colors when it is determined that the number of kinds of foreground identifiers is to be reduced;

determining, in order to retain or reduce the number $n_1$ of kinds of foreground identifiers for identifying the color information classified as the chromatic colors and the number $n_2$ of kinds of foreground identifiers for identifying the color information classified as the achromatic colors, the number $m_1$ of kinds of foreground identifiers for identifying the color information of the chromatic colors to be attained and the number $m_2$ of kinds of foreground identifiers for identifying the color information of the achromatic colors to be attained;

reducing a number of kinds of foreground identifiers stored in the table to M by retaining or reducing the numbers $n_1$ and $n_2$ of kinds of foreground identifiers for identifying the color information of the chromatic colors and the achromatic colors stored in the table to the numbers $m_1$ and $m_2$;

correcting the foreground layer to a foreground layer in which the number of kinds of foreground identifiers included therein has been reduced in accordance with a relationship between the foreground identifiers obtained before reducing the number of kinds thereof and the foreground identifiers attained after reducing the number of kinds thereof;

generating, on the basis of the corrected foreground layer, the M binary images each of which is obtained by binarizing a pixel value of one kind of foreground identifier and pixel values of the other kinds of foreground identifiers, correspondingly to the M kinds of foreground identifiers;

performing lossless compression on the generated M binary images;

generating a background layer on the basis of the foreground layer and the color image; and performing lossy compression on the generated background layer.

2. An image compressing apparatus for compressing a color image consisting of a plurality of pixels, comprising:

a foreground mask generating unit that generates, on the basis of the color image, a foreground mask representing respective pixels of a foreground corresponding to a text and/or a line art included in the color image;

a foreground layer generating unit that generates, on the basis of the foreground mask generated by the foreground mask generating unit and the color image, a foreground layer in which color information of the respective pixels of the foreground is replaced with N (wherein N is a natural number) kinds of foreground identifiers for identifying the color information of the foreground and color information of respective pixels of a background is replaced with a background identifier indicating that the pixels correspond to the background;

a table generating unit that generates a table in which color information of the foreground, a foreground identifier for identifying the color information and a number of pixels having the foreground identifier out of all the pixels included in the foreground layer generated by the foreground layer generating unit are correlated and stored;

a reduction determining unit that determines whether or not a number of kinds of foreground identifiers stored in the table generated by the table generating unit is to be reduced to be smaller than N;

a chromatic/achromatic color classifying unit that classifies the color information stored in the table into color information of chromatic colors and color information of achromatic colors when the reduction determining unit determines that the number of kinds of foreground identifiers is to be reduced;

a number determining unit that determines, in order to retain or reduce a number $n_1$ of kinds of foreground identifiers for identifying the color information classified as the chromatic colors by the chromatic/achromatic color classifying unit and a number $n_2$ of kinds of foreground identifiers for identifying the color information classified as the achromatic colors by the chromatic/achromatic color classifying unit (wherein $n_1$ and $n_2$ are integers satisfying $n_1 \geq 0$, $n_2 \geq 0$ and $N=n_1+n_2$), a number $m_1$ of kinds of foreground identifiers for identifying the color information of the chromatic colors to be attained and a number $m_2$ of kinds of foreground identifiers for identifying the color information of the achromatic colors to be attained (wherein $m_1$ and $m_2$ are integers satisfying $0 \leq m_1 \leq n_1$, $0 \leq m_2 \leq n_2$ and $0<m_1+m_2<N$);

a number reducing unit that reduces the number of kinds of foreground identifiers stored in the table to M (wherein M is a natural number satisfying $M=m_1+m_2$) by retaining or reducing the numbers $n_1$ and $n_2$ of kinds of foreground identifiers for identifying the color information of the chromatic colors and the achromatic colors stored in the table to the numbers $m_1$ and $m_2$ determined by the number determining unit;

a foreground layer correcting unit that corrects the foreground layer generated by the foreground layer generating unit to a foreground layer including foreground identifiers having been reduced in number by the number reducing unit;

a binary image generating unit that generates, on the basis of the foreground layer corrected by the foreground layer correcting unit, M binary images each of which is obtained by binarizing a pixel value of one kind of foreground identifier and pixel values of the other kinds of foreground identifiers, correspondingly to the M kinds of foreground identifiers;

a binary image compressing unit that performs lossless compression on the M binary images generated by the binary image generating unit;

a background generating unit that generates a background layer on the basis of the foreground layer corrected by the foreground layer correcting unit or the foreground mask generated by the foreground mask generating unit and the color image; and a background image compressing unit that performs lossy compression on the background layer generated by the background generating unit.

3. The image compressing apparatus according to claim 2, wherein when $n_1 \geqq 3$ and $n_1 > m_1 \geqq 2$, the number reducing unit includes:

a color difference calculating unit that calculates, on the basis of the color information correlated to the foreground identifiers corresponding to the chromatic colors stored in the table generated by the table generating unit, a color difference between colors expressed by every combination of color information;

a chromatic color combining unit that calculates a combination of foreground identifiers having a smallest color difference obtained by the color difference calculating unit; and a chromatic color merging unit that compares numbers of pixels having the combination of foreground identifiers obtained by the chromatic color combining unit by referring to the table, and that merges one of the foreground identifiers into the other foreground identifier when the numbers of pixels are the same and merges one of the foreground identifiers corresponding to a smaller number of pixels into the other foreground identifier corresponding to a larger number of pixels when the numbers of pixels are different, calculation by the chromatic color combining unit and mergence by the chromatic color merging unit are repeatedly executed with a foreground identifier invalidated through the mergence removed until a number of kinds of foreground identifiers corresponding to the chromatic colors becomes equal to the number $m_1$ as a result of the mergence by the chromatic color merging unit, and the foreground layer correcting unit replaces the foreground identifiers obtained before the mergence and included in the foreground layer generated by the foreground layer generating unit with foreground identifiers attained through the mergence in accordance with a relationship between the $n_1$ kinds of foreground identifiers obtained before reducing the number by the number reducing unit and the $m_1$ kinds of foreground identifiers attained after reducing the number by the number reducing unit.

4. The image compressing apparatus according to claim 3, wherein the number reducing unit further includes a chromatic color coefficient calculating unit that obtains a coefficient in accordance with luminosity of a color expressed by color information correlated to each of the foreground identifiers corresponding to the chromatic colors, and the color difference calculating unit calculates a color difference by multiplying an actual color difference between the colors by the coefficient obtained by the chromatic color coefficient calculating unit.

5. The image compressing apparatus according to claim 2, wherein when $n_2 \geqq 3$ and $n_2 > m_2 \geqq 2$, the number reducing unit includes:

a luminance difference calculating unit that calculates, on the basis of the color information correlated to the foreground identifiers corresponding to the achromatic colors stored in the table generated by the table generating unit, a luminance difference between colors expressed by every combination of color information;

an achromatic color combining unit that calculates a combination of foreground identifiers having a smallest luminance difference obtained by the luminance difference calculating unit; and an achromatic color merging unit that compares numbers of pixels having the combination of foreground identifiers obtained by the achromatic color combining unit by referring to the table, and that merges one of the foreground identifiers into the other foreground identifier when the numbers of pixels are the same and merges one of the foreground identifiers corresponding to a smaller number of pixels into the other foreground identifier corresponding to a larger number of pixels when the numbers of pixels are different, calculation by the achromatic color combining unit and mergence by the achromatic color merging unit are repeatedly executed with a foreground identifier invalidated through the mergence removed until a number of kinds of foreground identifiers corresponding to the achromatic colors becomes equal to the number $m_2$ as a result of the mergence by the achromatic color merging unit, and the foreground layer correcting unit replaces the foreground identifiers obtained before the mergence and included in the foreground layer generated by the foreground layer generating unit with foreground identifiers attained through the mergence in accordance with a relationship between the $n_2$ kinds of foreground identifiers obtained before reducing the number by the number reducing unit and the $m_2$ kinds of foreground identifiers attained after reducing the number by the number reducing unit.

6. The image compressing apparatus according to claim 5, wherein the number reducing unit further includes an achromatic color coefficient calculating unit that obtains a coefficient in accordance with luminosity of a color expressed by color information correlated to each of the foreground identifiers corresponding to the achromatic colors, and the luminance difference calculating unit calculates a luminance difference by multiplying an actual luminance difference between the colors by the coefficient obtained by the achromatic color coefficient calculating unit.

7. The image compressing apparatus according to claim 2, wherein the reduction determining unit determines to reduce the number of kinds of foreground identifiers to be smaller than N when N is larger than a predetermined number P (wherein P is a natural number).

8. The image compressing apparatus according to claim 7, wherein P=M, and the number determining unit determines the numbers $m_1$ and $m_2$ in such a manner that a ratio of the number $n_1$ to N and a ratio of the number $m_1$ to M substantially accord with each other and that a ratio of the number $n_2$ to N and a ratio of the number $m_2$ to M substantially accord with each other.

9. The image compressing apparatus according to claim 8, wherein the number determining unit performs a calculation of $m_1 = M \times n_1/N$ for determining the number $m_1$ with rounding up to the nearest whole number or performs a calculation of $m_2 = M \times n_2/N$ for determining the number $m_2$ with rounding up to the nearest whole number, for merging achromatic colors with priority to chromatic colors.

10. The image compressing apparatus according to claim 2,
wherein the number determining unit includes:
a first comparing unit that compares the number $n_1$ with a predetermined number $Q_1$ (wherein $Q_1$ is a natural number satisfying $2 \leqq Q_1 < M$); and
a second comparing unit that compares the number $n_2$ with a predetermined number $Q_2$ (wherein $Q_2$ is a natural number satisfying $2 \leqq Q_2 < M$ and $Q_1 + Q_2 \leqq M$), and
the numbers $m_1$ and $m_2$ are determined in such a manner as to attain $m_1 \geqq Q_1$ when the first comparing unit obtains a comparison result of $n_1 > Q_1$ and attain $m_1 = n_1$ when the comparison result is $n_1 \leqq Q_1$, and to attain $m_2 \geqq Q_2$ when the second comparing unit obtains a comparison result of $n_2 > Q_2$ and attain $m_2 = n_2$ when the comparison result is $n_2 \leqq Q_2$.

11. An image forming apparatus, comprising:
the image compressing apparatus of claim 2; and
an image forming unit that forms an image on a recording sheet.

12. A non-transitory recording medium in which a computer program for compressing a color image consisting of a plurality of pixels is recorded, the computer program comprising steps of:
causing a computer to generate, on the basis of the color image, a foreground mask representing respective pixels of a foreground corresponding to a text and/or a line art included in the color image;
causing the computer to generate, on the basis of the generated foreground mask and the color image, a foreground layer in which color information of the respective pixels of the foreground is replaced with N (wherein N is a natural number) kinds of foreground identifiers for identifying the color information of the foreground and color information of respective pixels of a background is replaced with a background identifier indicating that the pixels correspond to the background;
causing the computer to generate a table in which color information of the foreground, a foreground identifier for identifying the color information and a number of pixels having the foreground identifier out of all the pixels included in the generated foreground layer are correlated and stored;
causing the computer to determine whether or not a number of kinds of foreground identifiers stored in the generated table is to be reduced to be smaller than N;
causing the computer to classify the color information stored in the table into color information of chromatic colors and color information of achromatic colors when it is determined that the number of kinds of foreground identifiers is to be reduced;
causing the computer to determine, in order to retain or reduce a number $n_1$ of kinds of foreground identifiers for identifying the color information classified as the chromatic colors and a number $n_2$ of kinds of foreground identifiers for identifying the color information classified as the achromatic colors (wherein $n_1$ and $n_2$ are integers satisfying $n_1 \geqq 0$, $n_2 \geqq 0$ and $N = n_1 + n_2$), a number $m_1$ of kinds of foreground identifiers for identifying the color information of the chromatic colors to be attained and a number $m_2$ of kinds of foreground identifiers for identifying the color information of the achromatic colors to be attained (wherein $m_1$ and $m_2$ are integers satisfying $0 \geqq m_1 \leqq n_1$, $0 \leqq m_2 \leqq n_2$ and $0 < m_1 + m_2 < N$);
causing the computer to reduce the number of kinds of foreground identifiers stored in the table to M (wherein M is a natural number satisfying $M = m_1 + m_2$) by retaining or reducing the numbers $n_1$ and $n_2$ of kinds of foreground identifiers for identifying the color information of the chromatic colors and the achromatic colors stored in the table to the numbers $m_1$ and $m_2$ determined in the step of causing the computer to determine the numbers;
causing the computer to correct the generated foreground layer to a foreground layer including foreground identifiers having been reduced in number in accordance with a relationship between the foreground identifiers obtained before reducing the number thereof and foreground identifiers attained after reducing the number thereof;
causing the computer to generate, on the basis of the corrected foreground layer, M binary images each of which is obtained by binarizing a pixel value of one kind of foreground identifier and pixel values of the other kinds of foreground identifiers, correspondingly to the M kinds of foreground identifiers;
causing the computer to perform lossless compression on the generated M binary images;
causing the computer to generate a background layer on the basis of the corrected foreground layer and the color image; and
causing the computer to perform lossy compression on the generated background layer.

* * * * *